US011119633B2

(12) United States Patent
Yamamoto

(10) Patent No.: US 11,119,633 B2
(45) Date of Patent: Sep. 14, 2021

(54) INFORMATION PROCESSING DEVICE AND METHOD

(71) Applicant: SONY CORPORATION, Tokyo (JP)

(72) Inventor: Daisuke Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 16/335,053

(22) PCT Filed: Oct. 27, 2017

(86) PCT No.: PCT/JP2017/038849
§ 371 (c)(1),
(2) Date: Mar. 20, 2019

(87) PCT Pub. No.: WO2018/088239
PCT Pub. Date: May 17, 2018

(65) Prior Publication Data
US 2019/0286286 A1 Sep. 19, 2019

(30) Foreign Application Priority Data

Nov. 10, 2016 (JP) .............................. JP2016-219771

(51) Int. Cl.
*G06F 3/0482* (2013.01)
*H04N 5/232* (2006.01)
(Continued)

(52) U.S. Cl.
CPC ........ *G06F 3/0482* (2013.01); *G06F 3/04847* (2013.01); *H04N 1/0035* (2013.01);
(Continued)

(58) Field of Classification Search
CPC .............. G06F 3/0482; G06F 3/04847; H04N 5/232933; H04N 1/0035; H04N 5/23216
(Continued)

(56) References Cited

U.S. PATENT DOCUMENTS 6,338,003 B1 * 1/2002 Kamiguchi ........ G05B 19/4185
700/169
8,209,634 B2 * 6/2012 Klassen ................ G06F 3/0482
715/859
(Continued)

FOREIGN PATENT DOCUMENTS

CN     1194752 A     9/1998
CN     1799253 A     7/2006
(Continued)

OTHER PUBLICATIONS

International Search Report and Written Opinion of PCT Application No. PCT/JP2017/038849, dated Jan. 16, 2018, 10 pages of ISRWO.
(Continued)

*Primary Examiner* — David Phantana-angkool
(74) *Attorney, Agent, or Firm* — Chip Law Group

(57) ABSTRACT

The present technology relates to an information processing device, an information processing method, and a program which are capable of improving convenience. The information processing device includes a control unit that selects a target position, at which an operation of setting related to a menu item is performed, in one or a plurality of menu pages in which the menu item is displayed, and performs setting processing corresponding to determination of the selection in a case where an instruction for the determination of the selection is given. The present technology is applicable to an imaging device.

15 Claims, 19 Drawing Sheets

(51) Int. Cl.
  *G06F 3/0484* (2013.01)
  *H04N 1/00* (2006.01)
  *G06F 3/0362* (2013.01)

(52) U.S. Cl.
  CPC ... *H04N 5/23216* (2013.01); *H04N 5/232933* (2018.08); *G06F 3/0362* (2013.01)

(58) Field of Classification Search
  USPC ......................................................... 715/825
  See application file for complete search history.

(56) References Cited

U.S. PATENT DOCUMENTS

| | | | | |
|---|---|---|---|---|
| 9,237,247 | B2* | 1/2016 | Kasamatsu | H04N 1/00477 |
| 9,619,143 | B2* | 4/2017 | Herz | G06F 3/0482 |
| 10,313,505 | B2* | 6/2019 | Omernick | G06F 1/1656 |
| 10,416,843 | B2* | 9/2019 | Hong | G06F 9/451 |
| 10,440,259 | B2* | 10/2019 | Yoshimi | H04N 5/23293 |
| 10,503,364 | B2* | 12/2019 | Sasaki | G08C 17/00 |
| 10,733,993 | B2* | 8/2020 | Kudurshian | G10L 15/30 |
| 10,845,957 | B2* | 11/2020 | Kwon | H04N 21/4312 |
| 10,936,163 | B2* | 3/2021 | Wohlstadter | G06F 3/04845 |
| 2002/0054146 | A1 | 5/2002 | Fukumoto et al. | |
| 2003/0013483 | A1* | 1/2003 | Ausems | H04M 1/72522 455/556.1 |
| 2006/0238625 | A1 | 10/2006 | Sasaki et al. | |
| 2006/0288307 | A1* | 12/2006 | Kubota | G06F 3/0482 715/810 |
| 2009/0207439 | A1* | 8/2009 | Oomura | G06F 21/608 358/1.15 |
| 2009/0315867 | A1 | 12/2009 | Sakamoto et al. | |
| 2010/0211914 | A1 | 8/2010 | Taira et al. | |
| 2012/0086975 | A1* | 4/2012 | Ozaki | G06F 3/1219 358/1.15 |
| 2014/0157126 | A1* | 6/2014 | Kusano | G06F 3/0236 715/716 |
| 2014/0355044 | A1* | 12/2014 | Ketsuka | G06F 3/1253 358/1.15 |
| 2016/0077687 | A1 | 3/2016 | Watanabe et al. | |

FOREIGN PATENT DOCUMENTS

| | | |
|---|---|---|
| CN | 101807141 A | 8/2010 |
| CN | 105430244 A | 3/2016 |
| EP | 0840504 A1 | 5/1998 |
| EP | 1626572 A1 | 2/2006 |
| JP | 09-305360 A | 11/1997 |
| JP | 2004-343662 A | 12/2004 |
| JP | 2007-515000 A | 6/2007 |
| JP | 2010-061296 A | 3/2010 |
| JP | 2010-191720 A | 9/2010 |
| JP | 2011-018085 A | 1/2011 |
| JP | 2014-235514 A | 12/2014 |
| JP | 2016-062116 A | 4/2016 |
| KR | 10-2006-0018856 A | 3/2006 |
| TW | 200527906 A | 8/2005 |
| WO | 97/44952 A1 | 11/1997 |
| WO | 2004/102954 A1 | 11/2004 |

OTHER PUBLICATIONS

Office Action for JP Patent Application No. 2018-550141, dated Jun. 29, 2021, 05 pages of English Translation and 06 pages of Office Action.

* cited by examiner

INFORMATION PROCESSING DEVICE AND METHOD

CROSS REFERENCE TO RELATED APPLICATIONS

This application is a U.S. National Phase of International Patent Application No. PCT/JP2017/038849 filed on Oct. 27, 2017, which claims priority benefit of Japanese Patent Application No. JP 2016-219771 filed in the Japan Patent Office on Nov. 10, 2016. Each of the above-referenced applications is hereby incorporated herein by reference in its entirety.

TECHNICAL FIELD

The present technology relates to an information processing device, an information processing method, and a program, and particularly, to an information processing device, an information processing method, and a program which are capable of improving convenience.

BACKGROUND ART

In the related art, a technology in which a user selects an arbitrary menu item from a menu page that is displayed, and allows processing corresponding to the selected menu item to be executed when using an electronic device such as a digital camera is known.

As the technology, a technology capable of displaying not only a menu page in which a menu item determined in advance is displayed but also a My Menu page in which menu items selected by a user are displayed in an arbitrary arrangement order is also suggested (for example, refer to Patent Document 1).

In the technology, the user can register an arbitrary menu item selected by the user at an arbitrary position in a plurality of My Menu pages. In addition, in the My Menu pages, a menu item for changing setting of the My Menu pages is displayed.

CITATION LIST

Patent Document

Patent Document 1: Japanese Patent Application Laid-Open No. 2016-62116

SUMMARY OF THE INVENTION

Problems to be Solved by the Invention

However, in the technology, it is necessary for the user to perform setting for every My Menu page, or a lot of operation steps are necessary to perform one setting, for example. Accordingly, it cannot be said that convenience is good.

The present technology has been made in consideration of such circumstances, and an object thereof is to provide convenience.

Solutions to Problems

An information processing device according to a first aspect of the present technology includes a control unit that selects a target position, at which an operation of setting related to a menu item is performed, in one or a plurality of menu pages in which the menu item is displayed, and performs setting processing corresponding to determination of the selection in a case where an instruction for the determination of the selection is given.

The control unit may allow a selection screen, which includes at least a part of the menu pages and on which the target position is selected, to be displayed, and selects the target position in correspondence with a user's operation with respect to the selection screen.

The control unit may switch display of the selection screen in correspondence with the user's operation so that any one among a plurality of the selection screens is displayed.

The control unit may allow a screen for selection of a new menu item for which a setting operation is performed or a new target position at which a setting operation is performed to be displayed after the setting processing.

The target position may be set to a position of an addition destination of the new menu item in the menu page.

The target position may be set to a position of a movement destination of the menu item in the menu page.

The control unit may select the menu item that is moved from one or a plurality of the menu pages, and selects the position of the movement destination of the menu item that is moved as the target position.

The target position may be set to a position of the menu item that is deleted in the menu page.

The operation of setting related to the menu item may be set to addition of the menu item, sorting of the menu item, or deletion of the menu item.

An information processing method or a program according to the first aspect of the present technology includes a step of selecting a target position, at which an operation of setting related to a menu item is performed, in one or a plurality of menu pages in which the menu item is displayed, and performing setting processing corresponding to determination of the selection in a case where an instruction for the determination of the selection is given.

In the first aspect of the present technology, a target position, at which an operation of setting related to a menu item is performed, is selected in one or a plurality of menu pages in which the menu item is displayed, and setting processing corresponding to determination of the selection is performed in a case where an instruction for the determination of the selection is given.

An information processing device according to a second aspect of the present technology includes a control unit configured to update a menu page so that a menu item that is designated is added or moved to a position designated in the menu page when the number of menu items displayed in the menu page is less than a display-possible maximum number in a case where an instruction for addition or movement of the designated menu item with respect to the menu page is given, and update the menu page so that a menu item that exists at the position designated in the menu page is substituted with the designated menu item when the number of the menu items displayed in the menu page is the maximum number.

The control unit may allow a selection screen, which includes at least a part of the menu pages and on which an addition destination or a movement destination of the designated menu item is selected, to be displayed, and updates the menu page in correspondence with a user's operation with respect to the selection screen.

The control unit may allow an instruction image for selection of a position of the addition destination or the movement destination of the designated menu item to be displayed on the selection screen in a different display format in correspondence with whether or not the number of the menu items displayed in the menu page is less than the maximum number.

The control unit may switch display of the selection screen in correspondence with the user's operation so that any one among a plurality of the selection screen is displayed.

An information processing method or a program according to the second aspect of the present technology includes a step of updating a menu page so that a menu item that is designated is added or moved to a position designated in the menu page when the number of menu items displayed in the menu page is less than a display-possible maximum number in a case where an instruction for addition or movement of the designated menu item with respect to the menu page is given, and updating the menu page so that a menu item that exists at the position designated in the menu page is substituted with the designated menu item when the number of the menu items displayed in the menu page is the maximum number.

In the second aspect of the present technology, a menu page is updated so that a menu item that is designated is added or moved to a position designated in the menu page when the number of menu items displayed in the menu page is less than a display-possible maximum number in a case where an instruction for addition or movement of the designated menu item with respect to the menu page is given, and the menu page is updated so that a menu item that exists at the position designated in the menu page is substituted with the designated menu item when the number of the menu items displayed in the menu page is the maximum number.

Effects of the Invention

According to the first aspect to the second aspect of the present technology, it is possible to improve convenience.

Furthermore, the effect described here is not limited, and may be any one effect described in the present disclosure.

MODE FOR CARRYING OUT THE INVENTION

Hereinafter, embodiments to which the present technology is applied will be described with reference to the accompanying drawings.

First Embodiment

Configuration Example of External Appearance of Imaging Device

In a case where not only a menu page that is determined in advance but also a My Menu page that can be set by a user in an arbitrary manner can be displayed, the present technology also provides a page including menu items for performing setting of the My Menu page, or the like to improve convenience.

For example, the present technology is applicable to various electronic apparatuses such as a digital still camera, a digital video camera, a smartphone, a television receiver, and a recorder. Hereinafter, description will be given of a case where the present technology is applied to an imaging device that is a digital still camera capable of capturing a still image and a moving image.

Figure 1:
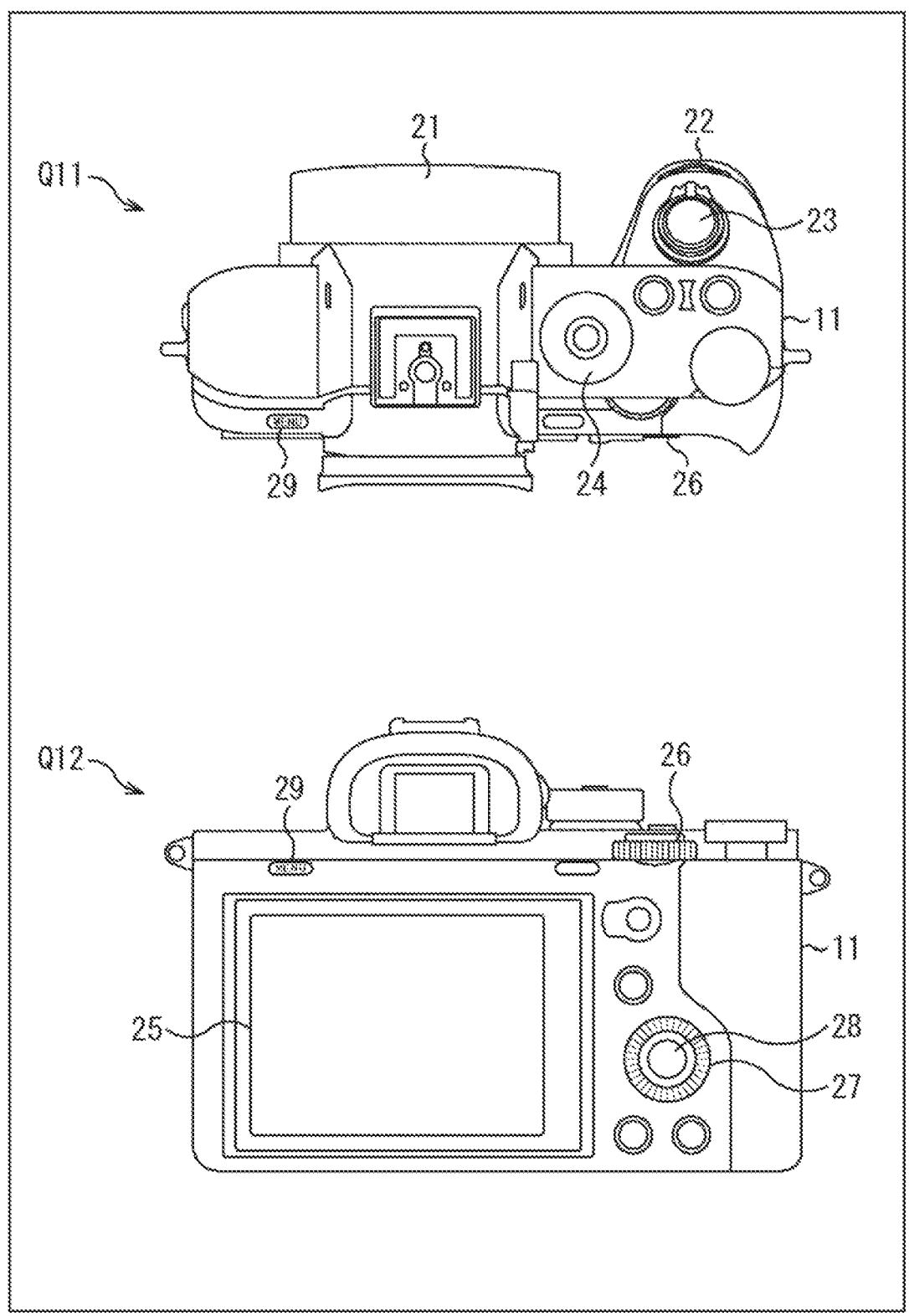
FIG. 1 is a view illustrating a configuration example of an external appearance of an imaging device.

FIG. 1 is a view illustrating a configuration example of an external appearance of an imaging device to which the present technology is applied.

That is, a portion indicated by an arrow Q11 is a top view that is seen from an upper side of an imaging device 11, and a portion indicated by an arrow Q12 is a rear view that is seen from a rear surface side of the imaging device 11.

A lens 21 that guides light from the outside to an image sensor (not illustrated), and a dial 22 for performing various operations are provided on a front surface of the imaging device 11. In addition, various buttons such as a shutter button 23 and a dial 24 for performing setting of an imaging mode or the like are provided on a top surface of the imaging device 11.

In addition, as indicated by the arrow Q12, a display unit 25 that displays various images, and a dial 26, a wheel 27, a button 28, and a menu button 29 for performing various operations are provided on a rear surface side of the imaging device 11.

For example, the display unit 25 includes a liquid crystal display device and the like, and displays a through image in an imaging operation, or displays an image such as a menu page in a setting operation and the like.

The dial 22 or the dial 26 is operated when moving a cursor and the like on a screen such as a menu page displayed on the display unit 25, for example. The dial 22 or the dial 26 is a disc-shaped operation unit that rotates with a central portion thereof set as an axis, and is configured to move the cursor when a user rotates the dial 22 or the dial 26.

The wheel 27 is a ring-shaped operation unit that is provided at an outer peripheral portion of the button 28. For example, the user can move the cursor that is displayed on the display unit 25 by pressing an edge of the wheel 27 in each of upper and lower directions and right and left directions, or by rotating the wheel 27 with a position of the button 28 set as an axis. Particularly, when the user operates positions of respective edges of the wheel 27 in upper and lower directions and right and left directions, the wheel 27 functions as a cross key.

In addition, for example, with respect to a menu item that is set as a selection state by a cursor, the user can determine selection of the menu item by pressing the button 28. That is, the button 28 functions as a determination button. For example, the menu button 29 is operated when displaying a menu page on the display unit 25.

Furthermore, here, description will be given of an example in which the button 28, the dial 22, the dial 26, and the wheel 27 are provided as an operation unit that performs an operation with respect to a display screen such as movement of a cursor on the display screen such as a menu page. However, the operation with respect to the display screen may be performed by another operation means (operation unit) such as a joy stick, a jog dial, a remote commander, and a touch panel provided to overlap the display unit 25.

Functional Configuration Example of Imaging Device

Figure 2:
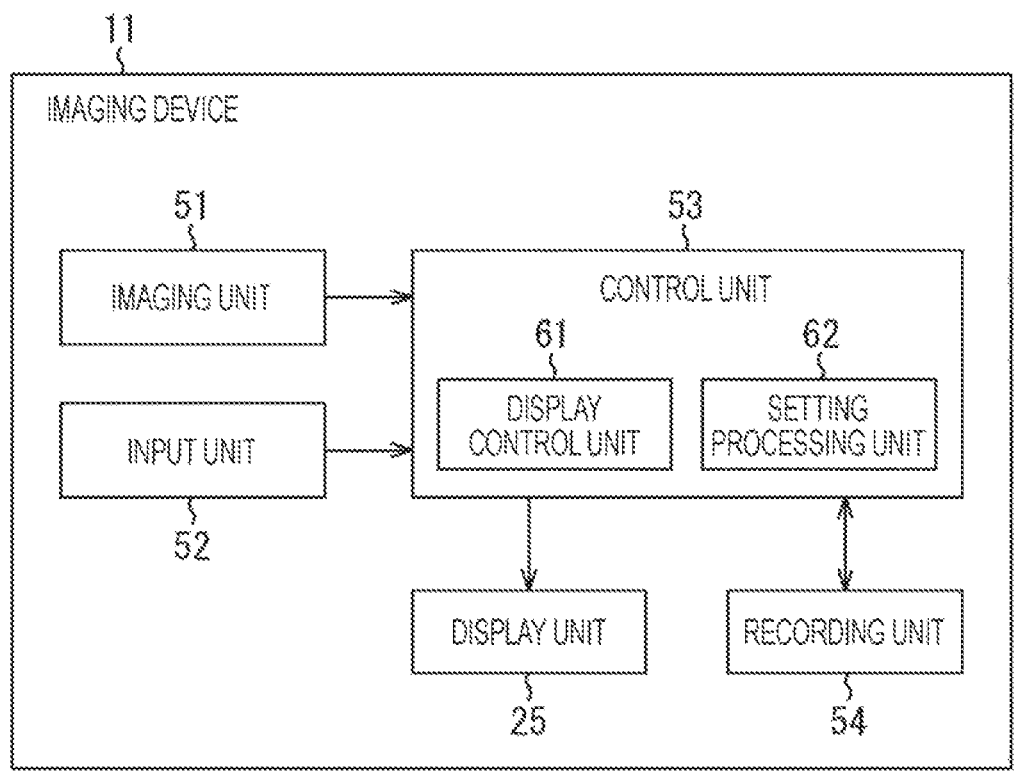
FIG. 2 is a view illustrating a functional configuration example of the imaging device.

Next, a functional configuration example of the imaging device 11 illustrated in FIG. 1 will be described. FIG. 2 is a view illustrating the functional configuration example of the imaging device 11. Furthermore, in FIG. 2, the same reference numeral will be given to a portion corresponding to the case in FIG. 1, and description thereof will be appropriately omitted.

The imaging device 11 illustrated in FIG. 2 includes an imaging unit 51, an input unit 52, a control unit 53, a display unit 25, and a recording unit 54.

For example, the imaging unit 51 includes an image sensor and the like and capture an image of a subject by receiving light incident from the outside through the lens 21, and performing photoelectric conversion of the light, and supplies an image that is obtained as a result thereof to the control unit 53.

For example, the input unit 52 includes the dial 22, the shutter button 23, the dial 26, the wheel 27, the button 28, the menu button 29, and the like, and supplies a signal corresponding to a user's operation to the control unit 53.

The control unit 53 controls an operation of the entirety of the imaging device 11. The control unit 53 includes a display control unit 61 and a setting processing unit 62.

For example, the display control unit 61 supplies an image signal obtained by the imaging unit 51 to the display unit 25 to display an image, or supplies an image signal of a display screen corresponding to a signal supplied from the input unit 52 and the like to the display unit 25 to display various display screen (images) such as a menu page.

The setting processing unit 62 performs various kinds of setting processing in correspondence with a signal that is supplied from the input unit 52. In addition, the control unit 53 appropriately supplies an image signal obtained by the imaging unit 51 to the recording unit 54 to record the image signal.

The display unit 25 displays various images in accordance with control of the display control unit 61. The recording unit 54 records the image signal supplied from the control unit 53, or various pieces of information (data) such as a program installed in advance, and supplies recorded information to the control unit 53 as necessary.

<With Regard to My Menu Page>

Next, description will be given of a My Menu page that is displayed on the display unit 25.

For example, when a user gives an instruction for display of a menu by operating the menu button 29 and the like, a menu page in which a plurality of menu items determined in advance are arranged is displayed on the display unit 25.

Content of the menu items which are displayed in the menu page and an arrangement order of the menu items are determined in advance, and the user cannot change the content and the arrangement order of the menu items. In the following description, a menu page in which menu items determined in advance are displayed is particularly referred to as "existing menu page".

In the imaging device 11, it is possible to display one or a plurality of existing menu pages, and the user can select a desired menu item from menu items on the existing menu pages to execute processing that is determined with respect to the menu item.

However, in the plurality of menu items included in the existing menu pages, a menu item that is frequently used by the user, and a menu item that is not frequently used exist.

Figure 3:
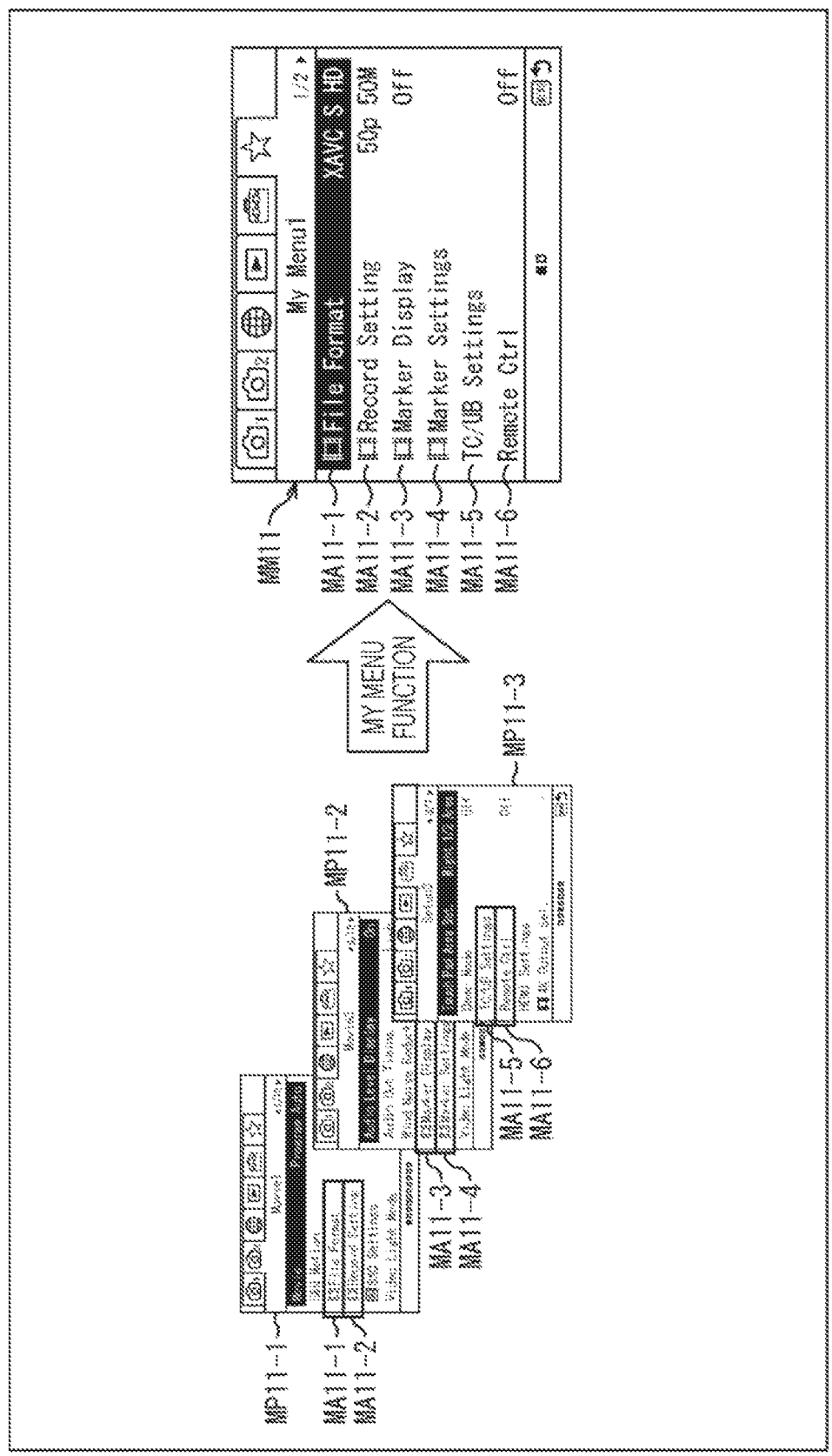
FIG. 3 is a view illustrating a My Menu page.

Here, for example, as illustrated in FIG. 3, the imaging device 11 is provided with a My Menu function in which the user selects one or a plurality of desired menu items from the plurality of existing menu pages, and displays the menu items on a new one menu page.

In the example in FIG. 3, as the existing menu page, an existing menu page MP11-1 to an existing menu page MP11-3 are illustrated.

For example, it is assumed that a menu item MA11-1 and a menu item MA11-2 which are frequently used by the user exist in the existing menu page MP11-1.

Similarly, it is assumed that a menu item MA11-3 and a menu item MA11-4 which are frequently used by the user exist in the existing menu page MP11-2, and a menu item MA11-5 and a menu item MA11-6 which are frequently used by the user exist in the existing menu page MP11-3.

Furthermore, in a case where it is not necessary to distinguish the existing menu page MP11-1 to the existing menu page MP11-3, it is assumed that the existing menu pages are simply referred to as "existing menu page MP11". In addition, hereinafter, in a case where it is not necessary to particularly distinguish the menu item MA11-1 to the menu item MA11-6, it is assumed that the menu items are simply referred to as "menu item MA11".

As in the example, in the existing menu configuration, six menu items to the maximum are displayed in each existing menu page over a plurality of the existing menu pages, but the user may desire to use parts of the menu items.

In this case, it is assumed that the user performs an operation of selecting a total of six menu items including the menu item MA11-1 to the menu item MA11-6 from the three existing menu pages MP11 to create (generate) a new one menu page.

As a result, as illustrated on the right in the drawing, the imaging device 11 generates a menu page in which the menu item MA11-1 to the menu item MA11-6 selected by the user are arranged in this order and are displayed, and sets the menu page as My Menu page MM11.

In the following description, it is assumed that a menu page in which menu items selected (designated) by the user from the existing menu pages are displayed on a page at positions selected (designated) by the user is particularly referred to as "My Menu page". Furthermore, in the following description, in a case where it is not particularly distinguish the existing menu pages and the My Menu page, the menu pages are simply referred to as "menu page".

In addition, in this embodiment, it is assumed that six menu items to the maximum can be displayed on the My Menu page, and in the My Menu page, a menu item for performing setting related to the My Menu page is not displayed.

In order words, six menu items to the maximum can be registered in one My Menu page, and the menu items capable of being registered in the My Menu page are set to menu items for performing processing other than setting related to the My Menu page, for example, menu items for performing setting of activation of a function of the imaging device 11, setting of an operation thereof, or the like. Particularly, in this embodiment, only menu items on the existing menu pages can be registered in the My Menu page.

In the following description, the maximum number of menu items capable of being displayed in one My Menu page, that is, the maximum number of menu items capable of being registered in one My Menu page is particularly referred to as "registrable maximum number".

As described above, when generating the My Menu page MM11 in which only the menu items MA11 selected by the user are displayed, it is possible to provide a convenient unique menu page to the user. With this arrangement, in an operation with respect to the imaging device 11, the user can quickly select a desired menu item MA11 from the My Menu page MM11, and it is possible to improve convenience of the imaging device 11.

Furthermore, when the My Menu page is newly created by the user, the setting processing unit 62 generates My Menu page information that is information related to the newly generated My Menu page, and records the information. The display control unit 61 can display the My Menu page with reference to the My Menu page information.

For example, the My Menu page information is set to information including registration information indicating which menu item on the existing menu pages is included in the My Menu page, that is, indicating which menu item is registered, and display position information indicating a display position of the registered menu item on the My Menu page. The My Menu page information may be recorded in the setting processing unit 62 or may be recorded in the recording unit 54.

In the imaging device 11, one or a plurality of My Menu pages can be created through a user's operation.

In addition, in the imaging device 11, a dedicated page related to setting of the My Menu page is provided so that creation or edition of the My Menu page, that is, setting related to the My Menu page can be simply performed. Specifically, for example, menu items for realizing all functions necessary for setting of the My Menu page such as addition, sorting, and deletion of the menu items are displayed in a page different from the menu page.

In the following description, the page in which the menu items for performing setting related to the My Menu page are displayed is also referred to as a My Menu setting page. In this embodiment, it is assumed that only the menu items which are determined in advance to perform setting related to the My Menu page are displayed in the My Menu setting page, and five menu items are always displayed in the My Menu setting page.

As described above, in the imaging device 11, as a method of providing a function of creating or editing the My Menu page, menu items for giving an instruction for execution of all functions necessary for setting such as creation and edition are collected in the My Menu setting page different from the My Menu page. With this arrangement, it is possible to further improve convenience in comparison to a case of independently editing each of a plurality of the My Menu pages.

Figure 4:
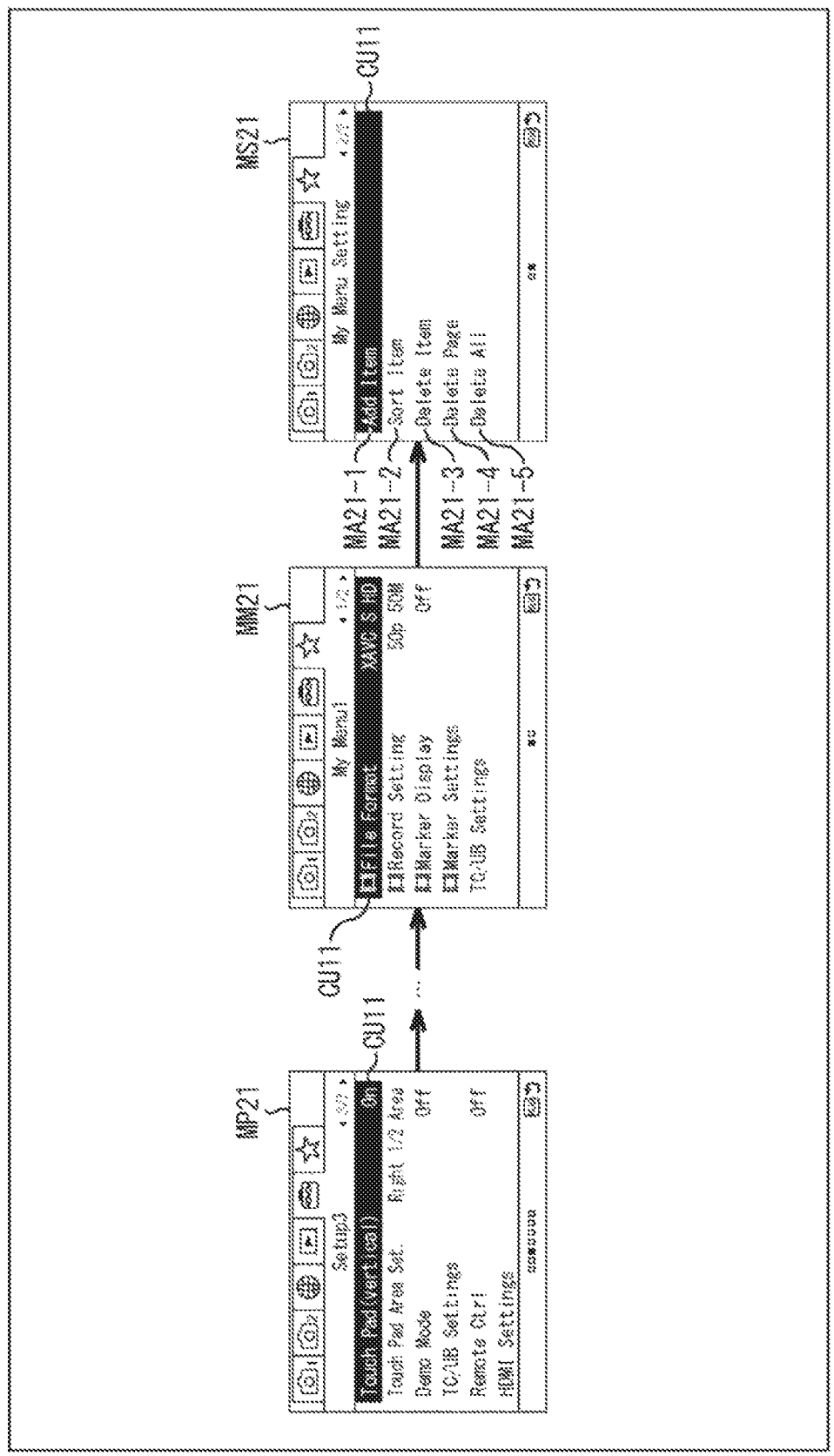
FIG. 4 is a view illustrating setting of the My Menu page.

Specifically, in the imaging device 11, for example, as illustrated in FIG. 4, an existing menu page MP21, a My Menu page MM21, and a My Menu setting page MS21 exist in the same layer. A user can switch display so that any one page among the plurality of pages is displayed on the display unit 25 by operating the input unit 52 to move a cursor Cu11 on a page in a lateral direction in the drawing so as to perform page ejection.

That is, for example, when the menu button 29 as the input unit 52 is operated by the user, the display control unit 61 controls the display unit 25 to allow the display unit 25 to display the existing menu page MP21.

In this state, for example, when the user perform a page ejection operation by pressing a right edge portion of the wheel 27 as the input unit 52, display of the display unit 25 is switched to another existing menu page or My Menu page, and it enters a state in which a My Menu page MM21 is displayed.

In addition, when the user performs the page ejection operation by pressing a right edge portion of the wheel 27 as the input unit 52, the display control unit 61 controls the display unit 25 in correspondence with the page ejection operation by the user to allow the display unit 25 to display a My Menu setting page MS21.

In this example, five menu items including a menu item MA21-1 to a menu item MA21-5 are displayed in the My Menu setting page MS21.

For example, the menu item MA21-1 in which characters "Add Item" is displayed is a menu item for executing an addition function of adding an arbitrary menu item that exists on the existing menu pages to an arbitrary position of an arbitrary My Menu page. Particularly, when the menu item MA21-1 is operated in a state in which any one My Menu page is not created yet, one My Menu page is newly created, and an arbitrary menu item can be added, that is, can be registered onto the My Menu page.

In addition, the menu item MA21-2 in which characters "Sort Item" are displayed is a menu item for moving an arbitrary menu item on an arbitrary My Menu page to an arbitrary position on the My Menu page or another My Menu page, that is, for executing a sorting function of performing sorting of menu items.

The menu item MA21-3 in which characters "Delete Item" are displayed is a menu item for executing a menu item deletion function of deleting an arbitrary menu item on an arbitrary My Menu page.

The menu item MA21-4 in which characters "Delete Page" are displayed is a menu item for executing a page deletion function of deleting an arbitrary My Menu page. The menu item MA21-5 in which characters "Delete All" are displayed is a menu item for executing an initialization function of collectively deleting all My Menu pages which are created at a current time to initialize the My Menu pages.

Furthermore, in an initial state such as when the menu item MA21-5 is operated, the My menu page does not exist, and when the user performs the page ejection operation, display switching is performed so that any one of the plurality of existing menu pages and the My Menu setting page is displayed. In addition, here, the My Menu setting page is set to one page, but a plurality of the My Menu setting pages may be displayed.

As described above, in the imaging device 11, menu items of all functions such as the addition function, the sorting function, the menu item deletion function, the page deletion function, and the initialization function for performing setting related to the My Menu page such as creation and edition are collected in the one My Menu setting page MS21. In addition, it is possible to perform setting related to all My Menu pages by operating the menu items on the My Menu setting page MS21. Particularly, when setting of the My Menu pages, it is possible to perform the setting over a plurality of the My Menu pages.

According to the configuration, it is not necessary to provide a menu item for performing setting related to the My Menu pages in each of the My Menu pages, and thus menu items can be registered in the My Menu page only in the same number as in the existing menu page. Accordingly, the user can use the My Menu page at the same convenience as in the existing menu page.

For example, when displaying the menu item for setting related to the My Menu page in the My Menu page, the registrable maximum number becomes smaller than the maximum menu items displayed in the existing menu page by one.

In addition, in this case, it enters a state in which the menu item for setting related to the My Menu page is always displayed on the My Menu page, but the menu item is not necessary until performing the subsequent setting (edition) of the My Menu page. That is, it is preferable that the menu item is not displayed when using the My Menu page as a typical menu screen, and convenience of the My Menu page deteriorates in comparison to the existing menu pages.

In contrast, in the imaging device 11, the menu item for performing setting related to the My Menu page is not displayed in the My Menu page, and thus as the registrable maximum number, it is possible to secure the same number as the maximum number of menu items displayed in the existing menu pages. Accordingly, it is possible to use the My Menu page at the same sense of feeling as in the existing menu pages, and thus it is possible to improve convenience. Particularly, it is possible to improve convenience as a menu after setting the My Menu page, that is, after edition.

<Description of Display Processing>

Here, description will be given of an operation of the imaging device 11 when a user displays the menu page or the My Menu setting page to execute processing corresponding to a desired menu item as described above.

That is, the display processing by the imaging device 11 will be described with reference to a flowchart in FIG. 5. For example, the display processing is initiated when the menu button 29 as the input unit 52 is operated and it enters a state in which an existing menu page is displayed on the display unit 25.

In step S11, the control unit 53 accepts an operation of the input unit 52 by a user.

As a result, the user can perform an operation with respect to a display screen by operating the dial 22, the dial 26, the wheel 27, and the like as the input unit 52.

That is, for example, the user can determine selection of a menu item that is set as a selection state by a cursor by moving the cursor that is an instruction image for selecting a menu item displayed on an existing menu page or by operating the button 28 as the input unit 52.

In step S12, the display control unit 61 determines whether or not to display a menu page.

For example, in a case where the page ejection operation is performed by the user to give an instruction for display of the existing menu page or the My Menu page, the display control unit 61 determines that the menu page is allowed to be displayed.

In step S12, in a case where it is determined that the menu page is allowed to be displayed, in step S13, the display control unit 61 controls the display unit 25 to allow the display unit 25 to display the menu page.

For example, in a case where the user moves the cursor in a lateral direction on the display screen to perform the page ejection operation, and as a result, an instruction for display of the menu page, that is, the existing menu page or the My Menu page is given, the display control unit 61 performs switching of display in correspondence with the instruction. That is, the display control unit 61 controls the display unit 25 on the basis of a signal supplied from the input unit 52 in correspondence with the user's operation to allow the display unit 25 to display the menu page.

In addition, when the menu page is displayed on the display unit 25, the user further operates the input unit 52 to select a desired menu item with the cursor, and gives an instruction for determination of selection of the menu item.

Here, a state in which the menu item is selected represents a state in which the menu item is focused by the cursor, that is, a state in which the cursor exists at a position of the menu item. In addition, a state in which selection of the menu item is determined represents a state in which the user presses the button 28 and the like as the input unit 52 from the state in which the menu item is selected by the cursor to give an instruction for execution of processing corresponding to the menu item, that is, selection of the menu item is finally determined.

In step S14, the control unit 53 executes processing corresponding to the menu item for which selection is determined on the basis of a signal that is supplied from the input unit 52 in correspondence with an operation of the user.

For example, it is assumed that the menu item for which selection is determined is a menu item for performing file format setting of a moving image. In this case, the display control unit 61 of the control unit 53 allows the display unit 25 to display a screen for selecting the file format, and the control unit 53 performs processing of changing setting in image capturing so that the moving image is recorded with a file format designated by the user. When processing corresponding to the menu item is executed, the display processing is terminated.

On the other hand, in step S12, in a case where it is determined that the menu page is not allowed to be displayed, that is, the user gives an instruction for display switching to the My Menu setting page, in step S15, the display control unit 61 controls the display unit 25 to allow the display unit 25 to display the My Menu setting page.

In addition, when the My Menu setting page is displayed on the display unit 25, the user further operates the input unit 52 to select a desired menu item with the cursor, and gives an instruction for determination of selection of the menu item.

In step S16, the control unit 53 executes setting processing corresponding to the menu item, of which selection is determined, on the My Menu setting page on the basis of a signal that is supplied from the input unit 52 in correspondence with a user's operation.

For example, it is assumed that the user operates the input unit 52 to give an instruction for determination of selection of the menu item MA21-1 in a state in which the My Menu setting page MS21 illustrated in FIG. 4 is displayed and the menu item MA21-1 is selected by the cursor CU11.

In this case, the control unit 53 allows the user to select a menu item that is set as an addition target and a position of an addition destination of the menu item while appropriately allowing the display unit 25 to display a necessary screen (image), thereby updating the My Menu page in correspondence with an operation by the user. That is, processing of updating My Menu page information of the My Menu page is performed as setting processing so that a menu item designated by the user is added at a position on the My Menu page which is designated by the user. When the setting processing corresponding to the menu item is executed, the display processing is terminated.

As described above, the imaging device 11 performs display switching in correspondence with the user's operation so that anyone of the menu page or the My Menu setting page is displayed, and when selection of a menu item is determined, the imaging device 11 performs processing determined with respect to the menu item.

As described above, the My Menu setting page is provided separately from the menu page, and thus it is possible to make the My Menu page easy to use, and it is possible to improve convenience of the imaging device 11.

<With Regard to Addition of Menu Item>

Here, a more specific example of the setting processing performed in step S16 in FIG. 5 will be described.

First, description will be given of a case where processing of realizing the addition function of adding a menu item in the My Menu page is performed as setting processing.

Figure 6:
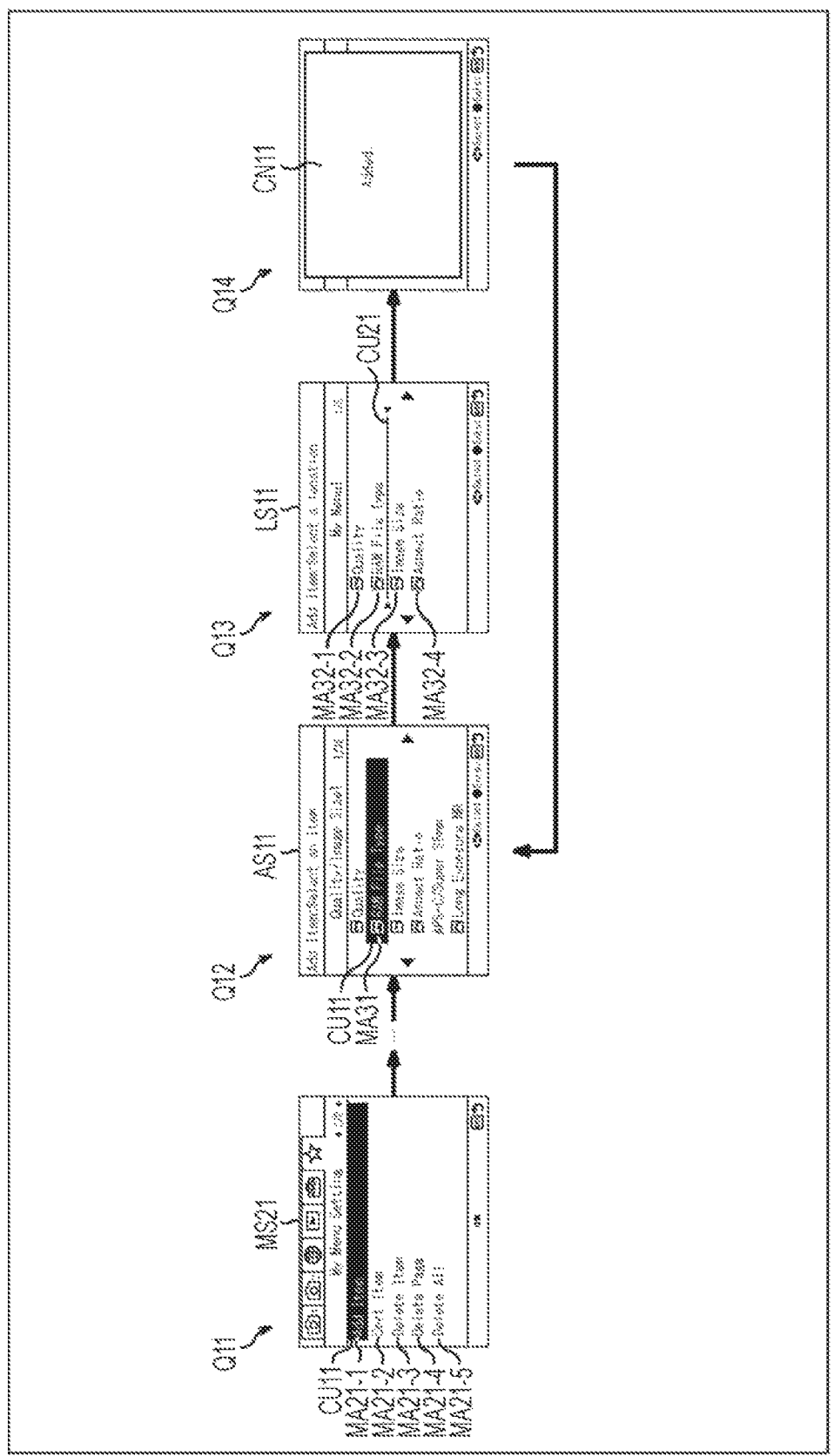
FIG. 6 is a view illustrating addition of a menu item.

For example, it is assumed that selection of the menu item MA21-1 is determined in a state in which the My Menu setting page MS21 is displayed as indicated by an arrow Q11 in FIG. 6. Furthermore, in FIG. 6, the same reference numeral will be given to a corresponding portion in the case in FIG. 4, and description thereof will be appropriately omitted.

As indicated by the arrow Q11, selection of the menu item MA21-1 on the My Menu setting page MS21 is determined, the display control unit 61 controls the display unit 25 on the basis of a signal supplied from the input unit 52 in correspondence with a selection determination operation, and allows the display unit 25 to display an addition item selection screen AS11 indicated by an arrow Q12.

Here, the addition item selection screen AS11 is a selection screen (page) that includes at least a part of one existing menu page, more specifically, a portion in which menu items of the existing menu page are displayed, and is used to select a menu item to be added to the My Menu page.

In this example, six menu items including a menu item MA31 are displayed on the addition item selection screen AS11, and the menu items are set to be the same as menu items which are displayed on a predetermined existing menu page. In addition, the menu items on the addition item selection screen AS11 are displayed in the same order as in a case on the predetermined existing menu page.

In other words, a list of the menu items displayed in the existing menu page is displayed on the addition item selection screen AS11.

A user can select a desired menu item that is desired to be newly added to the My Menu page by moving the cursor CU11 in an upper and lower direction on the addition item selection screen AS11 through an operation of the input unit 52, and in this example, the menu item MA31 is in a selection state.

In addition, the user can switch display in the display unit 25 to an addition item selection screen different from the addition item selection screen AS11 by giving an instruction for the page ejection by moving the cursor CU11 in a right and left direction in the drawing, that is, in a right and left direction with respect to a page that is illustrated through an operation of the input unit 52. In the imaging device 11, the addition item selection screen is displayed only in the same number as that of existing menu pages which are displayed. That is, display switching by the display control unit 61 is performed so that any one in one or a plurality of the addition item selection screens which respectively correspond to one or a plurality of the existing menu pages is displayed.

As described above, the user can designate one menu item that is added to the My Menu page from one or the plurality of existing menu pages by selecting a desired menu item from one or the plurality of addition item selection screens including the addition item selection screen AS11.

For example, when the menu item MA31 is selected from the addition item selection screen AS11 and selection thereof is determined, the display control unit 61 controls the display unit 25 on the basis of a signal that is supplied from the input unit 52 and corresponds to a user's operation to allow the display unit 25 to display an addition location selection screen LS11 indicated by an arrow Q13.

Here, the addition location selection screen LS11 is a selection screen (page) that includes at least a part of one My Menu page, more specifically, a portion in which menu items of the My Menu page are displayed, and is used to select a display position of a menu item to be added to the My Menu page.

In this example, a menu item MA32-1 to a menu item MA32-4, and a linear cursor CU21 for designating (selecting) a position of an addition destination of a menu item, that is, a position at which the menu item that is an addition target is displayed are displayed on the addition location selection screen LS11.

The menu item MA32-1 to the menu item MA32-4 on the addition location selection screen LS11 are set to be the same as menu items which are displayed on a predetermined My Menu page. In addition, the menu items on the addition location selection screen LS11 are displayed in the same order as in a case on a predetermined My Menu page. That is, menu items which are displayed on the predetermined My Menu page are displayed on the addition location selection screen LS11 in the same manner.

A user can select a desired position between menu items as a position of an addition destination of a menu item by moving the cursor CU21 in an upper and lower direction on the addition location selection screen LS11 through an operation of the input unit 52. In this example, a position between the menu item MA32-2 and the menu item MA32-3 is set as a selection state.

In addition, the user can switch display in the display unit 25 to an addition location selection screen different from the addition location selection screen LS11 by giving an instruction for the page ejection by moving the cursor CU21 in a right and left direction in the drawing, that is, in a right and left direction with respect to a page that is illustrated through an operation of the input unit 52. In the imaging device 11, the addition location selection screen is displayed only in the same number as that of My Menu pages which are displayed. That is, display switching by the display control unit 61 is performed so that any one in one or a plurality of the addition location selection screens which respectively correspond to one or a plurality of the My Menu pages is displayed.

As described above, the user can select a position of an addition destination of a menu item from positions on one or a plurality of the My Menu pages by selecting a desired location from positions of one or the plurality of addition location selection screens including the addition location selection screen LS11. That is, the user can select a My Menu page to which a menu item is added, and a display position of the menu item that is to be added on the My Menu page.

Selection of the position of the addition destination of the menu item from the addition location selection screen LS11 represents selection of a target position at which an operation of setting related to the menu item is performed to add the menu item to the My Menu page.

For example, it is assumed that a position between the menu item MA32-2 and the menu item MA32-3 is selected from positions on the addition location selection screen LS11, and the selection is determined.

In this case, the setting processing unit 62 updates a My Menu page corresponding to the addition location selection screen LS11 so that the menu item MA31 selected from the addition item selection screen AS11 is displayed at the position between the menu item MA32-2 and the menu item MA32-3 in the My Menu page. That is, the setting processing unit 62 updates My Menu page information of the My Menu page corresponding to the addition location selection screen LS11 to add the menu item MA31 to the My Menu page by updating, and to update the My Menu page.

When the My Menu page is updated, for example, as indicated by an arrow Q14, the display control unit 61 allows the display unit 25 to display an addition confirmation screen CN11 on which a character message "Added" is displayed to indicate addition of a new menu item to the My Menu page.

With this arrangement, the user can understand that a menu item selected by the user is added to a desired My Menu page.

In addition, when the addition confirmation screen CN11 is displayed, the display control unit 61 controls the display unit 25 to return display of the display unit 25 to the addition item selection screen AS11. That is, the display control unit 61 switches display in the display unit 25 from the addition confirmation screen CN11 to the addition item selection screen AS11.

With this arrangement, the user can add a new menu item to the My Menu page by performing an operation with respect to a newly displayed addition item selection screen AS11 or by appropriately giving an instruction for display switching to display another addition item selection screen.

That is, in the imaging device 11, when the operation of adding one menu item to the My Menu page is terminated, display returns to the addition item selection screen, and an operation of adding a next menu item to the My Menu page can be continuously performed.

Furthermore, in a state in which the addition item selection screen AS11 is displayed, for example, when the menu button 29 as the input unit 52 is operated, display of the display unit 25 returns to the My Menu setting page MS21. In addition, in a state in which the addition location selection screen LS11 is displayed, for example, when the menu button 29 as the input unit 52 is operated, display of the display unit 25 may return to the addition item selection screen AS11 or another page such as the My Menu setting page MS21.

In addition, here, description has been given of an example in which when selection of the position of the addition destination of a menu item is determined with the addition location selection screen LS11 and the like, the addition confirmation screen CN11 is displayed, but a determination button for performing confirmation of selection and a cancel button may be displayed on the addition confirmation screen CN11.

In this case, for example, when the determination button is operated, it is regarded that selection of the operation related to the addition of the menu item is determined, and the My Menu page information is updated. When the cancel button is operated, the selection operation may be cancelled. That is, in a case where the cancel button is operated, it is assumed that the My Menu page information is not updated, and an operation of adding a new menu item is not performed.

As described above, in the imaging device 11, when adding a new menu item to the My Menu page, the My Menu page that is an addition destination and a position of the addition destination of the menu item on the My Menu page can be simultaneously selected. In addition, after performing an operation of adding one menu item, an operation of adding another menu item can be continuously performed.

Accordingly, in the imaging device 11, it is possible to perform an operation of continuously adding a menu item by a number corresponding to the limit of the number of menu items capable of being registered, that is, (the page number of My Menu pages capable of being created×a registrable maximum number), and it is possible to improve convenience.

For example, in a case where a menu item for setting related to the My Menu page is displayed for every My Menu page, when performing addition of a menu item with respect to a plurality of the My Menu pages, convenience is poor.

The reason for this is because it is necessary to perform an operation of adding a menu item for every My Menu page. That is, it is necessary for every My Menu page to perform an operation of selecting a My Menu page for which addition of a menu item is performed, an operation of selecting the menu item for adding the menu item, an operation of selecting the menu item that is added, and an operation of selecting a position of an addition destination of the menu item, and thus the number of operation steps increases.

In addition, it is necessary to perform the operations for every My Menu page. Accordingly, first, a user considers a menu item to be added, and performs an operation of selecting a My Menu page to which the menu item is added. Then, the user performs an operation of actually selecting the menu item that is considered to be added. As a result, it is inconvenient.

In contrast, in the imaging device 11, after performing the operation of selecting the menu item MA21-1 for menu item addition at once, an operation of selecting a menu item to be added, and an operation of selecting a My Menu page that is an addition destination and a position of the addition destination may be repetitively performed only in a number corresponding to the number of menu items to be added. Accordingly, it is possible to add a menu item in a small number of operation steps in comparison to a case of performing an operation for every My Menu page, and thus it is possible to further improve convenience. In addition, in this case, it is possible to simultaneously select a My Menu page that is an addition destination of a menu item and a position, and it is possible to select an arbitrary My Menu page as a page of the addition destination from a plurality of the My Menu pages, and thus it is possible to improve convenience.

In addition, in the example indicated by the arrow Q13, the linear cursor CU21 is displayed on the addition location selection screen LS11, but more specifically, a display format of a cursor varies in correspondence with the number of menu items which are registered in a My Menu page corresponding to an addition location selection screen.

Figure 7:
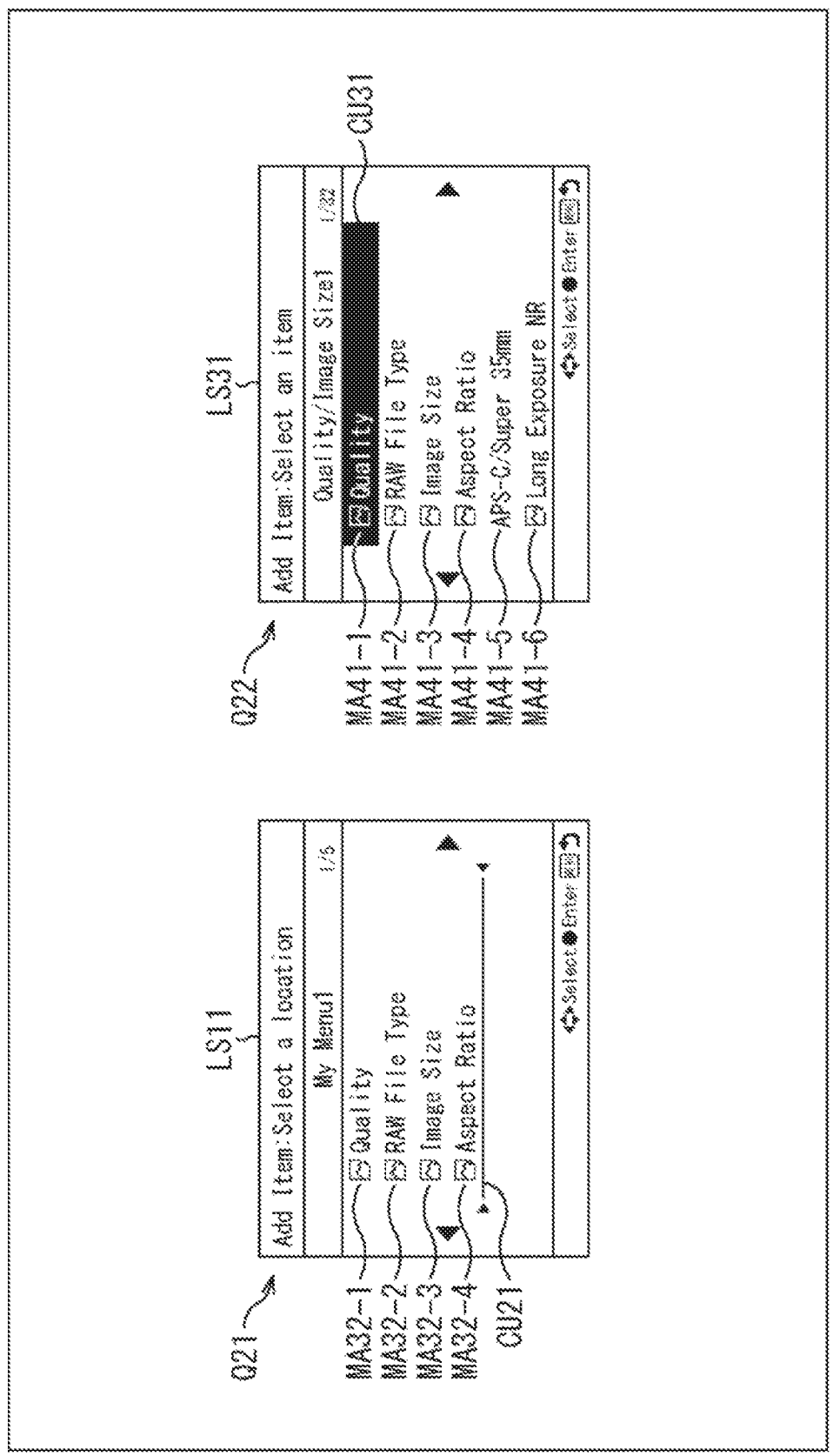
FIG. 7 is a view illustrating cursor display.

Specifically, for example, as indicated by an arrow Q21 in FIG. 7, it is assumed that four menu items, which are less than a registrable maximum number, that is, less than six, are displayed on the addition location selection screen LS11. That is, it is assumed that the number of menu items registered in a My Menu page corresponding to the addition location selection screen LS11 at a current point of time is less than the registrable maximum number. Furthermore, in FIG. 7, the same reference numeral will be given to a portion corresponding to the case in FIG. 6, and description thereof will be appropriately omitted.

As indicated by the arrow Q21 in FIG. 7, it is assumed that the number of menu items displayed on the addition location selection screen LS11 is less than the registrable maximum number, and a space for registering a new menu item exists yet in a My Menu page corresponding to the addition location selection screen LS11.

In this case, as described above with reference to FIG. 6, the linear cursor CU21 is displayed on the addition location selection screen LS11 as an instruction image for selecting a position of an addition destination of a menu item. In addition, a user selects a position between menu items, that is, an inter-row position as a position of an addition destination of a menu item by moving the cursor CU21.

When selection of the position of the addition destination is determined, the setting processing unit 62 updates registration information and display position information which are included in My Menu page information. That is, information indicating a newly added menu item is added to the registration information, and display position information is updated so that a display order of respective menu items becomes a display order after addition of the new menu item.

In contrast, for example, as indicated by an arrow Q22 in FIG. 7, it is assumed that six menu items as the registrable maximum number are displayed on an addition location selection screen LS31. That is, it is assumed that the number of menu items which are registered in a My Menu page corresponding to the addition location selection screen LS31 at a current point of time is the registrable maximum number.

As described above, in a case where a space for newly adding (registering) a menu item does not exist, a cursor CU31 with a display format different from that of the cursor CU21 is displayed on the addition location selection screen LS31.

In the example indicated by the arrow Q22, six menu items including a menu item MA41-1 to a menu item MA41-6 as the registrable maximum number, and a rectangular cursor CU31 are displayed on the addition location selection screen LS31.

The cursor CU31 is set as a rectangular indication image displayed to surround one menu item, and a position of the menu item MA41-1 is selected as a position of an addition destination of a new menu item by the cursor CU31.

In the example indicated by the arrow Q21, the cursor CU21 is configured to select (designate) a position between menu items as a position of an addition destination of a new menu item.

In contrast, in the example of the arrow Q22, the cursor CU31 is configured to select a position of a registered menu item on the addition location selection screen LS31, that is, on a My Menu page corresponding to the addition location selection screen LS31 as a position of an addition destination of a new menu item. The reason for this is because only six menu items to the maximum can be registered in the My Menu page, but six menu items as the registrable maximum number are already registered.

In this case, a position of the menu item selected by the cursor CU31 is selected as a position of an addition destination of a new menu item, and when the selection is determined, the setting processing unit 62 updates the My Menu page so that the menu item selected by the cursor CU31 is substituted with a menu item that is newly added on the My Menu page.

That is, in the example indicated by the arrow Q22, it is assumed that the position of the menu item MA41-1 is selected as the position of the addition destination of the new menu item, and the selection is determined.

In this case, information related to the menu item MA41-1 is included in the registration information and the display position information as the My Menu page information, and thus the setting processing unit 62 rewrites, that is, overwrites the information related to the menu item MA41-1 with information related to the newly added menu item to update the My Menu page information. Accordingly, when displaying the My Menu page after updating, the newly added menu item is displayed instead of the menu item MA41-1 at a position at which the menu item MA41-1 is displayed before updating.

As described above, in a case where the registration number of menu items in a My Menu page to which a menu item is newly added already reaches the registrable maximum number, any one of registered menu items is substituted with a newly added menu item, and thus it is possible to improve convenience.

For example, it is assumed that when performing an operation of adding a new menu item to a My Menu page, the registration number of menu items already reaches the registrable maximum number.

In this case, in a typical My Menu page, it is necessary for a user to stop an operation of adding a menu item at once, and to perform an operation of newly adding a menu item after performing an operation of deleting one among menu items registered in the My Menu page. Accordingly, until completing addition of a menu item, the number of operation steps such as returning increases.

In contrast, in the imaging device 11, through the operation of selecting a position of an addition destination of a menu item with the cursor CU31, it is possible to select the addition destination and it is possible to select deletion of a menu item among registered menu items at the same time, and thus the number of operation steps decreases. That is, an operation such as returning is not necessary, and it is possible to simply add a new menu item in a small number of operation steps, and thus it is possible to improve convenience.

Particularly, in the example, in correspondence with a registration situation of menu items in a My Menu page that is an addition destination of a new menu item, a cursor with a different display format is displayed on an addition location selection screen corresponding to the My Menu page, and thus it is possible to allow a user to simply understand the registration situation of the menu items in the My Menu page.

Furthermore, description has been given of an example in which any one of the linear cursor and the rectangular cursor is displayed as a cursor for selecting a position of an addition destination of a menu item, but the display format of the cursor may be an arbitrary format.

For example, with regard to a cursor indicating the position of the addition destination of the menu item, the position of the addition destination may be displayed in a highlight manner, the position of the addition destination or characters and the like in a menu item at the position may be displayed in a flickering manner. In addition, a frame of the cursor or characters and the like in a menu item within the cursor may be displayed in a different color in correspondence with a registration situation of menu items.

<Description of Addition Processing>

Figure 8:
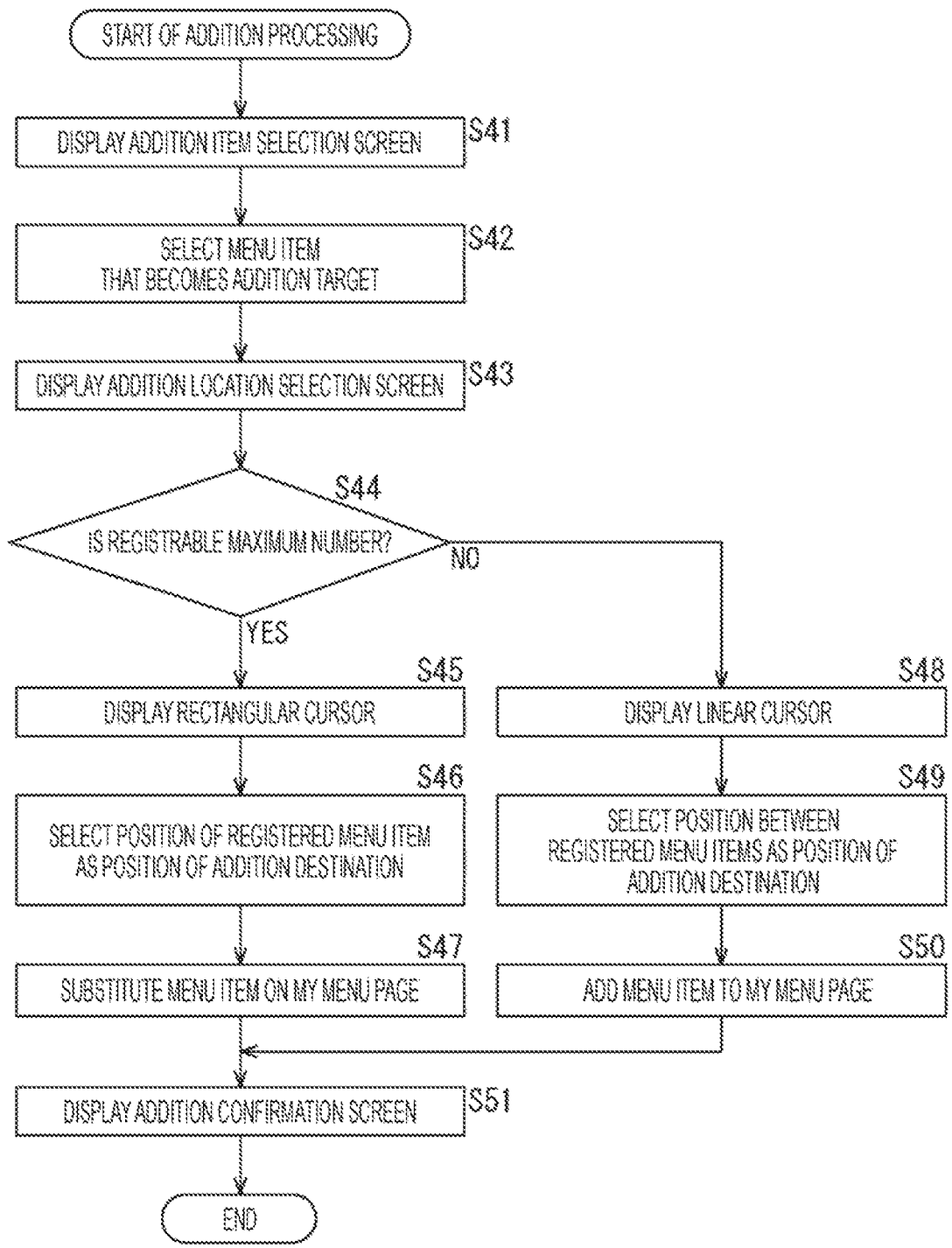
FIG. 8 is a flowchart illustrating addition processing.

Next, description will be given of processing that is performed by the imaging device 11 when adding a new menu item to the My Menu page as described above. That is, hereinafter, the addition processing by the imaging device 11 will be described with reference to a flowchart in FIG. 8.

Figure 5:
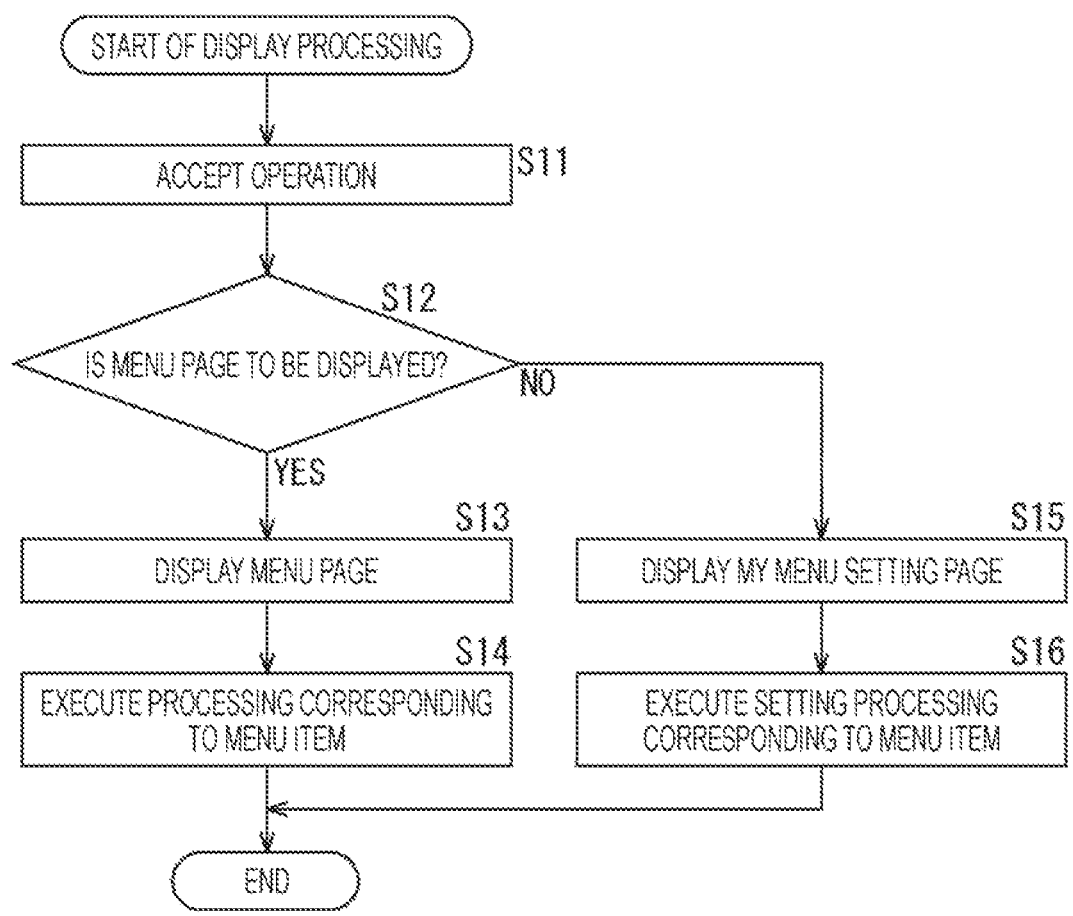
FIG. 5 is a flowchart illustrating display processing.

The addition processing is processing corresponding to step S16 in FIG. 5. For example, the addition processing is initiated when the My Menu setting page is displayed in step S15 in FIG. 5, and selection of a menu item for executing the addition function on the My Menu setting page is determined.

In step S41, the display control unit 61 controls the display unit 25 on the basis of a signal supplied from the input unit 52 in correspondence with a user's operation to allow the display unit 25 to display the addition item selection screen. With this arrangement, for example, the addition item selection screen AS11 illustrated in FIG. 6 is displayed on the display unit 25.

In step S42, the setting processing unit 62 selects a menu item selected by a cursor displayed on the addition item selection screen as a menu item that is set as an addition target to the My Menu page.

For example, a user can change a menu item to be selected by moving a cursor in an upper and lower direction on the addition item selection screen or can select a menu item on another addition item selection screen by performing a page ejection operation. In the example indicated by the arrow Q12 in FIG. 6, the menu item MA31 on the addition item selection screen AS11 is selected as a menu item as an addition target.

In addition, in a state in which a desired menu item is selected by the cursor, the user gives an instruction for determination of selection by performing an operation of the button 28 as the input unit 52, and the like. As a result, the setting processing unit 62 determines the menu item for which determination of selection is instructed as a newly added menu item, that is, a menu item that is set as an addition target.

In step S43, the display control unit 61 controls the display unit 25 with reference to the My Menu page information that is recorded in the setting processing unit 62 to allow the display unit 25 to display an addition location selection screen. With this arrangement, for example, the addition location selection screen LS11 illustrated in FIG. 6 is displayed. Furthermore, in a case where a plurality of the addition location selection screens exist, the user gives an instruction for display switching by performing a page ejection operation to allow a desired addition location selection screen to be displayed.

In step S44, the display control unit 61 determines whether or not the number of registered menu items of a My Menu page corresponding to the addition location selection screen displayed in step S43 is the registrable maximum number with reference to My Menu page information that is recorded in the setting processing unit 62.

In step S44, in a case where it is determined that the number is the registrable maximum number, in step S45, the display control unit 61 controls the display unit 25 to display a rectangular cursor on the addition location selection screen displayed in step S43. With this arrangement, for example, the rectangular cursor CU31 indicated by the arrow Q22 in FIG. 7 is displayed.

In step S46, the setting processing unit 62 selects a position of a registered menu item, which is selected by the cursor displayed on the addition location selection screen, of a My Menu page corresponding to the addition location selection screen as a position of an addition destination of a new menu item.

The user selects a desired menu item position on a desired addition location selection screen as a position of an addition destination with a cursor while displaying another addition location selection screen by appropriately performing the page ejection operation. Furthermore, more specifically, a display format of the cursor on the other addition location selection screen varies in correspondence with a registration situation of menu items in a My Menu page corresponding to the other addition location selection screen. In addition, the user gives an instruction for determination of selection of a position of the addition destination by performing an operation of the button 28 as the input unit 52, and the like. That is, the user gives an instruction for addition of a menu item with respect to the My Menu page.

As a result, the setting processing unit 62 determines a position of a menu item for which determination of selection is instructed as an addition destination of a new menu item.

In step S47, the setting processing unit 62 substitutes a menu item located at a position on the My Menu page for which selection is determined in step S46 with the menu item for which selection is determined in step S42 by updating the My Menu page information.

That is, the setting processing unit 62 performs setting processing of updating the My Menu page information so that the menu item on the My Menu page which is designated by the user is deleted, and the menu item that is an addition target is added to the position of the deleted menu item. With this arrangement, the My Menu page is updated.

As described above, when the My Menu page is updated, the subsequent processing proceeds to step S51.

In contrast, in step S44, in a case where it is determined the number is not the registrable maximum number, the processing proceeds to step S48.

In step S48, the display control unit 61 controls the display unit 25 to display a linear cursor on the addition location selection screen displayed in step S43. With this arrangement, for example, the linear cursor CU21 indicated by the arrow Q21 in FIG. 7 is displayed.

In step S49, the setting processing unit 62 selects a position between registered menu items, which is selected by the cursor displayed on the addition location selection screen, on a My Menu page corresponding to the addition location selection screen as a position of an addition destination of a new menu item.

The user selects a desired position between menu items on a desired addition location selection screen as a position of an addition destination with a cursor while displaying another addition location selection screen by appropriately performing the page ejection operation. Furthermore, more specifically, a display format of the cursor on the other addition location selection screen varies in correspondence with a registration situation of menu items in a My Menu page corresponding to the other addition location selection screen. In addition, the user gives an instruction for determination of selection of a position of the addition destination by performing an operation of the button 28 as the input unit 52, and the like. That is, the user gives an instruction for addition of a menu item with respect to the My Menu page.

As a result, the setting processing unit 62 determines a position for which determination of selection is instructed as an addition destination of a new menu item.

In step S50, the setting processing unit 62 adds a menu item for which selection is determined in step S42 to a position on the My Menu Page for which selection is determined in step S49 by updating the My Menu page information.

That is, the setting processing unit 62 updates the My Menu page by performing setting processing of updating the My Menu page information so that a menu item that is an addition target is added to a position on the My Menu page which is designated by the user.

As described above, when the My Menu page is updated, the subsequent processing proceeds to step S51.

When the My Menu page is updated by performing the processing in step S47 or step S50, in step S51, the display control unit 61 controls the display unit 25 to allow the display unit 25 to display an addition confirmation screen, and the addition processing is terminated.

With this arrangement, for example, the addition confirmation screen CN11 illustrated in FIG. 6 is displayed. When the addition confirmation screen is displayed, the display control unit 61 allows the display unit 25 to display an addition item selection screen to continuously perform the processing of adding a new menu item. That is, when the addition confirmation screen is displayed in step S51, new addition processing is subsequently initiated, and an addition item selection screen is displayed on the display unit 25.

As described above, the imaging device 11 determines a menu item that is set as an addition target and a position of an addition destination of the menu item in correspondence with a user's operation, and adds the menu item to the My Menu page. In addition, when displaying the addition location selection screen for determining a position of the addition destination of the menu item, the imaging device 11 displays a cursor in a display format corresponding to a registration situation of menu items in a My Menu page corresponding to the addition location selection screen, and adds a menu item to the My Menu page in correspondence with the registration situation.

With this arrangement, it is possible to simply add the menu item in a small number of operation steps, and it is possible to improve convenience of the imaging device 11.

<With Regard to Sorting of Menu Item>

Next, description will be given of a case where processing for realizing a sorting function of sorting menu items on the My Menu page as another specific example of the setting processing that is performed in step S16 in FIG. 5.

Figure 9:
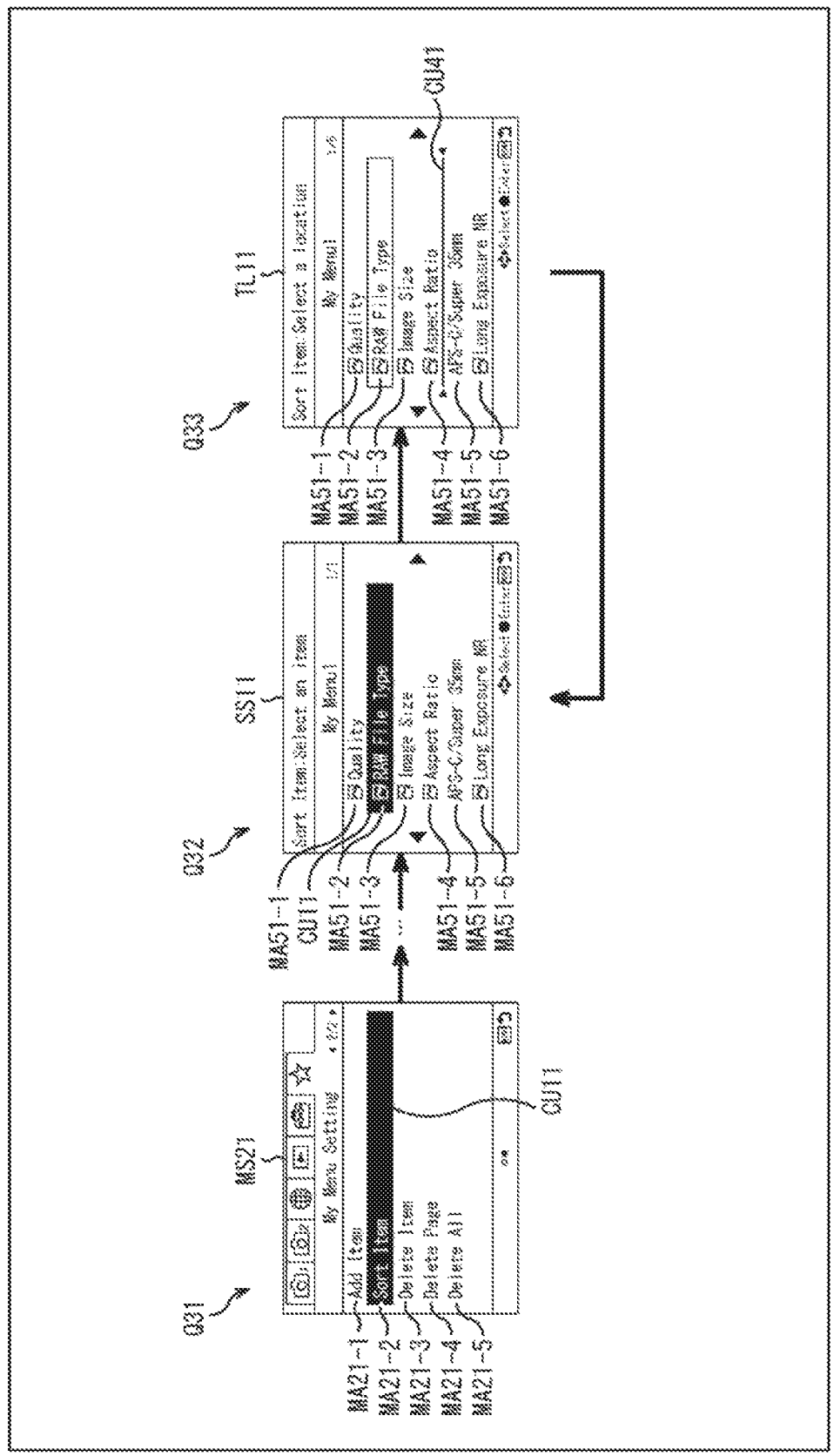
FIG. 9 is a view illustrating sorting of menu items.

For example, it is assumed that selection of the menu item MA21-2 is determined in a state in which the My Menu setting page MS21 is displayed as indicated by an arrow Q31 in FIG. 9. Furthermore, in FIG. 9, the same reference numeral will be given to a corresponding portion in the case in FIG. 4, and description thereof will be appropriately omitted.

As indicated by the arrow Q31, when selection of the menu item MA21-2 on the My Menu setting page MS21 is determined, the display control unit 61 controls the display unit 25 on the basis of a signal supplied from the input unit 52 in correspondence with an operation of selection determination to allow the display unit 25 to display a movement item selection screen SS11 indicated by an arrow Q32.

Here, the movement item selection screen SS11 is a selection screen (page) that includes at least a part of one My Menu page, more specifically, a portion in which menu items of the My Menu page are displayed, and is used to select a menu item to be moved to the same or another My Menu page. That is, the movement item selection screen SS11 is a selection screen for selecting a menu item of a movement source.

In this example, six menu items including a menu item MA51-1 to a menu item MA51-6 are displayed on the movement item selection screen SS11. The menu item MA51-1 to the menu item MA51-6 are set to be the same as menu items which are displayed on a predetermined My Menu page, that is, menu items which are registered in the My Menu page at a current point of time. In addition, the menu items on the movement item selection screen SS11 are displayed in the same order as in a case on the predetermined My Menu page.

In other words, a list of the menu items displayed in the My Menu page is displayed on the movement item selection screen SS11.

A user can select a desired menu item to be moved on the My Menu page by moving the cursor CU11 in an upper and lower direction on the movement item selection screen SS11 through an operation of the input unit 52, and in this example, the menu item MA51-2 is in a selection state.

In addition, the user can switch display in the display unit 25 to a movement item selection screen different from the movement item selection screen SS11 by giving an instruction for the page ejection by moving the cursor CU11 in a right and left direction in the drawing, that is, in a right and left direction with respect to a page that is illustrated through an operation of the input unit 52. In the imaging device 11, the movement item selection screen is displayed only in the same number as that of My Menu pages which are displayed. That is, display switching by the display control unit 61 is performed so that any one in one or a plurality of the movement item selection screens which respectively correspond to one or a plurality of the My Menu pages is displayed.

As described above, the user can designate one menu item that is set as a movement target from one or the plurality of My Menu pages by selecting a desired menu item from one or the plurality of movement item selection screens including the movement item selection screen SS11.

For example, when the menu item MA51-2 is selected from the movement item selection screen SS11 and selection thereof is determined, the display control unit 61 controls the display unit 25 on the basis of a signal that is supplied from the input unit 52 and corresponds to a user's operation to allow the display unit 25 to display a movement location selection screen TL11 indicated by an arrow Q33.

Here, the movement location selection screen TL11 is a selection screen (page) that includes at least a part of one My Menu page, more specifically, a portion in which menu items of the My Menu page are displayed, and is used to select a display position of a menu item to be moved to the My Menu page. That is, the movement location selection screen TL11 is a selection screen for selecting a position of a movement destination of the menu item.

In this example, the menu item MA51-1 to the menu item MA51-6, and a linear cursor CU41 for designating (selecting) a position of a movement destination of a menu item, that is, a position at which the menu item that is a movement target is displayed are displayed on the movement location selection screen TL11.

The menu item MA51-1 to the menu item MA51-6 on the movement location selection screen TL11 are set to be the same as menu items which are displayed on a predetermined My Menu page. In addition, the menu items on the movement location selection screen TL11 are displayed in the same order as in a case on a predetermined My Menu page. That is, menu items which are displayed on the predetermined My Menu page are displayed on the movement location selection screen TL11 in the same manner.

Particularly, in this example, a My Menu page corresponding to the movement location selection screen TL11, and a My Menu page corresponding to the movement item selection screen SS11 are the same as each other, and thus the same menu items are displayed on the movement location selection screen TL11 and the movement item selection screen SS11.

In addition, on the movement location selection screen TL11, the menu item MA51-2 is surrounded by a predetermined rectangular frame to easily understand a situation in which the menu item MA51-2 is a movement source in the movement item selection screen SS11, that is, a menu item that is selected as a movement target. That is, the Menu item MA51-2 is displayed in a display format different from that of other menu items.

The user can select a desired position between menu items as a position of a movement destination of a menu item by moving a cursor CU41 in an upper and lower direction on the movement location selection screen TL11 through an operation of the input unit 52. In this example, a position between the menu item MA51-4 and the menu item MA51-5 is set as a selection state.

In addition, the user can switch display in the display unit 25 to another movement location selection screen different from the movement location selection screen TL11 by giving an instruction for a page ejection by moving the cursor CU41 in a right and left direction in the drawing, that is, a right and left direction with respect to a page that is displayed through an operation of the input unit 52. In the imaging device 11, the movement location selection screen is displayed in the same number as that of My Menu pages which are displayed. That is, display switching by the display control unit 61 is performed so that any one in one or a plurality of the movement location selection screens which respectively correspond to one or a plurality of the My Menu pages is displayed.

As described above, the user can select a position of a movement destination of a menu item from one or the plurality of My Menu pages by selecting a desired position from positions on one or the plurality of movement location selection screens including the movement location selection screen TL11. That is, the user can simultaneously select a My Menu page that is a movement destination of the menu item, and the position of the movement destination of the menu item on the My Menu page.

Selection of the position of the movement destination of the menu item from the movement location selection screen TL11 represents selection of a target position at which an operation of setting related to the menu item is performed to move the menu item on the My Menu page.

For example, it is assumed that a position between the menu item MA51-4 and the menu item MA51-5 is selected from positions on the movement location selection screen TL11, and the selection is determined.

In this case, the setting processing unit 62 updates a My Menu page corresponding to the movement item selection screen SS11 so that the menu item MA51-2 selected as a movement target on the My Menu page is deleted.

Simultaneously, the setting processing unit 62 updates the My Menu page corresponding to the movement location selection screen TL11 so that the menu item MA51-2 selected from the movement item selection screen SS11 is displayed at a position between the menu item MA51-4 and the menu item MA51-5 in the My Menu page.

That is, the setting processing unit 62 moves the menu item MA51-2 and updates the My Menu page by updating My Menu page information of the My Menu page corresponding to the movement item selection screen SS11 and the movement location selection screen TL11.

Accordingly, in this example, in the My Menu page corresponding to the movement item selection screen SS11 and the movement location selection screen TL11, a display order is updated so that the menu item MA51-1, the menu item MA51-3, the menu item MA51-4, the menu item MA51-2, the menu item MA51-5, and the menu item MA51-6 are arranged in this order from a page upper side. That is, sorting of the menu items is performed.

Furthermore, even in the movement location selection screen, as in the case of the above-described addition location selection screen, a linear cursor or a rectangular cursor is displayed in correspondence with the number of registered menu items of the My Menu page corresponding to the movement location selection screen.

That is, the linear cursor is displayed in a case where the number of the registered menu items of the My Menu page corresponding to the movement location selection screen is less than the registrable maximum number, and the rectangular cursor is displayed in an opposite case.

However, in a case where the My Menu page corresponding to the movement location selection screen and the My Menu page corresponding to the movement item selection screen are the same as each other, it is assumed that the number of the registered menu items of the My Menu page is less than the registrable maximum number. The reason for this is as follows. At a point of time before determination of a menu item set as a movement target, even in a case where the number of the registered menu items of the My Menu page is the registrable maximum number, at a point of time at which the menu item set as the movement target is determined, there is a room for the number of menu items capable of being registered in the My Menu page. Accordingly, in this case, it is assumed that the number of the registered menu items of the My Menu page corresponding to the movement location selection screen is less than the registrable maximum number, and the linear cursor is displayed.

In addition, in a case where the rectangular cursor is displayed on the movement location selection screen, as in the addition of the menu item, in movement of the menu item, a menu item located at a position of the rectangular cursor is substituted with a menu item that is a movement target.

Furthermore, with regard to the cursor for selecting the position of the movement destination of the menu item that is displayed on the movement location selection screen, as in the cursor for selecting the position of the addition destination of the menu item, the cursor may be an arbitrary cursor as long as the cursor is displayed in a different display format in corresponding to the registration situation of the menu item. That is, an arbitrary format such as highlight display, flickering display, and display in a different color may be adopted without limitation to the linear or rectangular cursor.

When the My Menu page of the movement source and the movement destination is updated, the display control unit 61 controls the display unit 25 to return display of the display unit 25 to the movement item selection screen SS11. That is, the display control unit 61 switches display in the display unit 25 from the movement location selection screen TL11 to the movement item selection screen SS11.

With this arrangement, the user can move a new menu item by performing an operation with respect to a movement item selection screen SS11 that is newly displayed, or by appropriately giving an instruction for display switching to display another movement item selection screen.

That is, in the imaging device 11, when an operation of moving one menu item on the My Menu page is terminated, display returns to the movement item selection screen, and it is possible to continuously perform an operation of moving a next menu item.

In a state in which the movement item selection screen SS11 is displayed, for example, when the menu button 29 as the input unit 52 is operated, display of the display unit 25 returns to the My Menu setting page MS21. In addition, in a state in which the movement location selection screen TL11 is displayed, for example, the menu button 29 as the input unit 52 is operated, display of the display unit 25 may return to the movement item selection screen SS11 or may return to another page such as the My Menu setting page MS21.

In addition, description has been given of an example in which when selection of the position of the movement destination of the menu item is determined by the movement location selection screen TL11 and the like, display returns to the movement item selection screen SS11, but as in addition of the menu item, a sorting confirmation screen of the menu item may be displayed. In addition, a determination button for performing confirmation of selection, and a cancel button may be displayed on the sorting confirmation screen of the menu item.

As described above, in the imaging device 11, when moving a menu item on a My Menu page, with respect to each of a movement source and a movement destination, a My Menu page that is set as a target, and a movement source or a movement destination can be simultaneously selected.

Particularly, in this case, an arbitrary position can be selected as a movement destination from all My Menu pages. Accordingly, for example, it is possible to move a menu item in a small number of operation steps in comparison to a case of performing setting for every My Menu page, and thus it is possible to further improve convenience.

In addition, in the imaging device 11, after performing an operation of moving one menu item, an operation of moving another menu item can be continuously performed, and thus it is possible to move a plurality of menu items in a small number of steps as in addition of a menu item.

In addition, in the imaging device 11, when selecting a position of a movement destination of a menu item, a display format of a cursor for selecting a position of the movement destination of the menu item and processing in movement vary in correspondence with a registration situation of menu items in a My Menu page set as a movement destination.

Particularly, in the imaging device 11, it is possible to select the movement destination through an operation of selecting the position of the movement destination of the menu item with the rectangular cursor and it is possible to select deletion of a menu item among registered menu items at the same time, and thus the number of operation steps decreases. That is, an operation such as returning is not necessary, and it is possible to move a menu item through a relatively simple operation and in a small number of operation steps, and thus it is possible to improve convenience.

<Description of Sorting Processing>

Next, description will be given of processing that is performed by the imaging device 11 when moving a menu item on a My Menu page to a position on an arbitrary My Menu page as described above.

Figure 10:
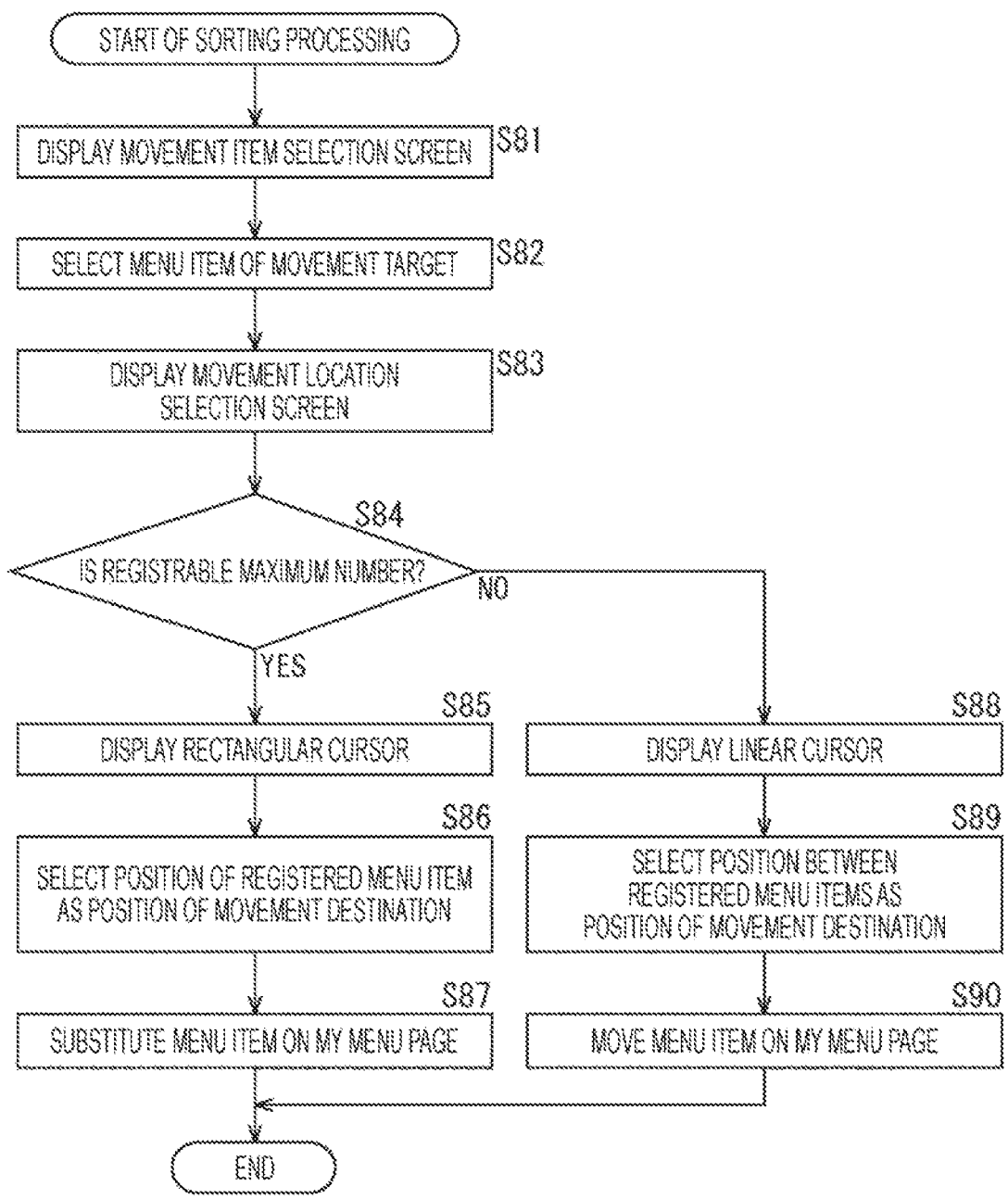
FIG. 10 is a flowchart illustrating sorting processing.

That is, the sorting processing by the imaging device 11 will be described with reference to a flowchart in FIG. 10. The sorting processing is processing corresponding to step S16 in FIG. 5, and is initiated, for example, when the My Menu setting page is displayed in step S15 in FIG. 5, and selection of a menu item for executing a sorting function on the My Menu setting page is determined.

In step S81, the display control unit 61 controls the display unit 25 on the basis of a signal supplied from the input unit 52 in correspondence with a user's operation to allow the display unit 25 to display a movement item selection screen. With this arrangement, for example, the movement item selection screen SS11 illustrated in FIG. 9 is displayed on the display unit 25.

In step S82, the setting processing unit 62 selects a menu item that is selected by a cursor displayed on the movement item selection screen as a menu item that is a movement target, that is, a menu item that is a movement source.

For example, a user can change a menu item to be selected by moving a cursor on the movement item selection screen in an upper and lower direction or can select a menu item on another movement item selection screen by performing a page ejection operation.

In addition, in a state in which a desired menu item is selected by the cursor, the user gives an instruction for determination of selection by performing an operation of the button 28 as the input unit 52, and the like. As a result, the setting processing unit 62 determines the menu item for which determination of selection is instructed as a menu item that is a movement target.

In addition, the setting processing unit 62 temporarily reduces the number of menu items registered in a My Menu page in which the menu item as the movement target exists from a number at a current point of item by "1". With this arrangement, in a case where a My Menu page in which the menu item as the movement target exists and a My Menu page corresponding to the movement location selection screen are the same as each other, in step S84 to be described later, determination as the registrable maximum number is not made.

In step S83, the display control unit 61 controls the display unit 25 to allow the display unit 25 to display a movement location selection screen. With this arrangement, for example, the movement location selection screen TL11 illustrated in FIG. 9 is displayed. Furthermore, in a case where a plurality of the movement location selection screens exist, the user can allow a desired movement location selection screen to be displayed by giving an instruction for display switching through a page ejection operation.

In step S84, the display control unit 61 determines whether or not the number of registered menu items of a My Menu page corresponding to the movement location selection screen displayed in step S83 is the registrable maximum number with reference to My Menu page information that is recorded in the setting processing unit 62.

In step S84, in a case where it is determined that the number is the registrable maximum number, in step S85, the display control unit 61 controls the display unit 25 to display a rectangular cursor on the movement location selection screen displayed in step S83. With this arrangement, for example, the rectangular cursor CU31 indicated by the arrow Q22 in FIG. 7 is displayed.

In step S86, the setting processing unit 62 selects a position of a registered menu item, which is selected by the cursor displayed on the movement location selection screen, of a My Menu page corresponding to the movement location selection screen as a position of a movement destination of a menu item.

The user selects the desired position of the menu item on the movement location selection screen as a position of the movement destination by the cursor. In addition, the user gives an instruction for determination of selection of a position of the movement destination by performing an operation of the button 28 as the input unit 52, and the like. That is, the user gives an instruction for movement (sorting) of the menu item in the My Menu page. As a result, the setting processing unit 62 determines the position of the menu item for which determination of selection is instructed as the position of the movement destination of the menu item.

Furthermore, more specifically, when selecting the position of the movement destination, the user can select the position of the movement destination of the menu item while displaying another movement location selection screen by appropriately performing the page ejection operation.

In step S87, the setting processing unit 62 substitutes a menu item located at a position on the My Menu page for which selection is determined in step S86 with the menu item for which selection is determined in step S82 by updating the My Menu page information.

That is, the setting processing unit 62 updates the My Menu page information of the My Menu page in which the menu item as the movement target exists so that the menu item designated as the movement target is deleted on the original My Menu page.

In addition, the setting processing unit 62 updates the My Menu page information so that the menu item designated as the movement destination on the My Menu page is deleted, and the menu item that is the movement target is added to the position of the deleted menu item.

As described above, as setting processing, the setting processing unit 62 performs processing of updating My Menu page information of a My Menu page in which the menu item as the movement target exists, and My Menu page information of a My Menu page that is the movement destination of the menu item, thereby updating the My Menu page. That is, sorting of menu items in the My Menu page is performed. When the My Menu page is updated, the sorting processing is terminated.

In contrast, in step S84, in a case where it is determined that the number is not the registrable maximum number, the processing proceeds to step S88.

In step S88, the display control unit 61 controls the display unit 25 to display a linear cursor on the movement location selection screen displayed in step S83. With this arrangement, for example, the linear cursor CU21 indicated by the arrow Q21 in FIG. 7 is displayed.

In step S89, the setting processing unit 62 selects a position between registered menu items, which is selected by the cursor displayed on the movement location selection screen, on a My Menu page corresponding to the movement location selection screen as a position of a movement destination of a menu item.

The user selects a desired position between menu items on the movement location selection screen by a cursor as the position of the movement destination. In addition, the user gives an instruction for determination of selection of the position of the movement destination through an operation of the button 28 as the input unit 52, and the like. That is, the user gives an instruction for movement (sorting) of menu items in the My Menu page. As a result, the setting processing unit 62 determines the position for which determination of selection is instructed as the position of the movement destination of the menu item.

Furthermore, more specifically, when selecting of the position of the movement destination, the user can select the position of the movement destination of the menu item while displaying another movement location selection screen by appropriately performing the page ejection operation.

In step S90, the setting processing unit 62 moves the menu item for which selection is determined in step S82 to a position on the My Menu page for which selection is determined in step S89 by updating the My Menu page information.

That is, the setting processing unit 62 updates the My Menu page information of the My Menu page in which the menu item as the movement target exists so that the menu item designated as the movement target is deleted on the original My Menu page. In addition, the setting processing unit 62 updates the My Menu page information so that the menu item that is the movement target is added to a position on the My Menu page which is designated as the movement destination by the user.

As described above, as setting processing, the setting processing unit 62 performs processing of updating My Menu page information of a My Menu page in which the menu item as the movement target exists, and My Menu page information of a My Menu page that is the movement destination of the menu item, thereby updating the My Menu page. That is, sorting of menu items in the My Menu page is performed. When the My Menu page is updated, the sorting processing is terminated.

When the processing in step S87 or step S90 is performed and the sorting processing is terminated, the display control unit 61 allows the display unit 25 to display the movement item selection screen to continuously perform processing of moving a new menu item. That is, when the menu item is moved, new sorting processing is subsequently initiated, and the movement item selection screen is displayed on the display unit 25.

As described above, the imaging device 11 determines a menu item that is set as a movement target, and a position of a movement destination of the menu item in correspondence with a user's operation, and moves a menu item on the My Menu page. That is, sorting of the menu item is performed.

In addition, when displaying the movement location selection screen for determining the position of the movement destination of the menu item, the imaging device 11 displays a cursor in a display format corresponding to a registration situation of menu items in a My Menu page corresponding to the movement location selection screen, and moves the menu item to the My Menu page in correspondence with the registration situation.

With this arrangement, it is possible to simply perform sorting of menu items in a small number of operation steps, and it is possible to improve convenience of the imaging device 11.

<With Regard to Deletion of Menu Item>

In addition, description will be given of a case where processing of realizing a menu item deletion function of deleting a menu item in a My Menu page as another specific example of the setting processing that is performed in step S16 in FIG. 5.

Figure 11:
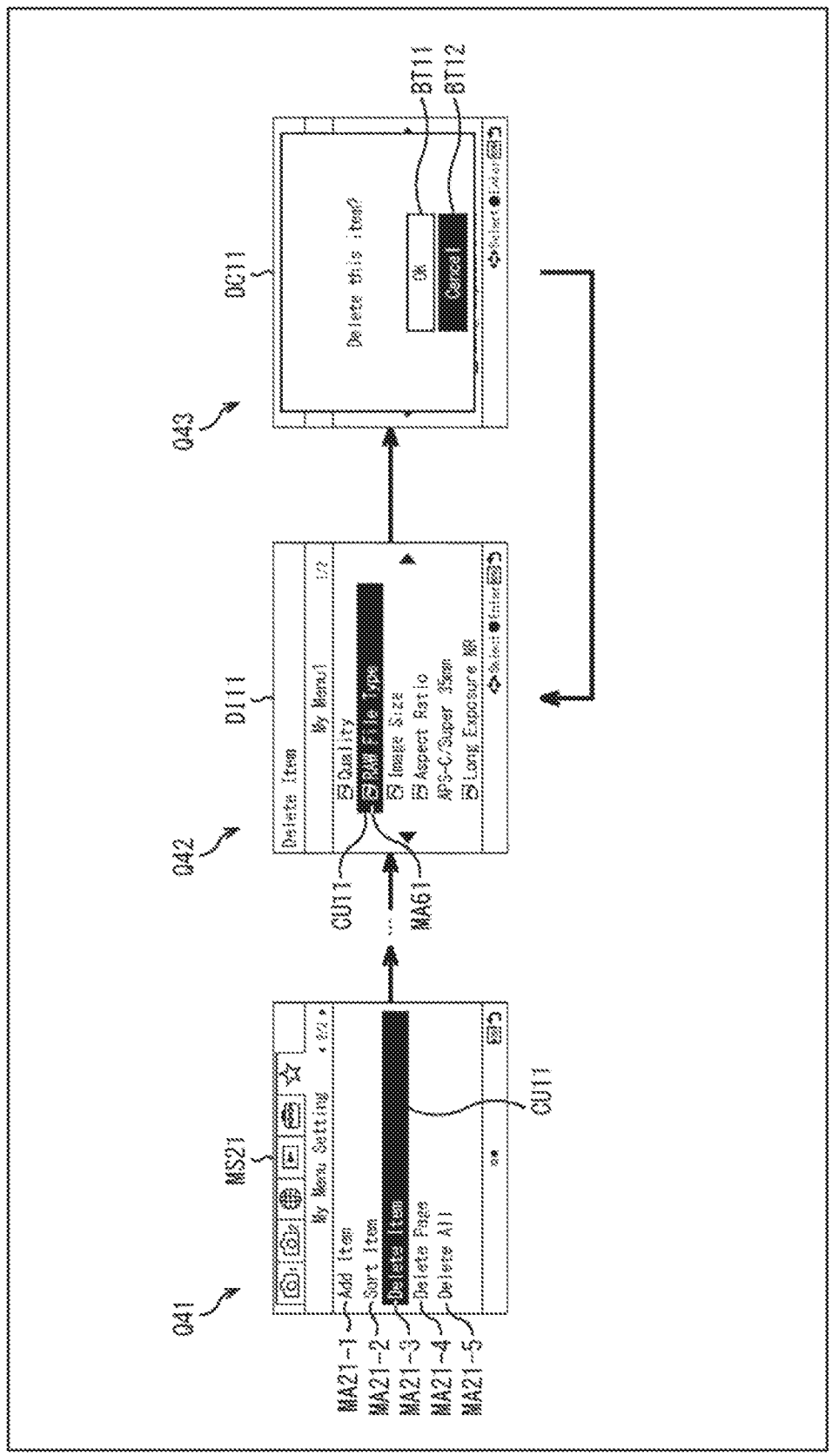
FIG. 11 is a view illustrating deletion of the menu items.

For example, it is assumed that selection of the menu item MA21-3 is determined in a state in which the My Menu setting page MS21 is displayed as indicated by an arrow Q41 in FIG. 11. Furthermore, in FIG. 11, the same reference numeral will be given to a corresponding portion in the case in FIG. 4, and description thereof will be appropriately omitted.

As indicated by the arrow Q41, when selection of the menu item MA21-3 on the My Menu setting page MS21 is determined, the display control unit 61 controls the display unit 25 on the basis of a signal supplied from the input unit 52 in correspondence with an operation of selection determination to allow the display unit 25 to display a deletion item selection screen DI11 indicated by an arrow Q42.

Here, the deletion item selection screen DI11 is a selection screen (page) that includes at least a part of one My Menu page, more specifically, a portion in which menu items of the My Menu page are displayed, and is used to select a display position of a menu item to be deleted from the My Menu page.

In this example, six menu items including a menu item MA61 are displayed on the deletion item selection screen DI11, and the menu items are set to be the same as menu items which are displayed on a predetermined My Menu page. In addition, the menu items on the deletion item selection screen DI11 are displayed in the same order as in a case on the predetermined My Menu page.

In other words, a list of the menu items displayed in the My Menu page is displayed on the deletion item selection screen DI11.

A user can select a desired menu item that is desired to be deleted, that is, a position of a menu item to be deleted by moving the cursor Cu11 in an upper and lower direction on the deletion item selection screen DI11 through an operation of the input unit 52. In this example, the menu item MA61 is in a selection state.

In addition, the user can switch display in the display unit 25 to a deletion item selection screen different from the deletion item selection screen DI11 by giving an instruction for the page ejection by moving the cursor CU11 in a right and left direction in the drawing, that is, in a right and left direction with respect to a page that is illustrated through an operation of the input unit 52. In the imaging device 11, the deletion item selection screen is displayed only in the same number as that of My Menu pages which are displayed. That is, display switching by the display control unit 61 is performed so that any one in one or a plurality of the deletion item selection screens which respectively correspond to one or a plurality of the My Menu pages is displayed.

As described above, the user can designate one menu item that is deleted from one or the plurality of My Menu pages by selecting a desired menu item from one or the plurality of deletion item selection screens including the deletion item selection screen DI11.

Selection of the menu item to be deleted from the deletion item selection screen DI11 represents selection of a target position at which an operation of setting related to the menu item is performed to delete the menu item from the My Menu page.

For example, when the menu item MA61 is selected from the deletion item selection screen DI11, and the selection is determined, the display control unit 61 controls the display unit 25 on the basis of a signal that is supplied from the input unit 52 and corresponds to a user's operation to allow the display unit 25 to display a deletion confirmation screen DC11 indicated by an arrow Q43.

Here, the deletion confirmation screen DC11 is a screen for confirming that a menu item determined as a deletion target may be deleted. In this example, a character message for confirming deletion "Delete this item?", an OK button BT11, and a cancel button BT12 are displayed on the deletion confirmation screen DC11.

When the OK button BT11 is operated by a user, the setting processing unit 62 deletes the menu item that is selected as a deletion target and the selection is determined from the My Menu page.

For example, it is assumed that the menu item MA61 is selected on the deletion item selection screen DI11, the selection is determined, and the OK button BT11 is operated. In this case, the setting processing unit 62 updates My Menu page information of a My Menu page so that the menu item MA61 is deleted from the My Menu page corresponding to the deletion item selection screen DI11.

When the OK button BT11 is operated, and the menu item is deleted, the display control unit 61 controls the display unit 25 to return display of the display unit 25 to the deletion item selection screen DI11. That is, the display control unit 61 switches display in the display unit 25 from the deletion confirmation screen DC11 to the deletion item selection screen DI11.

With this arrangement, the user can delete a new menu item from the My Menu page by performing an operation with respect to a deletion item selection screen DI11 that is newly displayed, or by appropriately giving an instruction for display switching to display another deletion item selection screen.

That is, in the imaging device 11, when an operation of deleting one menu item from the My Menu page is terminated, display returns to the deletion item selection screen, and it is possible to continuously perform an operation of deleting a next menu item from the My Menu page.

Furthermore, in a state in which the deletion item selection screen DI11 is displayed, for example, when the menu button 29 as the input unit 52 is operated, display of the display unit 25 returns to the My Menu setting page MS21.

In contrast, in a case where the cancel button BT12 displayed on the deletion confirmation screen DC11 is operated, the setting processing unit 62 releases determination of selection of the menu item that is set as a deletion target. That is, deletion of the menu item is cancelled.

When the cancel button BT12 is operated, and thus deletion of the menu item is cancelled, the display control unit 61 controls the display unit 25 to return display of the display unit 25 to the deletion item selection screen DI11. With this arrangement, the user can perform selection of a menu item that is set as a deletion target again.

Furthermore, in a case where the cancel button BT12 is operated, display may be returned to another page such as the My Menu setting page MS21 instead of being returned to the deletion item selection screen DI11.

As described above, in the imaging device 11, when deleting a registered menu item from the My Menu page, it is possible to select a menu item that is set as a deletion target from all My Menu pages. In addition, after performing an operation of deleting one menu item, it is possible to continuously perform an operation of deleting another menu item.

Accordingly, in the imaging device 11, it is possible to continuously delete an arbitrary number of menu items from all My Menu pages in a small number of operation steps, and it is possible to improve convenience.

For example, in a case where a menu item for setting related to the My Menu page is displayed for every My Menu page, first, it is necessary to designate a deletion operation after selecting the My Menu page, and then it is necessary to select a menu item that is set as a deletion target. In addition, when deleting a menu item on another different My Menu page, it is necessary to perform the above-described operation again, and thus the number of operation steps increases.

In contrast, in the imaging device 11, after performing an operation of selecting a menu item for deflecting a menu item, an operation of selecting a desired menu item as a deletion target from all My Menu pages may be repetitively performed. Accordingly, it is possible to delete a menu item in a small number of operation steps in comparison to a case of performing an operation for every My Menu page, and it is possible to improve convenience.

<Description of Deletion Processing>

Next, description will be given of processing by the imaging device 11 when deleting a menu item on the My Menu page as described above.

Figure 12:
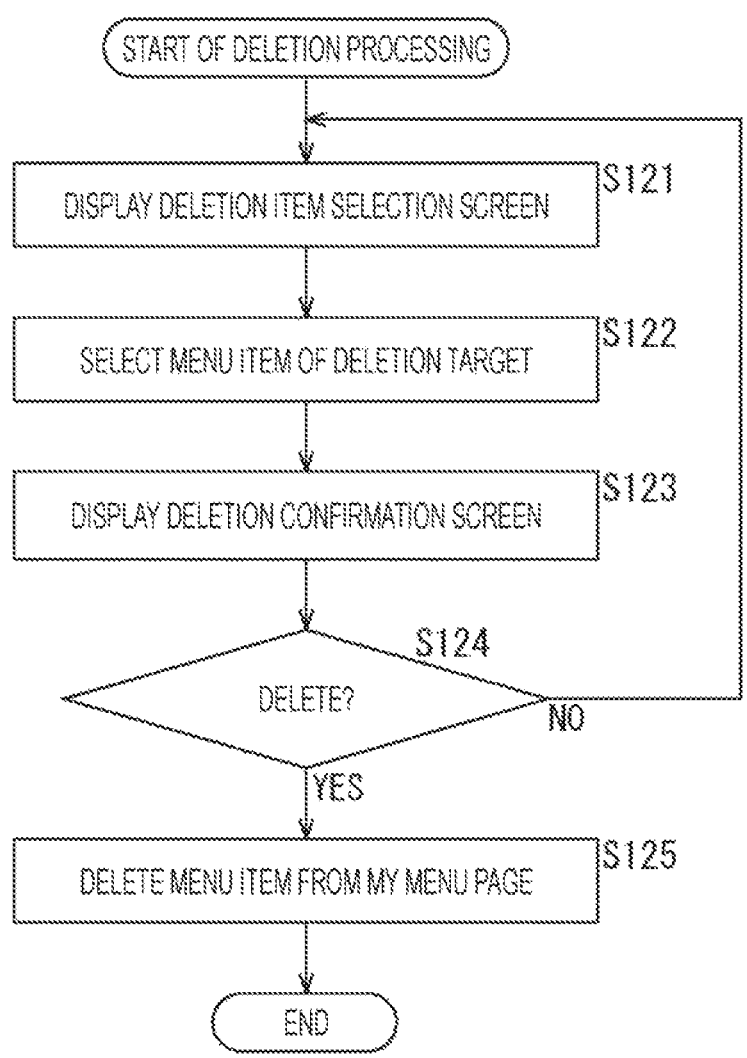
FIG. 12 is a flowchart illustrating deletion processing.

That is, hereinafter, a deletion processing by the imaging device 11 will be described with reference to a flowchart in FIG. 12. The deletion processing is processing corresponding to step S16 in FIG. 5, and the deletion processing is initiated, for example, when the My Menu setting page is displayed in step S15 in FIG. 5, and selection of a menu item for executing a menu item deletion function on the My Menu setting page is determined.

In step S121, the display control unit 61 controls the display unit 25 on the basis of a signal supplied from the input unit 52 in correspondence with a user's operation to allow the display unit 25 to display a deletion item selection screen. With this arrangement, for example, the deletion item selection screen DI11 illustrated in FIG. 11 is displayed.

In step S122, the setting processing unit 62 selects a menu item that is selected by a cursor displayed on a deletion item selection screen as a menu item that is a deletion target.

For example, a user can change a menu item to be selected by moving a cursor on the deletion item selection screen in an upper and lower direction or can select a menu item on another deletion item selection screen by performing a page ejection operation.

In addition, in a state in which a desired menu item is selected by the cursor, the user gives an instruction for determination of selection by performing an operation of the button 28 as the input unit 52, and the like. As a result, the setting processing unit 62 determines the menu item for which determination of selection is instructed as a menu item to be deleted, that is a menu item set as a deletion target.

In step S123, the display control unit 61 controls the display unit 25 to allow the display unit 25 to display a deletion confirmation screen. With this arrangement, for example, the deletion confirmation screen DC11 illustrated in FIG. 11 is displayed.

When the deletion confirmation screen is displayed, the user operates the OK button or the cancel button on the deletion confirmation screen by operating the input unit 52. That is, the user gives an instruction for deletion of the menu item in the My Menu page or cancellation of a deletion operation.

In step S124, the setting processing unit 62 determines whether or not to delete the menu item on the basis of a signal supplied from the input unit 52 in correspondence with a user's operation. For example, in a case where the OK button on the deletion confirmation screen is operated, it is determined that the menu item is deleted.

In step S124, in a case where it is determined that the menu item is not deleted, that is, in a case where the cancel button is operated, the processing returns to step S121, and the above-described processing is repetitively performed.

In contrast, in step S124, in a case where it is determined that the menu is deleted, in step S125, the setting processing unit 62 deletes the menu item for which selection is determined on the My Menu page.

That is, as setting processing, the setting processing unit 62 performs processing of updating My Menu page information of a My Menu page in which the menu item for which selection is determined in the processing in step S122 exists so that the menu item on the My Menu page designated by the user is deleted. With this arrangement, the My Menu page is updated.

As described above, when the menu item is deleted from the My Menu page, the deletion processing is terminated. When the menu item is deleted and the deletion processing is terminated, the display control unit 61 allows the display unit 25 to display the deletion item selection screen to continuously perform processing of deleting a new menu item. That is, when the menu item is deleted in step S125, new deletion processing is subsequently initiated, and the deletion item selection screen is displayed on the display unit 25.

As described above, the imaging device 11 determines a menu item that is set as a deletion target in correspondence with a user's operation, and deletes the menu item from the My Menu page. In addition, when the menu item is deleted, the subsequent display is returned to the deletion item selection screen. In this manner, it is possible to simply delete the menu item in a small number of operation steps, and it is possible to improve convenience of the imaging device 11.

Configuration Example of Computer

However, the above-described series of processing may be executed by hardware or software. In a case of performing the series of processing by software, a program that constitutes the software is installed in a computer. Here, examples of the computer include a computer provided with exclusive hardware, a general-purpose computer capable of executing various functions by installing various programs, and the like.

Figure 13:
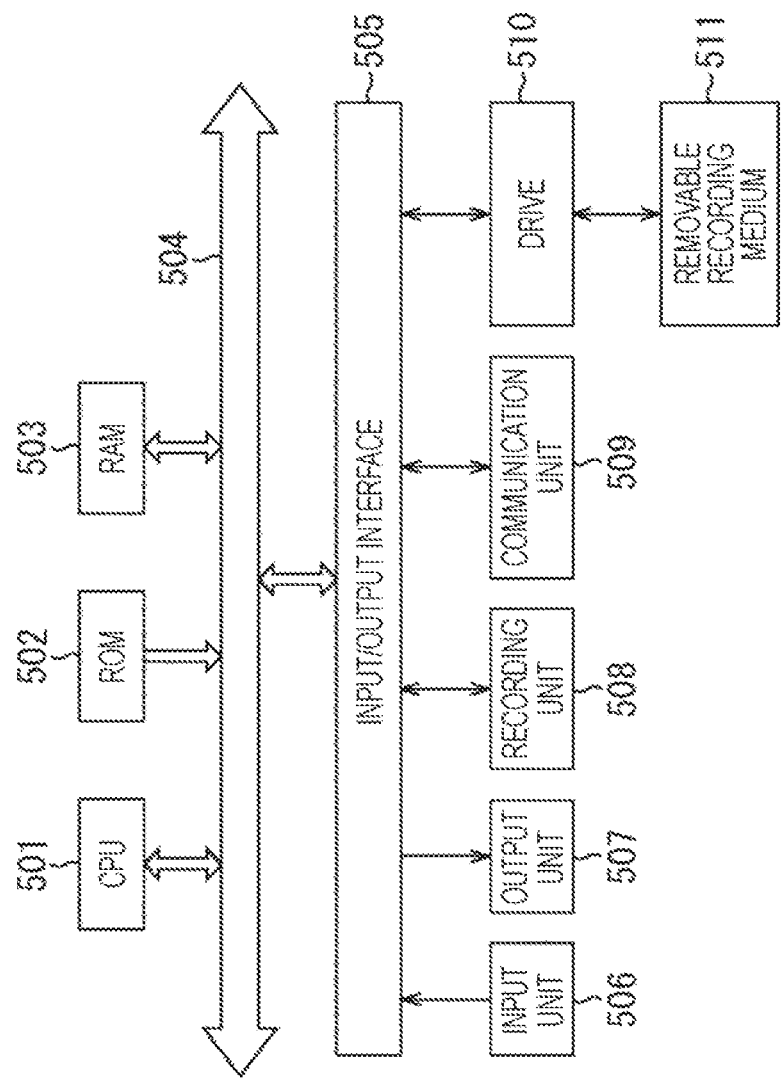
FIG. 13 is a view illustrating a configuration example of a computer.

FIG. 13 is a block diagram illustrating a configuration example of hardware of computer that executes the above-described series of processing by a program.

In the computer, a central processing unit (CPU) 501, a read only memory (ROM) 502, and a random access memory (RAM) 503 are connected to each other through a bus 504.

In addition, an input/output interface 505 is connected to the bus 504. An input unit 506, an output unit 507, a recording unit 508, a communication unit 509, and a drive 510 are connected to the input/output interface 505.

The input unit 506 is constituted by a keyboard, a mouse, a microphone, an imaging element, and the like. The output unit 507 is constituted by a display, a speaker, and the like. The recording unit 508 is constituted by a hard disk, a nonvolatile memory, and the like. The communication unit 509 is constituted by a network interface, and the like. The drive 510 drives a removable recording medium 511 such as a magnetic disk, an optical disc, a magneto-optical disc, and a semiconductor memory.

In the computer having the above-described configuration, the CPU 501 loads a program that is recorded, for example, on the recording unit 508 into the RAM 503 through the input/output interface 505 and the bus 504, and executes the program. With this arrangement, the above-described series of processing is performed.

The program that is executed by the computer (CPU 501) can be provided in a state of being recorded, for example, on the removable recording medium 511 as a package medium or the like. In addition, the program can be provided through a wired or wireless transmission medium such as a local area network, the Internet, and digital satellite broadcasting.

In the computer, the program can be installed in the recording unit 508 through the input/output interface 505 when the removable recording medium 511 is mounted in the drive 510. In addition, the program can be installed in the recording unit 508 after being received by the communication unit 509 through the wired or wireless transmission medium. In addition, the program can be installed in the ROM 502 or the recording unit 508 in advance.

Furthermore, the program that is executed by the computer may be a program in which processing is performed in time-series according to the procedure described in this specification, or may be a program in which processing is performed in parallel or at a necessary timing such as when a call is made.

In addition, an embodiment of the present technology is not limited to the above-described embodiment, and various modifications can be made in a range not departing from the gist of the present technology.

For example, the present technology can have a cloud computing configuration in which one function is shared by a plurality of devices and is processed in cooperation through a network.

In addition, the respective steps described in the flowcharts can be executed in a state of being shared by a plurality of devices in addition to execution by one device.

In addition, in a case where a plurality of kinds of processing are included in one step, the plurality of kinds of processing included in one step can be executed in a state of being shared by a plurality of devices in addition to execution by one device.

In addition, the effects described in this specification are illustrative only and are not limited, and other effects may exist.

Application Example 1

The technology according to the present disclosure is applicable to various products. For example, the technology according to the present disclosure may be applied to an operating room system.

Figure 14:
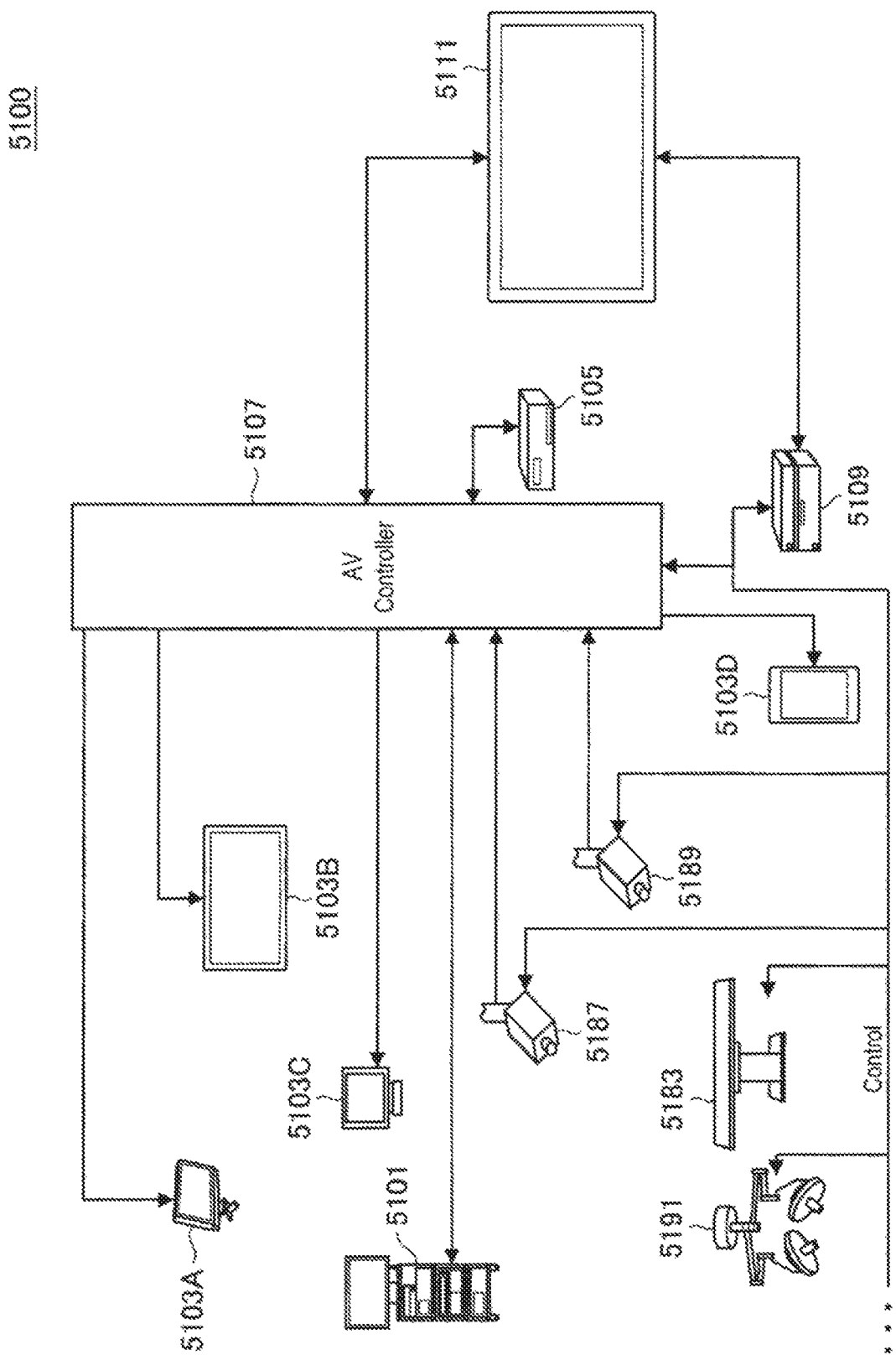
FIG. 14 is a view schematically illustrating an overall configuration of an operating room system.

FIG. 14 is a view schematically illustrating an overall configuration of an operating room system 5100 to which the technology according to the present disclosure is applicable. When referring to FIG. 14, the operating room system 5100 has a configuration in which device groups installed in an operating room are connected to each other in a cooperation manner through an audio-visual controller (AV controller) 5107 and an operating room control device 5109.

In the operating room, various devices can be installed. In FIG. 14, as an example, various device groups 5101 for an endoscopic operation, a ceiling camera 5187 that is installed on the ceiling of the operating room and captures images of hands of an operator, an operating room camera 5189 that is installed on the ceiling of the operating room and captures images of a state of the entirety of the operating room, a plurality of display devices 5103A to 5103D, a recorder 5105, a patient bed 5183, and an illumination device 5191 are illustrated in the drawing.

Here, among the devices, the device groups 5101 pertain to an endoscopic operating system 5113 to be described later, and include an endoscope, a display device that displays images captured by the endoscope, and the like. Respective devices which pertain to the endoscopic operating system 5113 are also called medical devices. On the other hand, the display devices 5103A to 5103D, the recorder 5105, the patient bed 5183, and the illumination device 5191 are devices which are provided, for example, in the operating room independently from the endoscopic operating system 5113. Respective devices which do not pertain to the endoscopic operating system 5113 are also called non-medical devices. The audio-visual controller 5107 and/or the operating room control device 5109 control operations of the medical devices and the non-medical devices in cooperation.

The audio-visual controller 5107 collectively controls processing related to image display in the medical devices and the non-medical devices. Specifically, among devices provided in the operating room system 5100, the device groups 5101, the ceiling camera 5187 and the operating room camera 5189 may be devices (hereinafter, also referred to as "transmission source devices") having a function of transmitting information (hereinafter, also referred to as "display information") to be displayed during operation. In addition, the display devices 5103A to 5103D may be devices (hereinafter, also referred to as "output destination devices") to which display information is output. In addition, the recorder 5105 may be a device corresponding to both the transmission source devices and the output destination devices. The audio-visual controller 5107 has a function of controlling operations of the transmission source devices and the output destination devices, acquiring display information from the transmission source devices, transmitting the display information to the output destination devices, and displaying and recording the display information. On the other hand, examples of the display information include various images captured during operation, various pieces of information related to an operation (for example, physical information of a patient, a past inspection result, information related to an operating form, and the like), and the like.

Specifically, as the display information, information that relates to an image of an operating portion in the coelom of a patient, which is captured by the endoscope, may be transmitted to the audio-visual controller 5107 from the device groups 5101. In addition, as the display information, information that relates to an image of hands of an operator, which is captured by the ceiling camera 5187, may be transmitted to the audio-visual controller 5107 from the ceiling camera 5187. In addition, as the display information, information relating to an image, which is captured by the operating room camera 5189 and shows a state of the entirety of the operating room, may be transmitted to the audio-visual controller 5107 from the operating room camera 5189. Furthermore, in a case where another device having a capturing function exists in the operating room system 5100, as the display information, the audio-visual controller 5107 may acquire information related to an image captured by the other device also from the other device.

Alternatively, for example, information related to the images captured in the past is recorded in the recorder 5105 by the audio-visual controller 5107. The audio-visual controller 5107 can acquire information related to the images captured in the past from the recorder 5105 as the display information. Furthermore, various pieces of information related to the operation may be recorded in the recorder 5105 in advance.

The audio-visual controller 5107 allows any one of the display devices 5103A to 5103D which are output destination devices to display the display information that is acquired (that is, an image captured during the operation, various pieces of information related to the operation). In the example illustrated in the drawing, the display device 5103A is a display device that is installed to be suspended from the ceiling of the operating room, the display device 5103B is a display device that is installed on a wall surface of the operating room, the display device 5103C is a display device that is installed on the desk in the operating room, and the display device 5103D is a mobile device (for example, a tablet personal computer (PC)) having a display function.

In addition, although not illustrated in FIG. 14, the operating room system 5100 may include external devices of the operating room. For example, the external devices of the operating room may be a server that is connected to a network that is constructed in a hospital, a PC that is used by a medical staff, a projector that is installed in a conference room of the hospital, and the like. In a case where the external devices exist outside the hospital, the audio-visual controller 5107 can allow a display device of another hospital to display the display information through a video-conference system or the like for remote medical service.

The operating room control device 5109 collectively controls processing other than processing related to image display in the non-medical devices. For example, the operating room control device 5109 controls operations of the patient bed 5183, the ceiling camera 5187, the operating room camera 5189, and the illumination device 5191.

The operating room system 5100 is provided with a centralized operation panel 5111, and a user can provide an instruction related to image display to the audio-visual controller 5107 through the centralized operation panel 5111, or can provide an instruction related to operations of the non-medical devices to the operating room control device 5109. The centralized operation panel 5111 has a configuration in which a touch panel is provided on a display surface of a display device.

Figure 15:
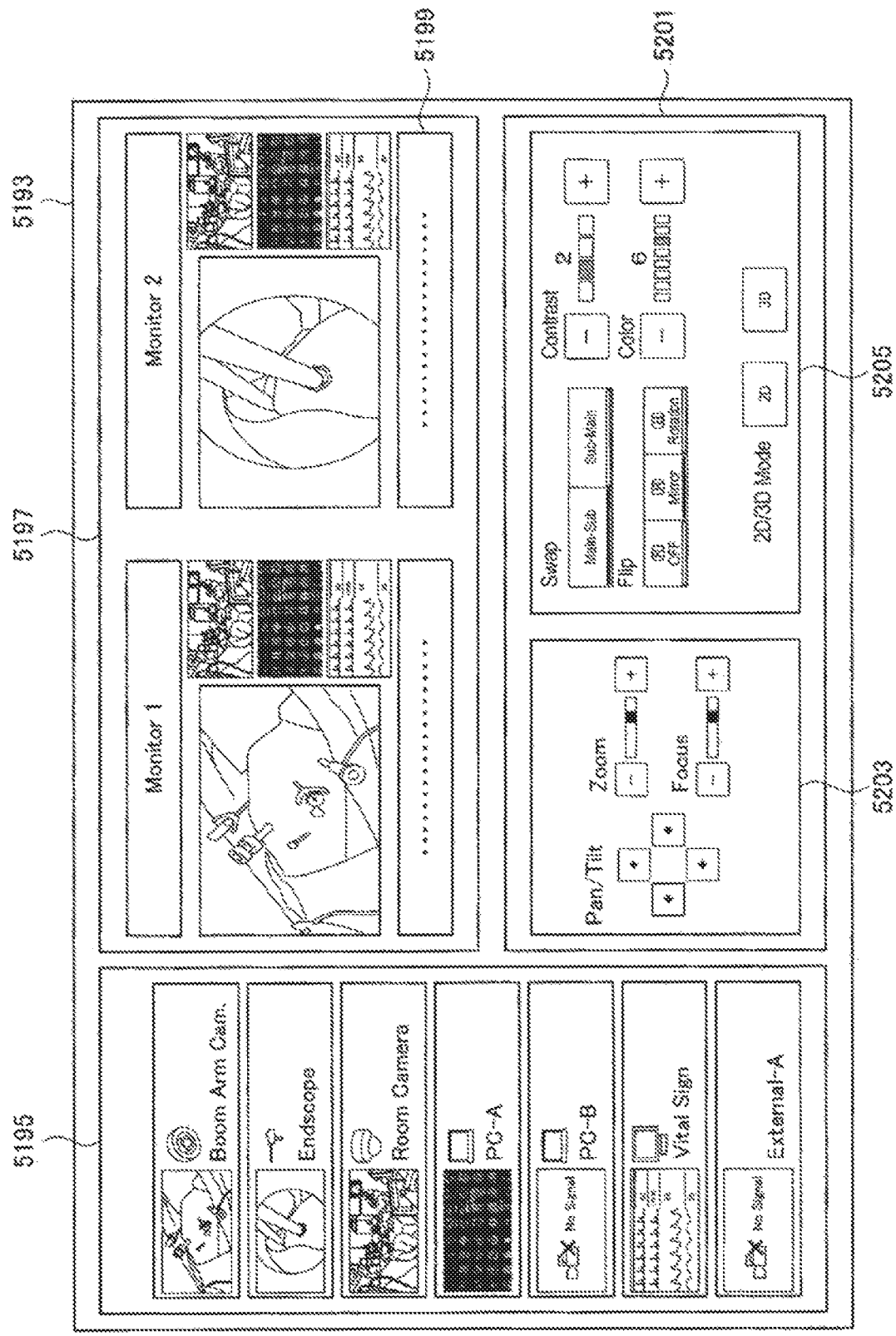
FIG. 15 is a view illustrating a display example of an operation screen in a centralized operation panel.

FIG. 15 is a view illustrating a display example of an operation screen in the centralized operation panel 5111. FIG. 15 illustrates an operation screen corresponding to a case where two display devices as an output destination device are installed in the operating room system 5100 as an example. When referring to FIG. 15, a transmission source selection region 5195, a preview region 5197, and a control region 5201 are provided in the operation screen 5193.

In the transmission source selection region 5195, a transmission source device provided in the operating room system 5100 and a thumbnail screen indicating display information of the transmission source device are displayed in association with each other. The user can select display information that is desired to display on the display device from any one transmission source device that is displayed in the transmission source selection region 5195.

In the preview region 5197, a preview of a screen that is displayed on two display devices (monitor 1, monitor 2) which are output destination devices. In the example illustrated in the drawing, four images are Pin P-displayed on one display device. The four images correspond to display information transmitted from transmission source devices selected in the transmission source selection region 5195. Among the four images, one image is displayed in a relatively large size as a main image, and the remaining three images are displayed in a relatively small size as sub-images. The user can substitute the main image and the sub-images by appropriately selecting regions in which the four images are displayed. In addition, a status display region 5199 is provided on a lower side of the region in which the four images are displayed, and a status relating to the operation (for example, an operation elapse time, physical information of a patient, and the like) can be appropriately displayed in the region.

In the control region 5201, a transmission source operation region 5203 in which a graphical user interface (GUI) component for performing an operation with respect to the transmission source device is displayed, and an output destination operation region 5205 in which a GUI component for performing an operation with respect to an output destination device is displayed are provided. In the example illustrated in the drawing, a GUI component for performing various operations (pan, tilt, and zoom) with respect to a camera in a transmission source device having a capturing function is provided in the transmission source operation region 5203. The user can operate the operation of the camera in the transmission source device by appropriately selecting the GUI components. Furthermore, although not illustrated in the drawing, in a case where a transmission source device selected in the transmission source selection region 5195 is a recorder (that is, in a case where an image recorded in the recorder in the past is displayed in the preview region 5197), a GUI component for performing an operation such as reproduction, reproduction stopping, rewinding, and scroll up of the image can be provided in the transmission source operation region 5203.

In addition, the output destination operation region 5205 is provided with a GUI component for performing various operations (swap, flip, color adjustment, contrast adjustment, switching of 2D display and 3D display) with respect to display in a display device that is an output destination device in the output destination operation region 5205. The user can operate display in the display device by appropriately selecting the GUI components.

Furthermore, the operation screen displayed on the centralized operation panel 5111 is not limited to the example illustrated in the drawing, and the user may perform an operation input with respect to respective devices which are provided in the operating room system 5100 and are capable of being controlled by the audio-visual controller 5107 and the operating room control device 5109 through the centralized operation panel 5111.

Figure 16:
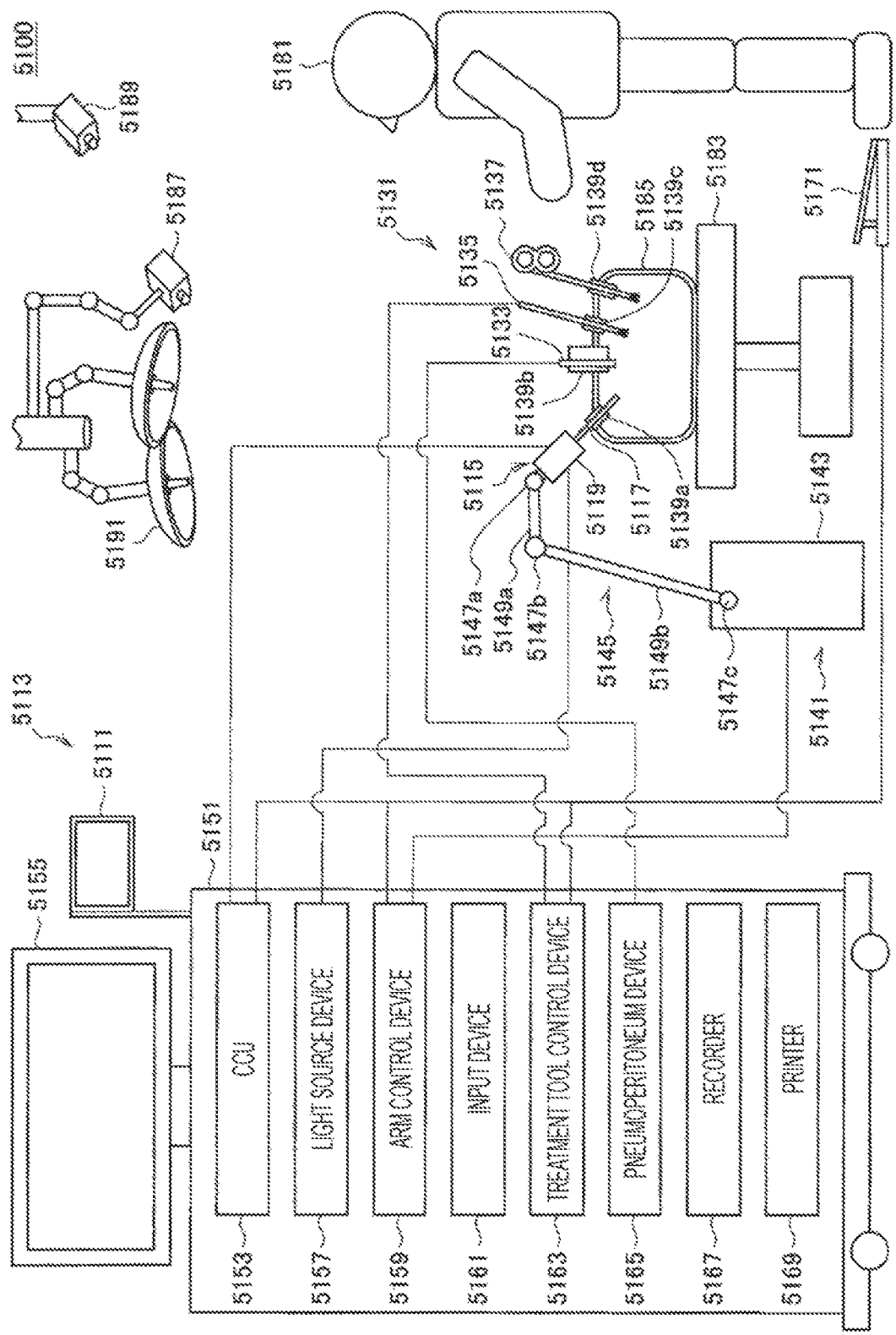
FIG. 16 is a view illustrating an example of an operation aspect to which the operating room system is applied.

FIG. 16 is a view illustrating an example of an operation aspect to which the above-described operating room system is applied. The ceiling camera 5187 and the operating room camera 5189 are provided on the ceiling of the operating room, and can photograph hands of an operator (doctor) 5181 who performs a medical treatment with respect to an affected part of a patient 5185 on the patient bed 5183 and a state of the entirety of the operating room. The ceiling camera 5187 and the operating room camera 5189 may be provided with a magnification adjustment function, a focal length adjustment function, a photographing direction adjustment function, and the like. The illumination device 5191 is provided on the ceiling of the operating room, and emits light at least to the hands of the operator 5181. The illumination device 5191 can appropriately adjust the amount of light that is emitted, a wavelength (color) of the emitted light, an emission direction of light, and the like.

As illustrated in FIG. 14, the endoscopic operating system 5113, the patient bed 5183, the ceiling camera 5187, the operating room camera 5189, and the illumination device 5191 are connected to each other in a cooperation possible manner through the audio-visual controller 5107 and the operating room control device 5109 (not illustrated in FIG. 16). In the operating room, the centralized operation panel 5111 is provided, and as described above, the user can appropriately operate the devices which exist in the operating room through the centralized operation panel 5111.

Hereinafter, a configuration of the endoscopic operating system 5113 will be described in detail. As illustrated in the drawings, the endoscopic operating system 5113 includes an endoscope 5115, other operating tools 5131, a support arm device 5141 that supports the endoscope 5115, and a cart 5151 on which various devices for an endoscopic operation are mounted.

In an endoscopic operation, a plurality of tubular opening tools called trocars 5139a to 5139d puncture an abdominal wall instead of cutting the abdominal wall for an abdominal operation. In addition, a lens-barrel 5117 of the endoscope 5115 or other operating tools 5131 are inserted into a coelom of the patient 5185 from the trocars 5139a to 5139d. In the example illustrated in the drawing, as the other operating tools 5131, a pneumoperitoneum tube 5133, an energy treatment tool 5135, and a forceps 5137 are inserted into the coelom of the patient 5185. In addition, the energy treatment tool 5135 is a treatment tool that performs cutting and peeling-off of a tissue, sealing of a blood vessel, and the like by using a high-frequency current or ultrasonic vibration. However, the operating tool 5131 illustrated in the drawing is an illustrative only, and various operating tools such as forceps and a retractor which can be typically used in an endoscopic operation may be used as the operating tool 5131.

An image of an operating portion in the coelom of the patient 5185, which is captured by the endoscope 5115, is displayed on the display device 5155. An operator 5181 performs treatment such as cutting-out of an affected part by using the energy treatment tool 5135 or the forceps 5137 while viewing the image of the operating portion which is displayed on the display device 5155 in real time. Furthermore, although not illustrated in the drawing, the pneumoperitoneum tube 5133, the energy treatment tool 5135, and the forceps 5137 are supported by the operator 5181, an assistor, or the like during operating.

(Support Arm Device)

A support arm device 5141 includes an arm portion 5145 that extends from a base portion 5143. In the example illustrated in the drawing, the arm portion 5145 includes joint portions 5147a, 5147b, and 5147c, and links 5149a and 5149b, and is driven by control from an arm control device 5159. The endoscope 5115 is supported by the arm portion 5145, and a position and a posture thereof are controlled. With this arrangement, stable position fixing of the endoscope 5115 can be realized.

(Endoscope)

The endoscope 5115 includes lens-barrel 5117 of which a predetermined length of region from a tip end is inserted into the coelom of the patient 5185, and a camera head 5119 that is connected to a base end of the lens-barrel 5117. In the example illustrated in the drawing, the endoscope 5115 configured as a so-called hard mirror including the hard lens-barrel 5117 is illustrated in the drawing, but the endoscope 5115 may be configured as a so-called soft mirror including a soft lens-barrel 5117.

An opening into which an objective lens is inserted is provided at the tip end of the lens-barrel 5117. A light source device 5157 is connected to the endoscope 5115, and light generated by the light source device 5157 is guided to the tip end of the lens-barrel by a light guide that is provided to extend into the lens-barrel 5117, and is emitted toward an observation target in the coelom of the patient 5185 through the objective lens. Furthermore, the endoscope 5115 may be a direct-viewing mirror, a perspective-viewing mirror, or a side-viewing mirror.

An optical system and an imaging element are provided inside the camera head 5119, and reflected light (observation light) from the observation target is condensed to the imaging element by the optical system. When the observation light is photoelectrically converted by the imaging element, an electric signal corresponding to the observation light, that is, an image signal corresponding to an observation image is generated. The image signal is transmitted to a camera control unit (CCU) 5153 as RAW data. Furthermore, a function of adjusting a magnification and a focal length by appropriately driving the optical system is provided in the camera head 5119.

Furthermore, a plurality of the imaging elements may be provided in the camera head 5119 to cope with, for example, stereoscopic vision (3D display) and the like. In this case, a plurality of relay optical systems are provided in the lens-barrel 5117 to guide the observation light to the plurality of imaging elements.

(Various Devices Mounted on Cart)

The CCU 5153 is constituted by a central processing unit (CPU), a graphics processing unit (GPU), or the like, and collectively controls the operation of the endoscope 5115 and the display device 5155. Specifically, with respect to an image signal received from the camera head 5119, the CCU 5153 performs various kinds of image processing for displaying an image based on the image signal, for example, development processing (demosaic processing) and the like. The CCU 5153 provides the image signal subjected to the imaging processing to the display device 5155. In addition, the audio-visual controller 5107 illustrated in FIG. 14 is connected to the CCU 5153. The CCU 5153 supplies the image signal subjected to the image processing also to the audio-visual controller 5107. In addition, the CCU 5153 transmits a control signal to the camera head 5119 and controls driving thereof. The control signal may include information related to imaging conditions such as a magnification and a focal length. The information related to the imaging conditions may be input through an input device 5161, or may be input through the centralized operation panel 5111.

The display device 5155 displays an image based on the image signal that is subjected to the image processing by the CCU 5153 through control from the CCU 5153. For example, in a case where the endoscope 5115 corresponds to high-resolution photographing such as 4K (3840 (the number of horizontal pixels)×2160 (the number of vertical pixels)) and 8K (7680 (the number of horizontal pixels)×4320 (the number of vertical pixels)), and/or 3D display, a display device that is capable of corresponding to the 4K and 8K, and is capable of performing high-resolution display and/or 3D display can be used as the display device 5155. In a case of corresponding to the high-resolution photographing such as 4K and 8K, when a display device having a size of 55 inches or greater is used as the display device 5155, it is possible to attain a higher sense of immersion. In addition, a plurality of the display devices 5155 which are different in resolution and a size may be provided in correspondence with uses.

For example, the light source device 5157 is constituted by a light source such as a light emitting diode (LED), and supplies irradiation light when photographing an operating portion to the endoscope 5115.

For example, the arm control device 5159 is constituted by a processor such as a CPU, and operates according to a predetermined program and controls driving of the arm portion 5145 of the support arm device 5141 in accordance with a predetermined control method.

The input device 5161 is an input interface with respect to the endoscopic operating system 5113. A user can perform input or instruction input of various pieces of information with respect to the endoscopic operating system 5113 through the input device 5161. For example, the user input various pieces of information related to the operation such as physical information of a patient and information related to an operating form through the input device 5161. In addition, the user inputs an instruction indicating driving of the arm portion 5145, an instruction indicating change of imaging conditions (a kind of irradiation light, a magnification, a focal length, and the like) by the endoscope 5115, an instruction indicating driving of the energy treatment tool 5135, and the like through the input device 5161.

The kind of the input device 5161 is not limited, and the input device 5161 may be various known input devices. As the input device 5161, for example, a mouse, a keyboard, a touch panel, a switch, a foot switch 5171 and/or a lever, and the like can be applied. In a case of using the touch panel as the input device 5161, the touch panel may be provided on a display surface of the display device 5155.

Alternatively, for example, the input device 5161 is a device such as an eyeglass-type wearable device and a head mounted display (HMD) which are worn by the user, and various inputs are performed in correspondence with a gesture or a visual line of the user which is detected by the devices. In addition, the input device 5161 includes a camera capable of detecting user's movement, and various inputs are performed in according to a gesture or a visual line of the user which is detected from a video captured by the camera. In addition, the input device 5161 includes a microphone capable of collecting a sound of the user, and various inputs are performed by the sound through the microphone. As described above, the input device 5161 is configured to input various pieces of information in a non-contact manner, and thus particularly, a user (for example, the operator 5181) who pertains to a clean area can operate a device that pertains to an unclean area. In addition, the user can operate a device without detaching hands from an operating tool that is carried by the user, and thus convenience of the user is improved.

A treatment tool control device 5163 controls driving of the energy treatment tool 5135 for cauterization and cutting of a tissue, sealing of a blood vessel, and the like. A pneumoperitoneum device 5165 supplies a gas into the coelom through the pneumoperitoneum tube 5133 to swell the coelom of the patient 5185 for securement of a visual field by the endoscope 5115 and for securement of a working space of an operator. The recorder 5167 is a device that can record various pieces of information relating to the operation. A printer 5169 is a device that can print various pieces of information relating to the operation in various types such as a text, an image, and a graph.

Hereinafter, a particular specific configuration in the endoscopic operating system 5113 will be described in more detail.

(Support Arm Device)

The support arm device 5141 includes the base portion 5143 that is a base, and the arm portion 5145 that extends from the base portion 5143. In the example illustrated in the drawing, the arm portion 5145 includes a plurality of the joint portions 5147a, 5147b, and 5147c, and a plurality of the links 5149a and 5149b which are connected by the joint portion 5147b. However, in FIG. 16, the configuration of the arm portion 5145 is illustrated in a simplified manner for simplification. Actually, the shape, the number, and the arrangement of the joint portions 5147a to 5147c, and the links 5149a and 5149b, and directions of rotation axes of the joint portions 5147a to 5147c, and the like can be appropriately set to have a desired degree of freedom. For example, the arm portion 5145 may be appropriately configured to have the degree of freedom of six degrees or greater. With this arrangement, the endoscope 5115 can freely move in a movable range of the arm portion 5145, and thus it is possible to insert the lens-barrel 5117 of the endoscope 5115 into the coelom of the patient 5185 from a desired direction.

An actuator is provided in the joint portions 5147a to 5147c, and the joint portions 5147a to 5147c can rotate around a predetermined rotation axis due to driving of the actuator. When the driving of the actuator is controlled by the arm control device 5159, a rotation angle of each of the joint portions 5147a to 5147c is controlled, and thus driving of the arm portion 5145 is controlled. With this arrangement, control of the position and the posture of the endoscope 5115 is realized. At this time, the arm control device 5159 can control driving of the arm portion 5145 by various known control methods such as force control and position control.

For example, when the operator 5181 appropriately performing an operation input through the input device 5161 (including a foot switch 5171), driving of the arm portion 5145 may be appropriately controlled by the arm control device 5159 according to the operation input to control the position and the posture of the endoscope 5115. After moving the endoscope 5115 located at the end of the arm portion 5145 from an arbitrary position to an arbitrary position through the control, it is possible to fixedly support at the position after movement. On the other hand, the arm portion 5145 may be operated by a so-called master slave method. In this case, the arm portion 5145 can be remotely operated by a user through the input device 5161 that is provided at a location distant from the operating room.

In addition, in a case where the force control is applied, the arm control device 5159 may perform so-called power assist control in which an external force is received from the user, and actuators of the joint portions 5147a to 5147c are driven so that the arm portion 5145 smoothly moves in accordance with the force. With this arrangement, when the user moves the arm portion 5145 while coming into direct contact with the arm portion 5145, it is possible to move the arm portion 5145 with a relatively small force. Accordingly, it is possible to intuitively move the endoscope 5115 through a simpler operation, and thus it is possible to improve convenience of the user.

Here, typically, in the endoscopic operation, the endoscope 5115 is supported by a doctor called a scopist. In contrast, when using the support arm device 5141, it is possible to more reliably fix the position of the endoscope 5115 without depending on manpower, and thus it is possible to stably obtain an image of an operating portion, and thus it is possible to smoothly perform operation.

Furthermore, the arm control device 5159 may not be provided in the cart 5151. In addition, the arm control device 5159 may not be one device. For example, the arm control device 5159 may be provided in each of the joint portions 5147a to 5147c of the arm portion 5145 of the support arm device 5141, or driving control of the arm portion 5145 may be realized by cooperation of a plurality of the arm control devices 5159.

(Light Source Device)

The light source device 5157 supplies irradiation light to the endoscope 5115 when photographing an operating portion. For example, the light source device 5157 is constituted by an LED, laser light sources, or a white light source constituted by a combination thereof. At this time, in a case where the white light is constituted by a combination of RGB laser light sources, output intensity and output timing of respective colors (respective wavelengths) can be controlled with high accuracy, and thus it is possible to perform adjustment of white balance of a captured image in the light source device 5157. In addition, in this case, when laser light is emitted from the RGB laser light sources to an observation target in a time-division manner, and driving of an imaging element of the camera head 5119 is controlled in synchronization with the emission timing, it is also possible to capture images corresponding to RGB in a time-division manner. According to the method, it is possible to obtain a color image without providing a color filter in the imaging element.

In addition, driving of the light source device 5157 may be controlled so that intensity of light that is emitted is changed for every predetermined time. When driving of the imaging element of the camera head 5119 is controlled in synchronization with the light intensity changing timing to obtain images in a time-division manner, and the images are composed, it is possible to generate a high dynamic range image without so-called black defects and halation.

In addition, the light source device 5157 can have a configuration capable of supplying light of a predetermined wavelength band corresponding to special optical observation. In the special optical observation, for example, wavelength dependency of light absorption in a tissue is used, and light of a narrower band in comparison to irradiation light (that is, white light) in typical observation is emitted, and thus so-called narrow band optical observation (narrow band imaging) is performed to photograph a predetermined tissue such as a blood vessel of a mucous membrane surface layer at high contrast. Alternatively, in the special optical observation, fluorescent observation may be performed to obtain an image due to fluorescence that is generated by excited light irradiation. In the fluorescent observation, observation (self-fluorescent observation) in which a body tissue is irradiated with excited light, and fluorescence is observed from the body tissue, or observation in which a reagent such as indocyanine green (ICG) is locally injected to a body tissue, and the body tissue is irradiated with excited light corresponding to a fluorescent wavelength of the reagent to obtain a fluorescent image, and the like can be performed. The light source device 5157 may have a configuration capable of supplying narrow band light and/or excited light corresponding to the special optical observation.

(Camera Head and CCU)

Figure 17:
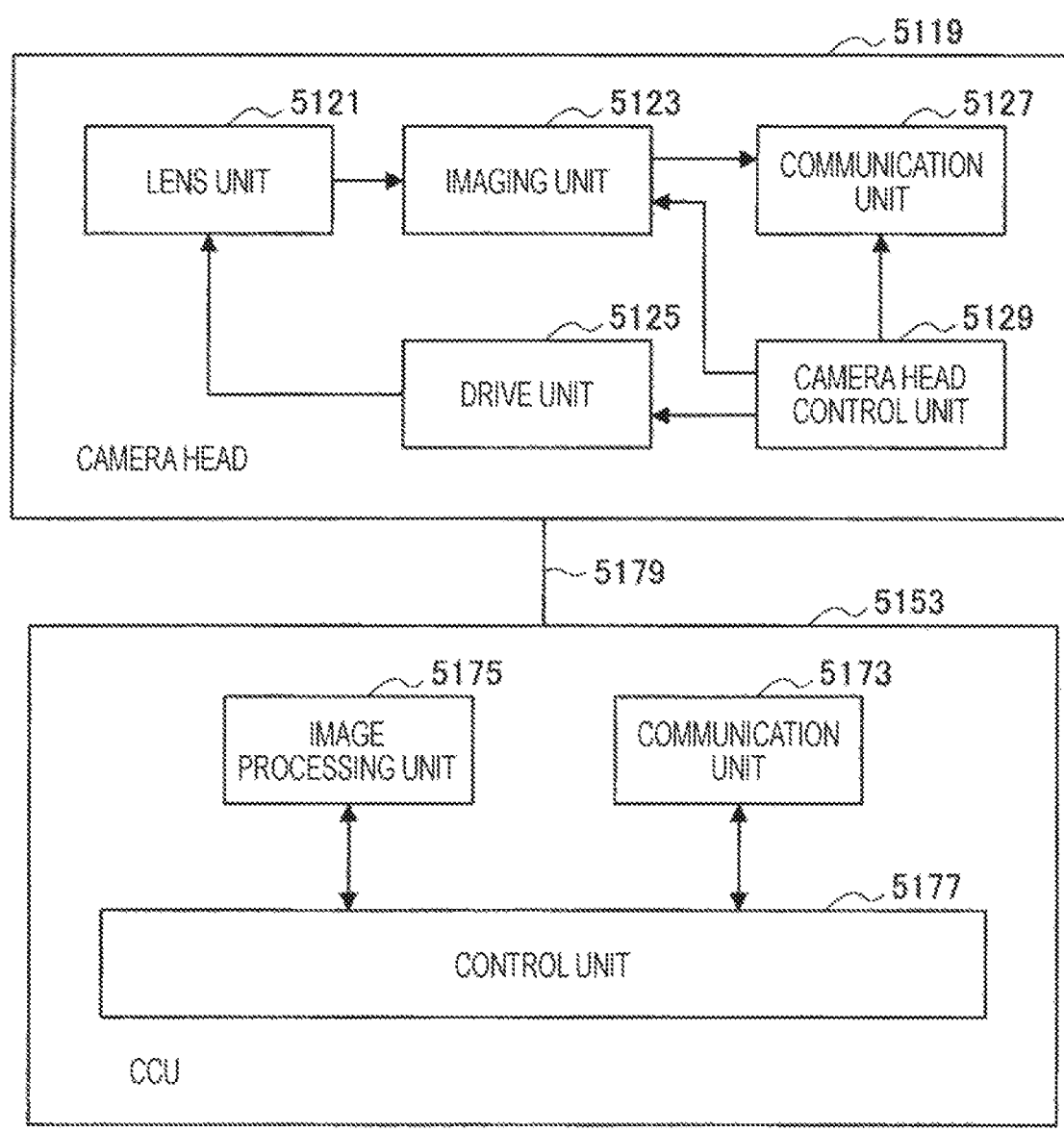
FIG. 17 is a block diagram illustrating an example of a functional configuration of a camera head and a CCU illustrated in FIG. 16.

The function of the camera head 5119 and the CCU 5153 of the endoscope 5115 will be described in more detail with reference to FIG. 17. FIG. 17 is a block diagram illustrating an example of a function configuration of the camera head 5119 and the CCU 5153 illustrated in FIG. 16.

When referring to FIG. 17, the camera head 5119 includes a lens unit 5121, an imaging unit 5123, a drive unit 5125, a communication unit 5127, and a camera head control unit 5129 as functions thereof. In addition, the CCU 5153 includes a communication unit 5173, an image processing unit 5175, and a control unit 5177 as functions thereof. The camera head 5119 and the CCU 5153 are connected to each other through a transmission cable 5179 in a bidirectional communication possible manner.

First, a functional configuration of the camera head 5119 will be described. The lens unit 5121 is an optical system that is provided in a connection portion with the lens-barrel 5117. Observation light received from the tip end of the lens-barrel 5117 is guided to the camera head 5119, and is incident to the lens unit 5121. The lens unit 5121 is constituted by a combination of a plurality of lenses including a zoom lens and a focus lens. Optical characteristics of the lens unit 5121 are adjusted to condense the observation light onto a light-receiving surface of the imaging element of the imaging unit 5123. In addition, the zoom lens and the focus lens have a configuration in which a position on an optical axis can move for adjustment of a magnification and a focus of a captured image.

The imaging unit 5123 is constituted by an imaging element and is disposed at a rear stage of the lens unit 5121. The observation light that passes through the lens unit 5121 is condensed to the light-receiving surface of the imaging element, and an image signal corresponding to an observation image is generated through photoelectric conversion. The image signal generated by the imaging unit 5123 is provided to the communication unit 5127.

As the imaging element that constitutes the imaging unit 5123, for example, an imaging element that is a complementary metal oxide semiconductor (CMOS)-type image sensor and is capable of photographing a color having a Bayer array can be used. Furthermore, as the imaging element, for example, an imaging element capable of corresponding to photographing of a high-resolution image of 4K or higher can be used. When an image of the operating portion is attained with high resolution, the operator 5181 can understand a state of the operating portion in more detail, and can perform operation in more smoothly.

In addition, the imaging element that constitutes the imaging unit 5123 is configured to have a pair of imaging elements for acquiring image signals for a right eye and a left eye which correspond to 3D display. When the 3D display is performed, the operator 5181 can understand a depth length of a biological tissue in the operating portion with high accuracy. Furthermore, in a case where the imaging unit 5123 is configured as a multi-plate type, a plurality of the lens units 5121 are provided in correspondence with respective imaging elements.

In addition, the imaging unit 5123 may not be provided in the camera head 5119. For example, the imaging unit 5123 may be provided immediately after the objective lens at the inside of the lens-barrel 5117.

The drive unit 5125 is constituted by an actuator, and moves the zoom lens and the focus lens of the lens unit 5121 along an optical axis by a predetermined distance through control from the camera head control unit 5129. With this arrangement, a magnification and a focus of an image captured by the imaging unit 5123 can be appropriately adjusted.

The communication unit 5127 is constituted by a communication device that transmits and receives various pieces of information to and from the CCU 5153. The communication unit 5127 transmits an image signal obtained from the imaging unit 5123 to the CCU 5153 as RAW data through the transmission cable 5179. At this time, it is preferable that the image signal is transmitted through optical communication to display the captured image of the operating portion at a short stand-by time. The reason for this is as follows. During operation, the operator 5181 performs the operation while observing a state of an affected part on the captured image, and thus it is required for a moving image of the operating portion to be displayed in real time as much as possible for a more stable and reliable operation. In a case where the optical communication is performed, the communication unit 5127 is provided with a photoelectric conversion module that converts an electric signal to an optical signal. The image signal is transmitted to the CCU 5153 through the transmission cable 5179 after being converted to an optical signal by the photoelectric conversion module.

In addition, the communication unit 5127 receives a control signal for controlling driving of the camera head 5119 from the CCU 5153. For example, the control signal includes information related to imaging conditions such as information indicating designation of a frame rate of a captured image, information indicating designation of an exposure value in imaging, and/or information indicating designation of a magnification and a focus of a captured image. The communication unit 5127 provides a received control signal to the camera head control unit 5129. Furthermore, a control signal from the CCU 5153 may be transmitted through optical communication. In this case, the communication unit 5127 is provided with a photoelectric conversion module that converts an optical signal to an electric signal, and the control signal is provided to the camera head control unit 5129 after being converted to an electric signal by the photoelectric conversion module.

Furthermore, the imaging conditions such as the frame rate, the exposure value, the magnification, and the focus are automatically set by the control unit 5177 of the CCU 5153 on the basis of the acquired image signal. That is, an auto exposure (AE) function, an auto focus (AF) function, and an auto white balance (AWB) function are provided in the endoscope 5115.

The camera head control unit 5129 controls driving of the camera head 5119 on the basis of a control signal received from the CCU 5153 through the communication unit 5127. For example, the camera head control unit 5129 controls driving of the imaging element of the imaging unit 5123 on the basis of information indicating designation of a frame rate of a captured image and/or information indicating designation of exposure in imaging. In addition, for example, the camera head control unit 5129 appropriately moves the zoom lens and the focus lens of the lens unit 5121 through the drive unit 5125 on the basis of information indicating designation of a magnification and a focus of the capture image. In addition, the camera head control unit 5129 may be provided with a function of storing information for identification of the lens-barrel 5117 or the camera head 5119.

Furthermore, it is possible to allow the camera head 5119 to have resistance against autoclave sterilization by disposing the configuration such as the lens unit 5121 and the imaging unit 5123, in a hermetic structure with high airtightness and waterproof properties.

Next, a functional configuration of the CCU 5153 will be described. The communication unit 5173 is constituted by a communication device that transmits and receives various pieces of information to and from the camera head 5119. The communication unit 5173 receives an image signal that is transmitted from the camera head 5119 through the transmission cable 5179. At this time, as described above, the image signal may be appropriately transmitted through optical communication. In this case, the communication unit 5173 is provided with a photoelectric conversion module that converts an optical signal to an electric signal in correspondence with the optical communication. The communication unit 5173 provides the image signal converted to the electric signal to the image processing unit 5175.

In addition, the communication unit 5173 transmits a control signal for controlling driving of the camera head 5119 to the camera head 5119. The control signal may also be transmitted through optical communication.

The image processing unit 5175 performs various kinds of image processing with respect to an image signal that is RAW data transmitted from the camera head 5119. As the image processing, for example, various kinds of signal processing known in the art such as development processing, high image quality processing (band emphasizing processing, super-resolution processing, noise reduction (NR) processing and/or image stabilization processing), and/or enlargement processing (electronic zoom processing) can be performed. In addition, the image processing unit 5175 performs wave detection processing with respect to the image signal to perform AE, AF, and AWB.

The image processing unit 5175 is constituted by a processor such as a CPU and a GPU, and the image processing or the wave detection processing may be performed when the processor operates in accordance with a predetermined program. Furthermore, in a case where the image processing unit 5175 is constituted by a plurality of GPUs, the image processing unit 5175 appropriately divides pieces of information related to the image signal, and the image processing is performed by the plurality of GPU in parallel.

The control unit 5177 performs various kinds of control related to imaging of the operating portion by the endoscope 5115 and display of the captured image. For example, the control unit 5177 generates a control signal for controlling driving of the camera head 5119. At this time, in a case where an imaging condition is input by a user, the control unit 5177 generates a control signal on the basis of the input by the user. Alternatively, in a case where the AE function, the AF function, and the AWB function are provided in the endoscope 5115, the control unit 5177 appropriately calculates an optimal exposure value, an optimal focal length, and optimal white balance in accordance with a result of the wave detection processing performed by the image processing unit 5175, and generates a control signal.

In addition, the control unit 5177 allows the display device 5155 to display an image of the operating portion on the basis of the image signal that is subjected to the image processing by the image processing unit 5175. At this time, the control unit 5177 recognizes various objects in the image of the operating portion by using various image recognition technologies. For example, the control unit 5177 can recognize operation tools such as a forceps, a specific biological portion, bleeding, mist when using the energy treatment tool 5135, and the like by detecting an edge shape, a color, and the like of an object included in the image of the operating portion. When allowing the display device 5155 to display the image of the operating portion, the control unit 5177 may overlap various pieces of operation assisting information on the image of the operating portion by using the recognition result. The pieces of operation assisting information are displayed in an overlapping manner and are provided to the operator 5181, it is possible to allow the operation to progress in a more safe and reliable manner.

The transmission cable 5179 that connects the camera head 5119 and the CCU 5153 is an electric signal cable corresponding to communication of an electric signal, optical fiber corresponding to optical communication, or a composite cable thereof.

Here, in the example illustrated in the drawing, communication is performed in a wired manner by using the transmission cable 5179, but communication between the camera head 5119 and the CCU 5153 may be performed in a wireless manner. In a case where the communication therebetween is performed in a wireless manner, it is not necessary to additionally provide the transmission cable 5179 in the operating room, and thus it is possible to prevent a situation in which movement of medical staffs in the operating room is interrupted by the transmission cable 5179.

Hereinbefore, description has been given of an example of the operating room system 5100 to which the technology according to the present disclosure is applicable. Furthermore, description has been given of a case where a medical system to which the operating room system 5100 is applied is the endoscopic operating system 5113 as an example, but the configuration of the operating room system 5100 is not limited to the above-described example. For example, the operating room system 5100 may be applied to a soft endoscopic system for inspection or a microscopic operating system instead of the endoscopic operating system 5113.

The technology according to the present disclosure is appropriately applicable to, for example, the audio-visual controller 5107 or the centralized operation panel 5111 among the above-described configurations.

Specifically, the operation screen 5193 is displayed on the centralized operation panel 5111, and transmission source operation region 5203 or the output destination operation region 5205 as a menu screen (menu page) is displayed on the operation screen 5193. In addition, a GUI component as a menu item is provided in the transmission source operation region 5203 or the output destination operation region 5205.

When the above-described present technology is applied to the GUI component on the transmission source operation region 5203 or the output destination operation region 5205, and addition, deletion, sorting (movement of an arrangement position), or the like of the GUI component (menu item) is performed, it is possible to customize the transmission source operation region 5203 or the output destination operation region 5205 for every operator (doctor), and thus it is possible to improve convenience.

Furthermore, the present technology is also applicable to various menu screens which are displayed on the display device 5103A to the display device 5103D without limitation to the centralized operation panel 5111. In a medical OR system without limitation to the operating room system 5100, for example, a function (pre-set function) of adding or editing a menu item of a menu screen (menu page) is provided for every doctor (operator) who is a user, and thus when applying the present technology to setting of the menu screen, it is possible to improve convenience.

In addition, the technology according to the present disclosure is also appropriately applicable to, for example, the endoscope 5115, the CCU 5153, and the display device 5155 among the above-described configurations.

For example, the present technology is applicable to a case where the control unit 5177 of the CCU 5153 generates a menu screen relating to photographing by the endoscope 5115, and the like, that is, a user interface, and allows the display device 5155 to display the user interface. In this case, when performing addition, deletion, sorting, and the like of the menu item in the menu screen (menu page), it is possible to customize the menu screen for every operator (doctor), and it is possible to improve convenience.

For example, with regard to various menu screens which are used in the operating room system 5100, setting information of the menu screens, that is, a menu item, a display position of the menu item, and the like may be correlated with user information indicating a user for every doctor who is a user. With this arrangement, it is possible to call the setting information of a menu screen which is determined in advance in correspondence with a user, to display the menu screen for every user, or to perform changing of a function related to the menu screen. The setting information corresponds to the above-described My Menu page information.

In this case, for example, the audio-visual controller 5107 may transmit the user information to a server, may receive the setting information from the server in correspondence with the transmission, and the centralized operation panel 5111, the display device 5103A to the display devices 5103D, the display device 5155, or the like may be allowed to display a menu screen corresponding to the setting information. In addition, the audio-visual controller 5107 may acquire the user information from the server and the like, the setting information corresponding to the user information may be read out from the recorder 5105 and the like, and the centralized operation panel 5111, the display device 5103A to the display devices 5103D, the display device 5155, or the like may be allowed to display a menu screen corresponding to the setting information.

With this arrangement, it is possible to appropriately change display of the menu screen in correspondence with setting information when initiating the operation, during the operation, and the like. As a result, it is possible to cope with changing of a doctor who is an operator who performs the operation, for example, and thus it is possible to improve convenience.

Application Example 2

In addition, the technology according to the present disclosure may be realized, for example, as a device that is mounted on any one kind of moving body among an automobile, an electric vehicle, a hybrid electric vehicle, a motorcycle, a bicycle, a personal mobility, an airplane, a drone, a ship, a robot, a construction machine, an agricultural machine (tractor), and the like.

Figure 18:
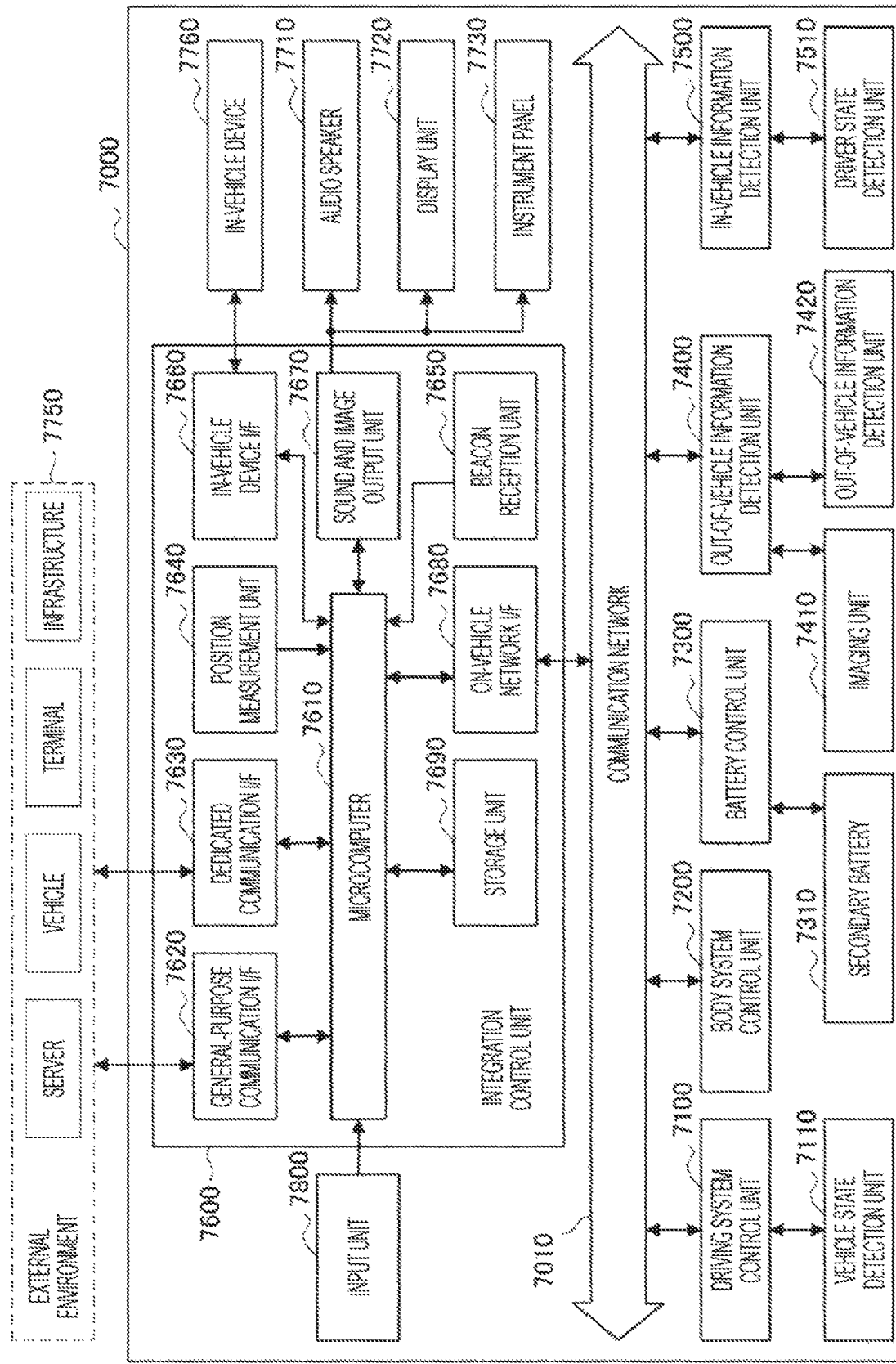
FIG. 18 is a block diagram illustrating an example of a schematic configuration of a vehicle control system.

FIG. 18 is a block diagram illustrating a schematic configuration example of a vehicle control system 7000 that is an example of a moving body control system to which the technology according to the disclosure is applicable. The vehicle control system 7000 includes a plurality of electronic control units which are connected to each other through a communication network 7010. In the example illustrated in FIG. 18, the vehicle control system 7000 includes a driving system control unit 7100, a body system control unit 7200, a battery control unit 7300, an out-of-vehicle information detection unit 7400, an in-vehicle information detection unit 7500, and an integration control unit 7600. For example, the communication network 7010 that connects the plurality of control units to each other may be an on-vehicle communication network according to arbitrary standards such as a controller area network (CAN), a local interconnect network (LIN), a local area network (LAN), and FlexRay (registered trademark).

The respective control units include a microcomputer that performs operation processing according to various programs, a storage unit that stores a program that is executed by the microcomputer, parameters capable of being used in various operations, and the like, and a drive circuit that drives devices of various control targets. Each of the respective control units includes a network I/F for performing communication with the other control units through the communication network 7010, and includes a communication I/F for performing communication with devices, sensors, and the like which are located on an inner side and on an outer side of a vehicle through wired communication or wireless communication. In FIG. 18, as a functional configuration of the integration control unit 7600, a microcomputer 7610, a general-purpose communication I/F 7620, a dedicated communication I/F 7630, a position measurement unit 7640, a beacon reception unit 7650, an in-vehicle device I/F 7660, a sound and image output unit 7670, an on-vehicle network I/F 7680, and a storage unit 7690 are illustrated in the drawing. Similarly, other control units also include a microcomputer, a communication I/F, a storage unit, and the like.

The driving system control unit 7100 controls an operation of devices related to a driving system of a vehicle in accordance with various programs. For example, the driving system control unit 7100 functions as a control device of a driving force generation device such as an internal combustion engine and a driving motor which generate a driving force of a vehicle, a driving force transmission mechanism that transmits the driving force to wheels, a steering mechanism that adjusts a steering angle of the vehicle, a braking device that generates a braking force of the vehicle, and the like. The driving system control unit 7100 may have a function as a control device of an antilock brake system (ABS), an electronic stability control (ESC), and the like.

A vehicle state detection unit 7110 is connected to the driving system control unit 7100. For example, the vehicle state detection unit 7110 includes at least one of a gyro sensor that detects an angular velocity of an axial rotary motion of a vehicle body, an acceleration sensor that detects an acceleration of the vehicle, or sensors which detect an operation amount of an accelerator pedal, an operation amount of a brake pedal, a steering angle of a steering wheel, the number of engine revolutions, a rotation speed of a wheel, and the like. The driving system control unit 7100 performs operation processing by using a signal that is input from the vehicle state detection unit 7110, and controls an internal combustion engine, a driving motor, an electric power steering device, a brake device, and the like.

The body system control unit 7200 controls an operation of various devices which are mounted on the vehicle body in accordance with various programs. For example, the body system control unit 7200 functions as a control device of a keyless entry system, a smart key system, a power window device, various lamps such as a head lamp, a back lamp, a brake lamp, a winker, and a fog lamp. In this case, an electric wave transmitted from a portable device that substitutes for a key, or signals of various switches may be input to the body system control unit 7200. The body system control unit 7200 receives input of the electric wave or the signals, and controls a door lock device, a power window device, the lamps, and the like of the vehicle.

The battery control unit 7300 controls a secondary battery 7310 that is a power supply source of the driving motor in accordance with various programs. For example, information such as a battery temperature, a battery output voltage, and a battery residual capacity is input from a battery device including the secondary battery 7310 to the battery control unit 7300. The battery control unit 7300 performs operation processing by using the signals, and performs temperature adjustment control of the secondary battery 7310, and control of a cooling device that is provided in the battery device or the like.

The out-of-vehicle information detection unit 7400 detects external information of the vehicle on which the vehicle control system 7000 is mounted. For example, at least one of an imaging unit 7410 or an out-of-vehicle information detection unit 7420 is connected to the out-of-vehicle information detection unit 7400. The imaging unit 7410 includes at least one among a time of flight (ToF) camera, a stereo camera, a monocular camera, an infrared camera, and other cameras. For example, the out-of-vehicle information detection unit 7420 includes at least one among an environment sensor that detects current weather or meteorological phenomena, and a nearby information detection sensor that detects other vehicles at the periphery of the vehicle on which the vehicle control system 7000 is mounted, obstacles, pedestrians, and the like.

For example, the environment sensor may be at least one among a raindrop sensor that detects rainy weather, a fog sensor that detects fog, a sunshine sensor that detects the degree of sunshine, and a snow sensor that detects snowfall. The nearby information detection sensor may be at least one among an ultrasonic sensor, a radar device, and a light detection and ranging, laser imaging detection and ranging (LIDAR) device. The imaging unit 7410 and the out-of-vehicle information detection unit 7420 may be provided as an independent sensor or device, or as a device in which a plurality of sensors or devices are integrated.

Figure 19:
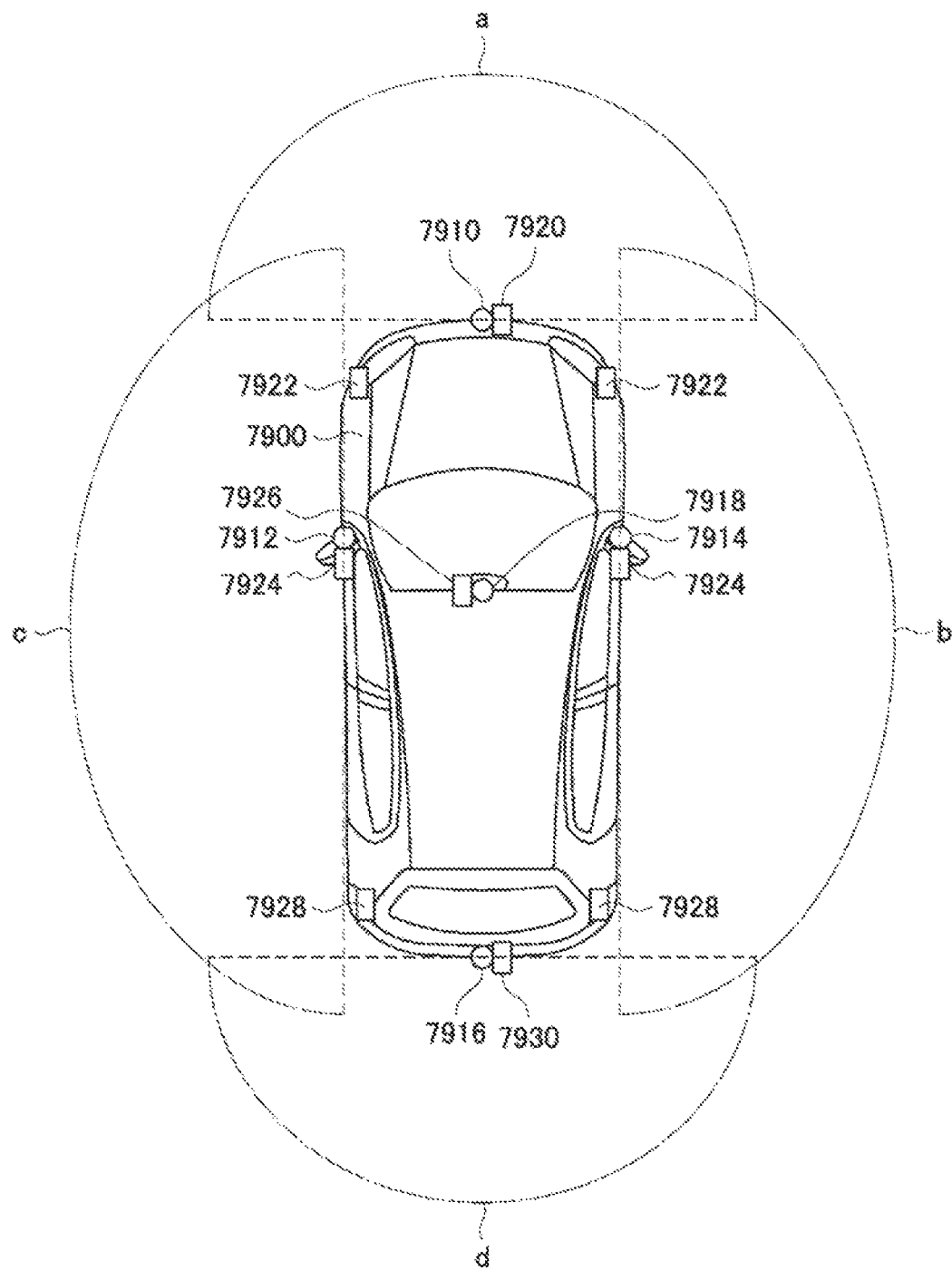
FIG. 19 is a view illustrating an example of an installation position of an out-of-vehicle information detection unit and an imaging unit.

Here, FIG. 19 illustrates an example of an installation position of the imaging unit 7410 and the out-of-vehicle information detection unit 7420. For example, each of imaging units 7910, 7912, 7914, 7916, and 7918 is provided at least at one position among a front nose, a side-view mirror, a rear bumper, a back door, and an upper portion of an in-vehicle windshield glass of a vehicle 7900. The imaging unit 7910 that is provided in the front nose, and the imaging unit 7918 that is provided in the upper portion of the in-vehicle windshield glass mainly acquire an image in front of the vehicle 7900. The imaging units 7912 and 7914 which are provided in the side-view mirrors mainly acquire an image on a lateral side of the vehicle 7900. The imaging unit 7916 that is provided in the rear bumper or the back door mainly acquires an image on a rear side of the vehicle 7900. The imaging unit 7918 that is provided on the upper portion of the in-vehicle windshield glass is mainly used for detection of a preceding vehicle, a pedestrian, an obstacle, a traffic signal, a traffic board, a lane, and the like.

Furthermore, FIG. 19 illustrates an example of an imaging range of the respective imaging units 7910, 7912, 7914, and 7916. An imaging range a represents an imaging range of the imaging unit 7910 that is provided in the front nose, imaging ranges b and c represent imaging ranges of the imaging units 7912 and 7914 which are provided in the side-view mirrors, and an imaging range d represents an imaging range of the imaging unit 7916 that is provided in the rear bumper or the back door. For example, when pieces of image data which are captured by the imaging units 7910, 7912, 7914, and 7916 overlap each other, an overhead view image when the vehicle 7900 is viewed from an upward side of the vehicle 7900 is obtained.

Out-of-vehicle information detection units 7920, 7922, 7924, 7926, 7928, and 7930 which are provided in a front, a rear, sides, corners, and an upper portion of the in-vehicle windshield glass of the vehicle 7900 may be, for example, an ultrasonic sensor or a radar device. The out-of-vehicle information detection units 7920, 7926, and 7930 which are provided in the front nose, the rear bumper, the back door, and an upper portion of the in-vehicle windshield glass of the vehicle 7900 may be, for example, the LIDAR device. The out-of-vehicle information detection units 7920 to 7930 are mainly used for detection of a preceding vehicle, a pedestrian, an obstacle, and the like.

Description will continue with reference to FIG. 18. The out-of-vehicle information detection unit 7400 causes the imaging unit 7410 to capture an out-of-vehicle image, and receives captured image data. In addition, the out-of-vehicle information detection unit 7400 receives detection information from the out-of-vehicle information detection unit 7420 that is connected to the out-of-vehicle information detection unit 7400. In a case where the out-of-vehicle information detection unit 7420 is the ultrasonic sensor, the radar device, or the LIDAR device, the out-of-vehicle information detection unit 7400 transmits an ultrasonic wave, an electromagnetic wave, and the like, and receives information of a reflected wave that is received. The out-of-vehicle information detection unit 7400 may perform object detection processing of a human, a vehicle, an obstacle, a sign, a character on a road surface, and the like, or distance detection processing on the basis of received information. The out-of-vehicle information detection unit 7400 may perform environment recognition processing of recognizing raindrop, fog, a road surface situation, and the like on the basis of the received information. The out-of-vehicle information detection unit 7400 may calculate a distance to an out-of-vehicle object on the basis of the received information.

In addition, the out-of-vehicle information detection unit 7400 may perform image recognition processing of recognizing a human, a vehicle, an obstacle, a sign, a character on a road surface, and the like, or distance detection processing on the basis of received image data. The out-of-vehicle information detection unit 7400 may perform processing such as distortion correction or alignment with respect to received image data, and may combine pieces of image data captured by the other imaging unit 7410 to generate an overhead view image or a panoramic image. The out-of-vehicle information detection unit 7400 may perform visual point conversion processing by using image data captured by the other imaging unit 7410.

The in-vehicle information detection unit 7500 detects in-vehicle information. For example, a driver state detection unit 7510 that detects a driver state is connected to the in-vehicle information detection unit 7500. The driver state detection unit 7510 may include a camera that captures an image of a driver, a biological sensor that detects biological information of the driver, a microphone that collects an in-vehicle sound, and the like. For example, the biological sensor is provided on a seating surface, a steering wheel, and the like, and detects biological information of an occupant who sits on a seat, or a driver who grips the steering wheel. The in-vehicle information detection unit 7500 may calculate the degree of fatigue or the degree of concentration of the driver, or may determine whether or not the driver falls asleep on the basis of detection information that is input from the driver state detection unit 7510. The in-vehicle information detection unit 7500 may perform processing such as noise cancellation processing with respect to a sound signal that is collected.

The integration control unit 7600 controls whole operations in the vehicle control system 7000 in accordance with various programs. An input unit 7800 is connected to the integration control unit 7600. For example, the input unit 7800 is realized by devices such as a touch panel, a button, a microphone, a switch, and a lever which are subjected to input operation by an occupant. Data obtained through sound recognition of a sound that is input by the microphone may be input to the integration control unit 7600. For example, the input unit 7800 may be a remote control device using infrared rays or other electric waves, or an external connection device such as a portable telephone or a personal digital assistant (PDA) which corresponds to an operation of the vehicle control system 7000. For example, the input unit 7800 may be a camera, and in this case, an occupant can input information with a gesture. Alternatively, data obtained by detecting movement of a wearable device which the occupant wears may be input. In addition, for example, the input unit 7800 may include an input control circuit that generates an input signal on the basis of information input by the occupant and the like by using the above-described input unit 7800, and outputs the input signal to the integration control unit 7600, and the like. The occupant and the like operate the input unit 7800 to input various pieces of data to the vehicle control system 7000 or to instruct the vehicle control system 7000 to perform a processing operation.

The storage unit 7690 may include a read only memory (ROM) that stores various programs which are executed by the microcomputer, and a random access memory (RAM) that stores various parameters, operation results, sensor values, and the like. In addition, the storage unit 7690 may be realized by a magnetic storage device such as a hard disc drive (HDD), a semiconductor storage device, an optical storage device, a magneto-optical storage device, and the like.

The general-purpose communication I/F 7620 is a general-purpose communication I/F that relays communication with various devices which exist in an external environment 7750. In the general-purpose communication I/F 7620, a cellular communication protocol such as Global System of Mobile communications (GSM) (registered trademark), WiMAX (registered trademark), Long Term Evolution (LTE) (registered trademark), and LTE-Advanced (LTE-A), and other wireless communication protocols such as a wireless LAN (also referred to as Wi-Fi (registered trademark)), and Bluetooth (registered trademark) may be embedded. For example, the general-purpose communication I/F 7620 may be connected to a device (for example, an application server or a control server) that exists on an external network (for example, the Internet, a cloud network, or a company-specific network) through a base station or an access point. In addition, the general-purpose communication I/F 7620 may be connected to a terminal that exists in the vicinity of a vehicle (for example, a terminal of a driver, a pedestrian, or a shop, or a machine type communication (MTC) terminal), for example, by using a peer to peer (P2P) technology.

The dedicated communication I/F 7630 is a communication I/F that supports a communication protocol that is designed for a use in a vehicle. In the dedicated communication I/F 7630, for example, a standard protocol such as a wireless access in vehicle environment (WAVE) that is a combination of IEEE 802.11p of a lower layer and IEEE1609 of a higher layer, dedicated short range communications (DSRC), and a cellular communication protocol may be embedded. Typically, the dedicated communication I/F 7630 performs V2X communication that is a concept including one or more among vehicle to vehicle communication, vehicle to infrastructure communication, vehicle to home communication, and vehicle to pedestrian communication.

For example, the position measurement unit 7640 executes position measurement by receiving a GNSS signal from a global navigation satellite system (GNSS) satellite (for example, a GPS signal from a global positioning system (GPS) satellite), and generates position information including a latitude, a longitude and an altitude of the vehicle. Furthermore, the position measurement unit 7640 may specify a current position through signal exchange with a wireless access point, or may acquire position information from a terminal such as a portable telephone, a PHS, or a smartphone which has a position measurement function.

For example, the beacon reception unit 7650 receives an electric wave or an electromagnetic wave which is transmitted from a wireless station that is provided on a road, and the like, and acquires information such as a current position, delay, closure to traffic, and a required time. Furthermore, a function of the beacon reception unit 7650 may be included in the dedicated communication I/F 7630.

The in-vehicle device I/F 7660 is a communication interface that relays connection between the microcomputer 7610 and various in-vehicle devices 7760 provided in a vehicle. The in-vehicle device I/F 7660 may establish wireless connection by using a wireless communication protocol such as a wireless LAN, Bluetooth (registered trademark), near field communication (NFC), and a wireless USB (WUSB). In addition, the in-vehicle device I/F 7660 may establish wired connection such as a universal serial bus (USB), High-Definition Multimedia Interface (HDMI) (registered trademark), and a mobile high-definition link (MHL) through a connection terminal (and a cable as necessary) (not illustrated). For example, the in-vehicle devices 7760 may include at least one among mobile devices or wearable devices of occupants, and information devices which are conveyed into or mounted on a vehicle. In addition, the in-vehicle devices 7760 may include a navigation device that performs route searching to an arbitrary destination. The in-vehicle device I/F 7660 exchanges a control signal or a data signal with the in-vehicle devices 7760.

The on-vehicle network I/F 7680 is an interface that relays communication between the microcomputer 7610 and the communication network 7010. The on-vehicle network I/F 7680 transmits and receives a signal and the like on the basis of a predetermined protocol that is supported by the communication network 7010.

The microcomputer 7610 of the integration control unit 7600 controls the vehicle control system 7000 in accordance with various programs on the basis of information that is acquired through at least one among the general-purpose communication I/F 7620, the dedicated communication I/F 7630, the position measurement unit 7640, the beacon reception unit 7650, the in-vehicle device I/F 7660, and the on-vehicle network I/F 7680. For example, the microcomputer 7610 may calculate a control target value of the driving force generation device, the steering mechanism, or the braking device on the basis of acquired information regarding an inner side and on an outer side of a vehicle, and may output a control command with respect to the driving system control unit 7100. For example, the microcomputer 7610 may perform cooperative control to realize advanced driver assistance system (ADAS) functions including collision avoidance or impact mitigation of a vehicle, following travel based on an inter-vehicle distance, vehicle-speed maintaining travel, collision alarm of a vehicle, and vehicle lane departure alarm, and the like. In addition, the microcomputer 7610 may perform cooperative control to realize automatic driving and the like in which a vehicle autonomously travels without depending on a driver's operation by controlling the driving force generation device, the steering mechanism, the braking device, and the like on the basis of acquired nearby information of the vehicle.

The microcomputer 7610 may generate three-dimensional distance information between a vehicle and an object such as a nearby structure and a nearby person on the basis of information that is acquired through at least one among the general-purpose communication I/F 7620, the dedicated communication I/F 7630, the position measurement unit 7640, the beacon reception unit 7650, the in-vehicle device I/F 7660, and the on-vehicle network I/F 7680, and may create local map information including nearby information at a current position of the vehicle. In addition, the microcomputer 7610 may predict danger such as collision of the vehicle, approaching of a pedestrian and the like, and entrance into a road for which traffic is closed on the basis of acquired information, and may generate an alarm signal. For example, the alarm signal may be a signal for generating an alarm sound or a signal for lighting an alarm lamp.

The sound and image output unit 7670 transmits an output signal of at least one of a sound or an image to an output device capable of notifying an occupant of a vehicle or an outer side of the vehicle of information in a visual manner or an auditory manner. In the example in FIG. 18, as the output device, an audio speaker 7710, a display unit 7720, and an instrument panel 7730 are exemplified. For example, the display unit 7720 may include at least one of an on-board display or a head-up display. The display unit 7720 may have an augmented reality (AR) display function. The output device may be other device such as a headphone, a wearable device such as an eyeglass-type display which the occupant wears, a projector, and a lamp in addition to the above-described devices. In a case where the output device is a display device, the display device visually displays results obtained through the various kinds of processing which are performed by the microcomputer 7610, or information received from other control units in various modes such as a text, an image, a table, and a graph. In addition, in a case where the output device is a sound output device, the sound output device converts an audio signal constituted by reproduced sound data, acoustic data, or the like into an analog signal, and outputs the analog signal in an auditory manner.

Furthermore, in the example illustrated in FIG. 18, at least two control units which are connected through the communication network 7010 may be integrated as one control unit. Alternatively, an individual control unit may be constituted by a plurality of control unit. In addition, the vehicle control system 7000 may include additional control units (not illustrated). In addition, in the description, a part or the entirety of a function of any one control unit may be provided in another control unit. That is, when transmission and reception of information through the communication network 7010 is established, predetermined operation processing may be performed by any one control unit. Similarly, a sensor or a device that is connected to any one control unit may be connected to another control unit, and a plurality of the control units may transmit and receive detection information to and from each other through the communication network 7010.

The technology according to the present technology is applicable to, for example, the integration control unit 7600 and the display unit 7720 among the above-described configurations. In this case, the integration control unit 7600 corresponds to the control unit 53 in FIG. 2, and the display unit 7720 corresponds to the display unit 25 in FIG. 2.

For example, in a case where the integration control unit 7600 allows the display unit 7720 to display a menu screen (menu page) related to the vehicle control system 7000, when the present technology is applied to the case, and addition, deletion, sorting, and the like of a menu item in the menu screen (menu page) are performed, it is possible to customize the menu screen, and it is possible to improve convenience. At this time, for example, as the menu item that is displayed on the menu screen, for example, various menu items such as an item related to in-vehicle temperature adjustment, an item related to position information of the vehicle 7900, an item related to reproduction of a music, an item related to display of a travel distance of the vehicle 7900, and an item related to call reception, call response, and the like are considered.

In addition, a menu screen corresponding to a driver or a passenger of the vehicle 7900 such as changing of an arrangement position of a menu item and the like in correspondence with the driver or the passenger may be displayed.

Particularly, display of the menu item corresponding to the driver or the passenger is effective when the menu item is a menu item such as an item related to fuel information of gasoline, an item related to a fuel residual amount, an item related to a travel distance, an item related to a navigation, an item related to an audio, and the like, which have high correlation with an individual user.

In this case, for example, setting information of a menu screen, that is, a menu item that is displayed, a display position of the menu item, and the like may be correlated with user information indicating a user for every user such as the driver or the passenger. As an example, for example, in car sharing, the integration control unit 7600 may acquire user information of a user who gets on the vehicle 7900 as a sharing car, may read out the setting information corresponding to the user information of the user, and may allow the display unit 7720 to display a menu screen corresponding to the setting information.

In addition, the present technology can employ the following configurations.

(1) An information processing device including:
a control unit that selects a target position, at which an operation of setting related to a menu item is performed, in one or a plurality of menu pages in which the menu item is displayed, and performs setting processing corresponding to determination of the selection in a case where an instruction for the determination of the selection is given.

(2) The information processing device according to (1),
in which the control unit allows a selection screen, which includes at least a part of the menu pages and on which the target position is selected, to be displayed, and selects the target position in correspondence with a user's operation with respect to the selection screen.

(3) The information processing device according to (2),
in which the control unit switches display of the selection screen in correspondence with the user's operation so that any one among a plurality of the selection screens is displayed.

(4) The information processing device according to (2) or (3),
in which the control unit allows a screen for selection of a new menu item for which a setting operation is performed or a new target position at which a setting operation is performed to be displayed after the setting processing.

(5) The information processing device according to any one of (1) to (4),
the target position is a position of an addition destination of the new menu item in the menu page.

(6) The information processing device according to any one of (1) to (4),
in which the target position is a position of a movement destination of the menu item in the menu page.

(7) The information processing device according to (6),
in which the control unit selects the menu item that is moved from one or a plurality of the menu pages, and selects the position of the movement destination of the menu item that is moved as the target position.

(8) The information processing device according to any one of (1) to (4),
in which the target position is a position of the menu item that is deleted in the menu page.

(9) The information processing device according to any one of (1) to (8),
in which the operation of setting related to the menu item is addition of the menu item, sorting of the menu item, or deletion of the menu item.

(10) An information processing method including:
a step of selecting a target position, at which an operation of setting related to a menu item is performed, in one or a plurality of menu pages in which the menu item is displayed, and performing setting processing corresponding to determination of the selection in a case where an instruction for the determination of the selection is given.

(11) A program that allows a computer to execute processing including a step of:
selecting a target position, at which an operation of setting related to a menu item is performed, in one or a plurality of menu pages in which the menu item is displayed, and performing setting processing corresponding to determination of the selection in a case where an instruction for the determination of the selection is given.

(12) An information processing device including:
a control unit configured to
update a menu page so that a menu item that is designated is added or moved to a position designated in the menu page when the number of menu items displayed in the menu page is less than a display-possible maximum number in a case where an instruction for addition or movement of the designated menu item with respect to the menu page is given, and
update the menu page so that a menu item that exists at the position designated in the menu page is substituted with the designated menu item when the number of the menu items displayed in the menu page is the maximum number.

(13) The information processing device according to (12),
in which the control unit allows a selection screen, which includes at least a part of the menu pages and on which an addition destination or a movement destination of the designated menu item is selected, to be displayed, and updates the menu page in correspondence with a user's operation with respect to the selection screen.

(14) The information processing device according to (13),
in which the control unit allows an instruction image for selection of a position of the addition destination or the movement destination of the designated menu item to be displayed on the selection screen in a different display format in correspondence with whether or not the number of the menu items displayed in the menu page is less than the maximum number.

(15) The information processing device according to (13) or (14),
in which the control unit switches display of the selection screen in correspondence with the user's operation so that any one among a plurality of the selection screen is displayed.

(16) An information processing method including a step of:
updating a menu page so that a menu item that is designated is added or moved to a position designated in the menu page when the number of menu items displayed in the menu page is less than a display-possible maximum number in a case where an instruction for addition or movement of the designated menu item with respect to the menu page is given, and updating the menu page so that a menu item that exists at the position designated in the menu page is substituted with the designated menu item when the number of the menu items displayed in the menu page is the maximum number.

(17) A program that allows a computer to execute processing including a step of:

updating a menu page so that a menu item that is designated is added or moved to a position designated in the menu page when the number of menu items displayed in the menu page is less than a display-possible maximum number in a case where an instruction for addition or movement of the designated menu item with respect to the menu page is given, updating the menu page so that a menu item that exists at the position designated in the menu page is substituted with the designated menu item when the number of the menu items displayed in the menu page is the maximum number.

(18) An information processing device including:

a display control unit that switches display so that any one of an existing menu page in which a menu item that is determined in advance is displayed, a My Menu page in which the menu item selected by a user is displayed, and a My Menu setting page in which the menu item for performing setting related to the My Menu page is displayed; and a control unit that performs setting processing corresponding to the menu item for which selection is determined in a case where selection of the menu item on the My Menu setting page is determined.

(19) The information processing device according to (18), in which the menu item for performing setting related to the My Menu page is not displayed in the My Menu page.

REFERENCE SIGNS LIST

11 Imaging device
25 Display unit
52 Input unit
53 Control unit
61 Display control unit
62 Setting processing unit

The invention claimed is:

1. An information processing device, comprising:
a control unit configured to:
control display of a first selection screen that includes a part of a first menu page of a plurality of menu pages;
switch from the first selection screen to a second selection screen based on a first user operation such that a second menu page of the plurality of menu pages corresponding to the second selection screen is displayed;
select a target position in one of the second menu page or a third menu page of the plurality of menu pages in which a menu item is displayed, wherein
the selection of the target position is based on a display position of a cursor in one of the second menu page or the third menu page at which an operation of a setting related to the menu item is executed; and
execute the operation of the setting related to the menu item at the target position based on an instruction corresponding to the selected target position.

2. The information processing device according to claim 1, wherein the control unit is further configured to control display of the second selection screen on which the target position is selected; and
select the target position based on a second user operation with respect to the second selection screen.

3. The information processing device according to claim 2, wherein the control unit is further configured to control display of a screen for selection of one of a new menu item for which a setting operation is executed or a new target position at which the setting operation is executed after the execution of the operation of the setting related to the menu item.

4. The information processing device according to claim 1, wherein
the target position is a position of an addition destination of the menu item in one of the second menu page or the third menu page, and
the operation of the setting related to the menu item is addition of the menu item to one of the second menu page or the third menu page at the target position.

5. The information processing device according to claim 1, wherein
the target position is a position of a movement destination of the menu item in one of the second menu page or the third menu page, and
the operation of the setting related to the menu item is movement of the menu item on one of the second menu page or the third menu page to the target position.

6. The information processing device according to claim 5, wherein the control unit is further configured to:
select the menu item that is moved from one of the second menu page or the third menu page; and
select the position of the movement destination of the menu item that is moved as the target position.

7. The information processing device according to claim 1, wherein
the target position is a position of the menu item that is deleted in one of the second menu page or the third menu page, and
the operation of the setting related to the menu item is deletion of the menu item at the target position from one of the second menu page or the third menu page.

8. The information processing device according to claim 1, wherein the operation of the setting related to the menu item is one of addition of the menu item, sorting of the menu item, or deletion of the menu item.

9. An information processing method, comprising:
controlling display of a first selection screen that includes a part of a first menu page of a plurality of menu pages;
switching from the first selection screen to a second selection screen based on a user operation such that a second menu page of the plurality of menu pages corresponding to the second selection screen is displayed;
selecting a target position in one of the second menu page or a third menu page of the plurality of menu pages in which a menu item is displayed, wherein
the selection of the target position is based on a display position of a cursor in one of the second menu page or the third menu page at which an operation of a setting related to the menu item is executed; and
executing the operation of the setting related to the menu item at the target position based on an instruction corresponding to the selected target position.

10. A non-transitory computer-readable medium having stored thereon, computer-executable instructions which, when executed by a computer, cause the computer to execute operations, the operations comprising:
controlling display of a first selection screen that includes a part of a first menu page of a plurality of menu pages;

switching from the first selection screen to a second selection screen based on a user operation such that a second menu page of the plurality of menu pages corresponding to the second selection screen is displayed;

selecting a target position in one of the second menu page or a third menu page of the plurality of menu pages in which a menu item is displayed, wherein
the selection of the target position is based on a display position of a cursor in one of the second menu page or the third menu page at which an operation of a setting related to the menu item is executed; and executing the operation of the setting related to the menu item at the target position based on an instruction corresponding to the selected target position.

11. An information processing device, comprising:
a control unit configured to:
control display of a first selection screen that includes a part of a first menu page of a plurality of menu pages;
switch from the first selection screen to a second selection screen based on a first user operation such that a second menu page of the plurality of menu pages corresponding to the second selection screen is displayed;
update the second menu page such that a designated menu item is one of added or moved to a position designated in the second menu page in case a number of menu items displayed in the second menu page is less than a display-possible maximum number, wherein the second menu page is updated based on an instruction for one of addition or movement of the designated menu item with respect to the second menu page; and
update the second menu page such that a menu item among the menu items that exists at the position designated in the second menu page is substituted with the designated menu item in case the number of the menu items displayed in the second menu page is equal to the display-possible maximum number.

12. The information processing device according to claim 11, wherein the control unit is further configured to:
control display of the second selection screen on which one of an addition destination or a movement destination of the designated menu item is selected; and
update the second menu page based on a second user operation with respect to the second selection screen.

13. The information processing device according to claim 12, wherein the control unit is further configured to
control display of an instruction image for selection of the position of the one of the addition destination or the movement destination of the designated menu item on the second selection screen in a different display format based on a determination the number of the menu items displayed in the second menu page is equal than the display-possible maximum number.

14. An information processing method, comprising:
controlling display of a first selection screen that includes a part of a first menu page of a plurality of menu pages;
switching from the first selection screen to a second selection screen based on a user operation such that a second menu page of the plurality of menu pages corresponding to the second selection screen is displayed;
updating the second menu page such that a designated menu item is one of added or moved to a position designated in the second menu page in case a number of menu items displayed in the second menu page is less than a display-possible maximum number, wherein the second menu page is updated based on an instruction for one of addition or movement of the designated menu item with respect to the second menu page; and
updating the second menu page such that a menu item among the menu items that exists at the position designated in the second menu page is substituted with the designated menu item in case the number of the menu items displayed in the second menu page is equal to the display-possible maximum number.

15. A non-transitory computer-readable medium having stored thereon, computer-executable instructions which, when executed by a computer, cause the computer to execute operations, the operations comprising:
controlling display of a first selection screen that includes a part of a first menu page of a plurality of menu pages;
switching from the first selection screen to a second selection screen based on a user operation such that a second menu page of the plurality of menu pages corresponding to the second selection screen is displayed;
updating the second menu page such that a designated menu item is one of added or moved to a position designated in the second menu page in case a number of menu items displayed in the second menu page is less than a display-possible maximum number, wherein the second menu page is updated based on an instruction for one of addition or movement of the designated menu item with respect to the second menu page; and
updating the second menu page such that a menu item among the menu items that exists at the position designated in the second menu page is substituted with the designated menu item in case the number of the menu items displayed in the second menu page is equal to the display-possible maximum number.

* * * * *